United States Patent
Chen

(10) Patent No.: US 12,498,714 B2
(45) Date of Patent: Dec. 16, 2025

(54) SYSTEMS AND METHODS FOR UAV FLIGHT CONTROL

(71) Applicant: SZ DJI TECHNOLOGY CO., LTD., Shenzhen (CN)

(72) Inventor: Chaobin Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 684 days.

(21) Appl. No.: 17/087,430

(22) Filed: Nov. 2, 2020

(65) Prior Publication Data
US 2021/0072745 A1 Mar. 11, 2021

Related U.S. Application Data

(63) Continuation of application No. 16/076,312, filed as application No. PCT/CN2015/096745 on Dec. 9, 2015, now Pat. No. 10,824,141.

(51) Int. Cl.
*G05D 1/00* (2024.01)
*B64C 39/02* (2023.01)
(Continued)

(52) U.S. Cl.
CPC ......... *G05D 1/0016* (2013.01); *G05D 1/0044* (2013.01); *G05D 1/0094* (2013.01);
(Continued)

(58) Field of Classification Search
CPC .. G05D 1/0016; G05D 1/0044; G05D 1/0094; G05D 1/101; G05D 1/106;
(Continued)

(56) References Cited

U.S. PATENT DOCUMENTS 3,786,505 A   1/1974   Rennie
8,380,366 B1  2/2013   Schulte et al.
(Continued)

FOREIGN PATENT DOCUMENTS

CN    1300388 A    6/2001
CN    101095090 A  12/2007
(Continued)

OTHER PUBLICATIONS

The World Intellectual Property Organization (WIPO) International Search Report for PCT/CN2015/096745 Sep. 18, 2016 5 pages.
(Continued)

*Primary Examiner* — Erin M Piateski
*Assistant Examiner* — Hajar Hassaniardekani
(74) *Attorney, Agent, or Firm* — ANOVA LAW GROUP, PLLC

(57) ABSTRACT

A system includes an image analyzer and a motion controller in communication with the image analyzer. The image analyzer is configured to receive an image captured by an imaging device coupled to a movable object and analyze the image to determine one or more parameters of a target object in the image. The motion controller is configured to receive input signals indicating one or more motion characteristics of the movable object and one or more motion path parameters, determine a motion path for the movable object to travel based on the one or more parameters of the target object and the one or more motion path parameters, and generate control signals to adjust at least one of a velocity, an acceleration, an altitude, an attitude, or an orientation of the movable object while the movable object is traveling along the motion path based on the one or more motion characteristics.

16 Claims, 25 Drawing Sheets

(51) Int. Cl.
*G05D 1/10* (2006.01)
*B64U 10/13* (2023.01)
*B64U 101/30* (2023.01)
*B64U 101/60* (2023.01)

(52) U.S. Cl.
CPC ............. *G05D 1/101* (2013.01); *G05D 1/106* (2019.05); *B64U 10/13* (2023.01); *B64U 2101/30* (2023.01); *B64U 2101/60* (2023.01); *B64U 2201/20* (2023.01)

(58) Field of Classification Search
CPC ........ G05D 1/12; G05D 1/686; B64C 39/024; B64U 10/13; B64U 2201/20
See application file for complete search history.

(56) References Cited

U.S. PATENT DOCUMENTS

| | | | |
|---|---|---|---|
| 9,162,753 B1* | 10/2015 | Panto | B64C 19/00 |
| 9,164,506 B1 | 10/2015 | Zang | |
| 9,171,473 B1 | 10/2015 | Mcnally et al. | |
| 9,671,791 B1* | 6/2017 | Paczan | G08G 5/57 |
| 9,896,202 B2 | 2/2018 | Jourdan | |
| 2003/0216834 A1 | 11/2003 | Allard | |
| 2008/0027629 A1 | 1/2008 | Peyrucain et al. | |
| 2009/0157233 A1 | 6/2009 | Kokkeby et al. | |
| 2009/0187299 A1 | 7/2009 | Fregene et al. | |
| 2010/0084513 A1 | 4/2010 | Gariepy et al. | |
| 2010/0228406 A1 | 9/2010 | Hamke et al. | |
| 2010/0250022 A1* | 9/2010 | Hines | G05D 1/0094 701/2 |
| 2011/0320068 A1 | 12/2011 | Lee et al. | |
| 2014/0168420 A1* | 6/2014 | Naderhirn | G01M 5/0091 348/128 |
| 2014/0192193 A1 | 7/2014 | Zufferey et al. | |
| 2014/0267775 A1* | 9/2014 | Lablans | G06T 7/246 348/169 |
| 2014/0327733 A1* | 11/2014 | Wagreich | H04N 23/90 348/37 |
| 2015/0260525 A1 | 9/2015 | Parthasarathy | |
| 2015/0316927 A1 | 11/2015 | Kim et al. | |
| 2015/0341540 A1 | 11/2015 | Kim et al. | |
| 2016/0078770 A1* | 3/2016 | Coulmeau | G06F 3/04847 701/3 |
| 2016/0194079 A1* | 7/2016 | Montreuil | B64U 10/16 701/2 |
| 2016/0304198 A1* | 10/2016 | Jourdan | G08G 5/57 |
| 2017/0113799 A1* | 4/2017 | Kovac | B64C 25/00 |
| 2017/0199646 A1* | 7/2017 | Priest | H04L 41/145 |
| 2018/0120846 A1* | 5/2018 | Falk-Pettersen | G06F 3/033 |

FOREIGN PATENT DOCUMENTS

| | | |
|---|---|---|
| CN | 102707726 A | 10/2012 |
| CN | 103941744 A | 7/2014 |
| CN | 103970143 A | 8/2014 |
| CN | 104527978 A | 4/2015 |
| CN | 104714557 A | 6/2015 |
| CN | 104750110 A | 7/2015 |
| CN | 105045281 A | 11/2015 |
| CN | 105120146 A | 12/2015 |
| CN | 108351649 A | 7/2018 |
| EP | 2071353 A2 | 6/2009 |
| EP | 2498055 A2 | 9/2012 |
| EP | 2538298 A1 | 12/2012 |
| WO | 2011114059 A1 | 9/2011 |

OTHER PUBLICATIONS

Craig R Husby: "Path Generation Tactics for a UAV Following a Moving Target", A thesis submitted in partial fulfillment of the requirements for the degree of Master of Science in Aeronautics and Astronautics, Jun. 1, 2005.

New Intelligent Flight Modes for Phantom 3 and Inspire 1, https://www.dji.com/cn/newsroom/news/new-phantom-3-and-inspire-1-intelligent-flight-modes, Sep. 7, 2015 (Sep. 7, 2015). 4 Pages (including translation).

Screen captures from YouTube video clip entitled "How to use the 'Point of Interest Surround' feature of the Intelligent Flight function", 6 pages, uploaded on Sep. 8, 2015 by user "Centron International Co Ltd". Retrieved from Internet: https://youtu.be/cA4lguqchrM?si=ljx9Z0OGzg-Y1sNa.

* cited by examiner

Part A

Part B

Part C

Part A

Part C

Part B

Part D

Part A

Part B

Part C

Part A

Part B

Part A

Part B

Part C

Part A

Part B

Part C

SYSTEMS AND METHODS FOR UAV FLIGHT CONTROL

CROSS-REFERENCE TO RELATED APPLICATIONS

This application is a continuation of application Ser. No. 16/076,312, filed Aug. 7, 2018, which is a National Stage Entry under 35 U.S.C. § 371 of International Application PCT/CN2015/096745, filed Dec. 9, 2015, the entire contents of both of which are incorporated herein by reference.

BACKGROUND

Aerial vehicles have a wide range of real-world applications including surveillance, reconnaissance, exploration, logistics transport, disaster relief, aerial photography, large-scale agriculture automation, live video broadcasting, etc. In some applications, an aerial vehicle carrying a payload (e.g., a camera) may be controlled to fly around a target object to acquire data or perform certain tasks. However, the development of practical flight control applications has been hindered by an absence of an easy-to-use interactive control and guidance system. The lack of an easy-to-use interactive flight control and guidance system may reduce the usefulness of aerial vehicles in certain applications.

SUMMARY

Presently, one or more operators may have to manually select a target object, and manually control the aerial vehicle to fly around the target object and/or follow the target object. The operators may also have to manually control the aerial vehicle such that it flies in a desired trajectory and/or avoid obstacles along the way. If the target object changes its position, size, shape, and/or orientation, the operators have to react to those changes and manually adjust the flight trajectory in real-time. Presently known flight control systems generally require the operators to have some level of aviation experience or manual skill to operate the aerial vehicle, and offer limited real-time automatic control capability.

Accordingly, a need exists for flight control systems that are intuitive and easy to use, and that allows a human to manage and operate an aerial vehicle through interaction with a human-system interface. The burden of manually piloting the aerial vehicle on the user can be significantly reduced, thus allowing the user to more readily focus on payload or mission operations, such as visually monitoring and/or taking aerial imagery/video of a stationary target or a moving target. In some cases, the payload or mission operations may include surveying a target object from different distances and/or at different angles or altitudes, dispensing materials (e.g., spraying water to fight a fire, or spraying pesticide over a field for agricultural purposes), and various other applications.

Improved flight control capabilities may allow a movable object to automatically fly around a target object via one or more complex flight trajectories, without requiring significant manual input and/or operation by a user. In some embodiments as described herein, a user can easily adjust the flight trajectories to follow any path, shape, and/or form in real-time, using for example a touchscreen user terminal. The improved flight control capabilities may be particularly useful when a position, shape, size, geometry, and/or orientation of the target object dynamically changes, or when a user switches focus to another target object while the movable object is flying around and/or tracking the target object. The improved flight control capabilities can be incorporated into an aerial vehicle, such as an unmanned aerial vehicle (UAV).

Presently known flight control methods may be based on global positioning system (GPS) data or camera vision.

In camera vision-based methods, an aerial vehicle may be controlled to fly around and/or track a target object using images captured by an imaging device located on the aerial vehicle. Vision-based flight control methods can be manual or automatic.

For example, in some vision-based manual flight control methods, an image may be first captured using the imaging device, and an operator may manually select a target object to be tracked from the image. The manual selection may be performed using an input device, for example, a tablet, a mobile device, or a personal computer (PC). In some instances, the aerial vehicle may be configured to automatically fly around and/or track the target object after it has been manually selected by the operator using the input device. In other instances, the operator may need to continue to manually control the aerial vehicle to fly around and/or track the target object even after it has been selected.

Conversely, in some vision-based automatic flight control methods, automatic flight control may be implemented using tracking algorithms that can automatically detect a particular type of object, or an object carrying a marker. The type of object may be based on different object classes (e.g., people, buildings, vehicles, landscape, etc.). The marker may include one or more optical markers comprising unique patterns.

In vision-based automatic flight control methods, a target object may be defined based on predetermined features (e.g., color, structure, salient features, etc.) and/or by modeling (e.g., object class). After the target object has been defined, movement of the features and/or model may be detected and calculated in real-time as the target object moves. In these methods, a high-level consistency in the features and/or model may be typically required for precise tracking of the target object. In particular, the level of tracking precision may depend on the spatial relations between the features and/or an error in the model.

However, in many instances, when a position, shape, size, geometry, and/or orientation of the target object changes, visual recognition of the target object may be lost if the target object no longer possesses the predetermined features, or if the target object no longer conforms to the previously known model. This problem is often exacerbated when the aerial vehicle is flying around a target object and capturing images of the target object from different viewpoints. Each viewpoint provides a unique perspective of the target object. If the target object has an irregular shape, changes its position and/or orientation, or morphs into a different shape while the aerial vehicle is flying around and/or tracking the target object, the vision-based methods may not be able to account for those changes, and may not be able to distinguish the target object from other surrounding objects.

Additionally, vision-based methods may be inadequate when obstacles appear in the flight path between the aerial vehicle and the target object. The obstacles may be stationary or capable of movement. In some cases, the obstacles may be a fast-moving group of objects, whereby the size and/or shape of the group may be amorphous and change over time as the objects move. Examples of such groups of objects may include, but are not limited to, groups of moving animals (e.g., a herd of horses running on the plains, or a flock of birds flying in different formations), groups of people (e.g., a large crowd of people moving in a parade), groups of vehicles (e.g., a squadron of airplanes performing aerial acrobatics), or groups comprising different objects moving in different formations (e.g., a group comprising of moving animals, people, and vehicles to be tracked). When the obstacles visually obstruct the target object from the field-of-view of a camera on the aerial vehicle, tracking of the target object may be lost since vision-based methods generally require a clear line-of-sight between the camera and the target object.

In a global positioning system (GPS)-based flight control method, an imaging device and a target object may each be provided with GPS apparatus (e.g., a GPS receiver). A spatial relation between the imaging device and the target object may be calculated based on estimates of their real-time locations. The imaging device may be configured to fly around and/or track the target object based on their spatial relation. However, this method may be limited by GPS signal quality and availability of GPS signals. For example, global positioning system (GPS)-based methods may not work indoors, or when GPS signal reception is blocked by buildings and/or natural terrain features such as valleys, mountains, etc. These methods are predicated on GPS tracking, and thus cannot be used when the target object(s) (e.g., a group of animals) do not carry GPS apparatus. In addition, GPS-based methods are unable to account for changes in the shape, size, geometry, and/or orientation of the target object, and do not provide adequate information for adjusting the flight trajectories of the aerial vehicle when such changes occur. Furthermore, GPS-based methods are unable to account for obstacles in the path of the movable object.

Accordingly, a need exists to improve the tracking capabilities and robustness of an aerial vehicle under different conditions for a variety of applications. The conditions may include changes in position, shape, size, geometry, and/or orientation of the target object, indoor and outdoor environments, stationary obstacles, dynamically appearing obstacles, places without GPS signals or places that have poor GPS signal reception, a variety of different terrain, etc. The applications may include flying around and/or tracking of a stationary target object, a moving target object, or a group of moving target objects. The target objects may include target objects that do not carry GPS apparatus, and target objects that do not have well-defined features or that do not fall into known object classes. The target objects may have regular shapes or irregular shapes. The target objects may be capable of dynamically changing their position, shape, size, geometry, and/or orientation. For example, the shape, size, geometry, and/or orientation of the target objects may be amorphous and change over time. In some cases, the target objects may be in a state of flux, for example a site where a disaster (e.g., a fire or an earthquake) has just struck. The aerial vehicle may be configured to avoid and fly around obstacles, either automatically or based on a user input to adjust the flight path. The obstacles may collectively form a group whereby the size and/or shape of the group may be amorphous and change over time (such as a flock of birds), different obstacles moving in different formations (other aerial vehicles), or any combination of the above. Systems, methods, and devices are provided herein to address at least the above needs.

For instance, in some aspects of the disclosure, a method for controlling a movable object is provided. The method may comprise: obtaining one or more parameters of a target object; and generating a motion path for the movable object based on the one or more parameters of the target object, wherein the motion path comprises a plurality of spatial points that are defined relative to the one or more parameters of the target object, and wherein the plurality of spatial points are configured to be on one or more planes.

According to an aspect of the disclosure, an apparatus for controlling a movable object is provided. The apparatus may comprise one or more processors that are, individually or collectively, configured to: obtain one or more parameters of a target object; and generate a motion path for the movable object based on the one or more parameters of the target object, wherein the motion path comprises a plurality of spatial points that are defined relative to the one or more parameters of the target object, and wherein the plurality of spatial points are configured to be on one or more planes.

According to another aspect of the disclosure, a non-transitory computer-readable medium storing instructions that, when executed, causes a computer to perform a method for controlling a movable object, is provided. The method may comprise: obtaining one or more parameters of a target object; and generating a motion path for the movable object based on the one or more parameters of the target object, wherein the motion path comprises a plurality of spatial points that are defined relative to the one or more parameters of the target object, and wherein the plurality of spatial points are configured to be on one or more planes.

An unmanned aerial vehicle (UAV) system may be provided in accordance with an additional aspect of the disclosure. The system may comprise an apparatus operable to control the UAV. The apparatus may comprise one or more processors that are, individually or collectively, configured to: obtain one or more parameters of a target object; and generate a flight trajectory for the UAV based on the one or more parameters of the target object, wherein the flight trajectory comprises a plurality of spatial points that are defined relative to the one or more parameters of the target object, and wherein the plurality of spatial points are configured to lie on one or more planes.

Further aspects of the disclosure may be directed to a method for controlling a movable object. The method may comprise: determining, for the movable object at a first spatial point, a second spatial point relative to at least one target object; and generating a motion path for the movable object from the first spatial point to the second spatial point.

According to an aspect of the disclosure, an apparatus for controlling a movable object is provided. The apparatus may comprise one or more processors that are, individually or collectively, configured to: determine, for the movable object at a first spatial point, a second spatial point relative to at least one target object; and generate a motion path for the movable object from the first spatial point to the second spatial point.

According to another aspect of the disclosure, a non-transitory computer-readable medium storing instructions that, when executed, causes a computer to perform a method for controlling a movable object, is provided. The method may comprise: determining, for the movable object at a first spatial point, a second spatial point relative to at least one target object; and generating a motion path for the movable object from the first spatial point to the second spatial point.

An unmanned aerial vehicle (UAV) system may be provided in accordance with an additional aspect of the disclosure. The system may comprise an apparatus operable to control the UAV. The apparatus may comprise one or more processors that are, individually or collectively, configured to: determine, for the UAV at a first spatial point, a second spatial point relative to at least one target object; and generate a flight trajectory for the UAV from the first spatial point to the second spatial point.

Further aspects of the disclosure may be directed to a method for controlling a motion path of a movable object using a computer-implemented graphical display. The method may comprise: receiving an input indicative of movement of one or more spatial points in any direction within a three-dimensional (3-D) space, wherein the one or more spatial points are visually depicted on the graphical display; and processing the input to generate the motion path of the movable object based on the movement of the one or more spatial points.

According to an aspect of the disclosure, an apparatus for controlling a motion path of a movable object using a computer-implemented graphical display is provided. The apparatus may comprise one or more processors that are, individually or collectively, configured to: receive an input indicative of movement of one or more spatial points in any direction within a three-dimensional (3-D) space, wherein the one or more spatial points are visually depicted on the graphical display; and process the input to generate the motion path of the movable object based on the movement of the one or more spatial points.

According to another aspect of the disclosure, a non-transitory computer-readable medium storing instructions that, when executed, causes a computer to perform a method for controlling a motion path of a movable object using a computer-implemented graphical display is provided. The method may comprise: receiving an input indicative of movement of one or more spatial points in any direction within a three-dimensional (3-D) space, wherein the one or more spatial points are visually depicted on the graphical display; and processing the input to generate the motion path of the movable object based on the movement of the one or more spatial points.

An unmanned aerial vehicle (UAV) system may be provided in accordance with an additional aspect of the disclosure. The system may comprise an apparatus operable to control a flight trajectory of the UAV. The apparatus may comprise a computer-implemented graphical display and one or more processors that are, individually or collectively, configured to: receive an input indicative of movement of one or more spatial points in any direction within a three-dimensional (3-D) space, wherein the one or more spatial points are visually depicted on the graphical display; and process the input to generate the flight trajectory of the UAV based on the movement of the one or more spatial points.

Further aspects of the disclosure may be directed to a method for controlling a movable object. The method may comprise: generating a motion path comprising at least one spatial point defined relative to one or more parameters of a target object; and determining one or more motion characteristics of the movable object for the at least one spatial point.

According to an aspect of the disclosure, an apparatus for controlling a movable object is provided. The apparatus may comprise one or more processors that are, individually or collectively, configured to: generate a motion path comprising at least one spatial point defined relative to one or more parameters of a target object; and determine one or more motion characteristics of the movable object for the at least one spatial point.

According to another aspect of the disclosure, a non-transitory computer-readable medium storing instructions that, when executed, causes a computer to perform a method for controlling a movable object is provided. The method may comprise: generating a motion path comprising at least one spatial point defined relative to one or more parameters of a target object; and determining one or more motion characteristics of the movable object for the at least one spatial point.

An unmanned aerial vehicle (UAV) system may be provided in accordance with an additional aspect of the disclosure. The system may comprise an apparatus operable to control a flight trajectory of the UAV. The apparatus may comprise one or more processors that are, individually or collectively, configured to: generate the flight trajectory comprising at least one spatial point defined relative to one or more parameters of a target object; and determine one or more motion characteristics of the UAV for the at least one spatial point.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Systems, methods, and devices provided herein can be used to improve the ease of operation of movable objects such as unmanned aerial vehicles (UAVs). The motion control and tracking systems provided herein are intuitive and easy to use, and allows a human to manage and operate a movable object (e.g., a UAV) through interaction with a graphical human-system interface. The burden of manually piloting the UAV on a user can be significantly reduced, thus allowing the user to more readily focus on payload or mission operation, such as visually monitoring and/or taking aerial imagery of a stationary target or a moving target. The burden of manually piloting the UAV on the user can also be significantly reduced by controlling the UAV, via the graphical human-system interface, to follow and/or track a target object along a desired motion path. The motion path may be defined with respect to one or more parameters (e.g., position, size, shape, and/or orientation) of the target object.

The improved motion control and tracking capabilities may further allow a UAV to automatically fly around and/or track one or more stationary/moving target objects, without requiring manual input and/or operation by a user. The improved motion control and tracking capabilities may be particularly useful when: (1) the target objects do not have well-defined features or do not fall into known object classes, and/or (2) the target objects are capable of dynamically changing their position, shape, size, geometry, and/or orientation. In particular, the improved motion control and tracking capabilities enable a variety of motion paths (e.g., flight paths and trajectories) to be defined depending on the state of the target objects. Examples of motion paths may include 2-dimensional and/or 3-dimensional flight paths and trajectories, and also regular-shaped and/or irregular-shaped flight paths and trajectories. The improved motion control and tracking capabilities may also allow a UAV to avoid obstacles, through a user adjusting a portion of the motion path via a graphical interface. It should be noted that the improved motion control and tracking capabilities can be incorporated into any type of aerial vehicle, as well as any vehicle that is capable of traversing air, water, land, and/or space.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

Figure 1:
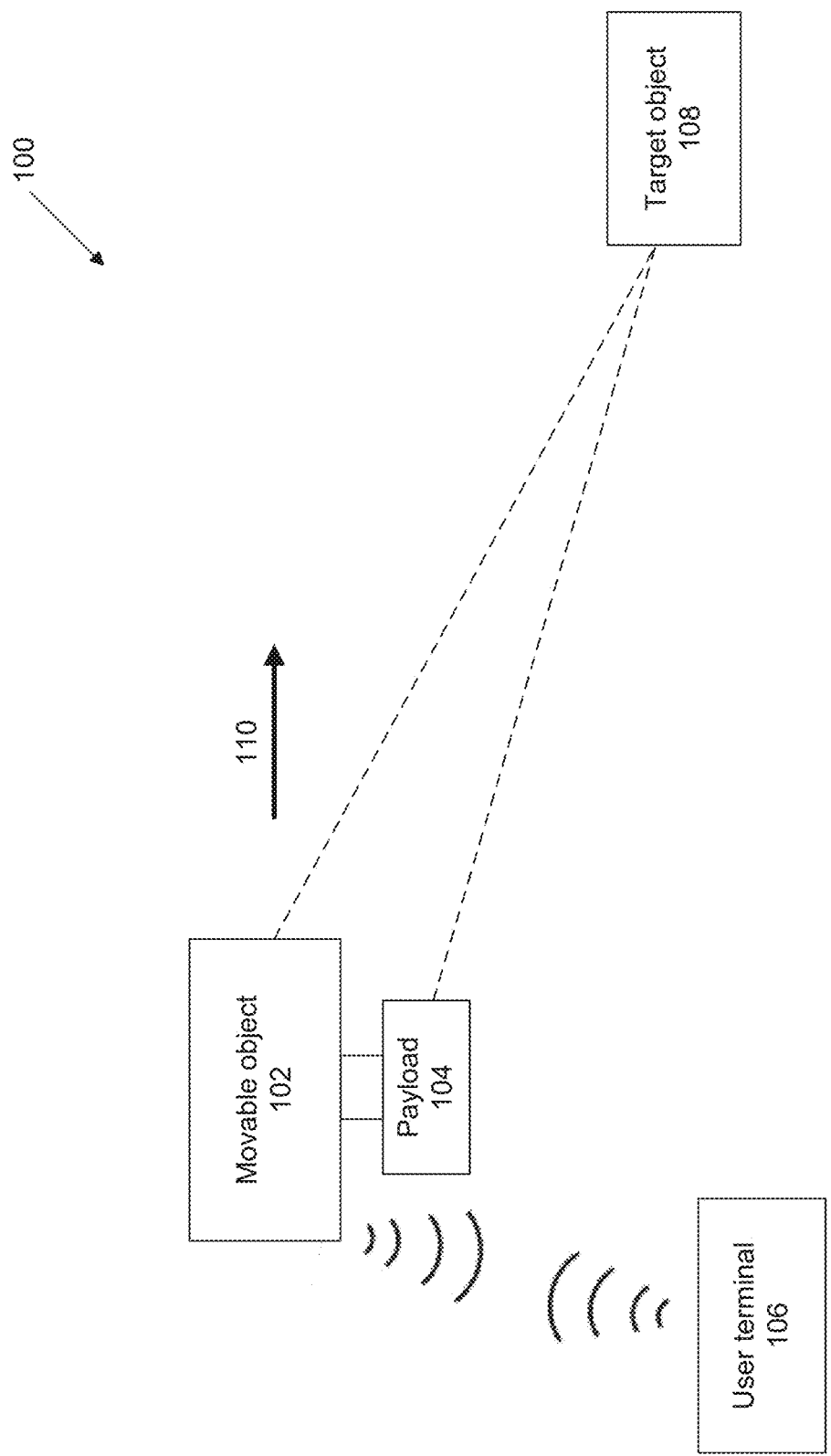
FIG. 1 shows an example of a system used in visual navigation.

FIG. 1 shows an example of a system used in visual navigation. The visual navigation system 100 may include a movable object 102 and a user terminal 106 capable of communicating with the movable object. The movable object may be configured to carry a payload 104. The user terminal can be used to control one or more motion characteristics of the movable object and/or the payload. For example, the user terminal can be used to control the movable object such that the movable object is able to navigate around a target object 108 within an environment. The user terminal can also be used to control the movable object such that the movable object is able to track or follow the target object within the environment. Additionally, the user terminal can be used to control the movable object such that the movable object is able to navigate in a specified motion path 110 within the environment.

The movable object 102 may be any object capable of traversing an environment. The movable object may be capable of traversing air, water, land, and/or space. The environment may include objects that are incapable of motion (stationary objects) and objects that are capable of motion. Examples of stationary objects may include geographic features, plants, landmarks, buildings, monolithic structures, or any fixed structures. Examples of objects that are capable of motion include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object 102 may be a vehicle. The vehicle may be a self-propelled vehicle. The vehicle may traverse an environment with aid of one or more propulsion units. The vehicle may be an aerial vehicle, a land-based vehicle, a water-based vehicle, or a space-based vehicle. The vehicle may be an unmanned vehicle. The vehicle may be capable of traversing an environment without a human passenger onboard. Alternatively, the vehicle may carry a human passenger. In some embodiments, the movable object may be an unmanned aerial vehicle (UAV).

Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a motion controller (e.g., a flight controller), one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The housing may have a single cavity or multiple cavities. In some instances, a motion controller (such as a flight controller) may in communication with one or more propulsion units and/or may control operation of the one or more propulsion units. The motion controller (or flight controller) may communicate and/or control operation of the one or more propulsion units with aid of one or more electronic speed control (ESC) modules. The motion controller (or flight controller) may communicate with the ESC modules to control operation of the propulsion units.

The movable object may support an on-board payload 104. The payload may have a fixed position relative to the movable object, or may be movable relative to the movable object. The payload may spatially translate relative to the movable object. For instance, the payload may move along one, two or three axes relative to the movable object. The payload may rotate relative to the movable object. For instance, the payload may rotate about one, two or three axes relative to the movable object. The axes may be orthogonal to on another. The axes may be a pitch, yaw, and/or roll axis. Alternatively, the payload may be fixed or integrated into the movable object.

The payload may be movable relative to the movable object with aid of a carrier. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

The payload may include a device capable of sensing the environment about the movable object, a device capable of emitting a signal into the environment, and/or a device capable of interacting with the environment.

One or more sensors may be provided as a payload, and may be capable of sensing the environment. The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the payload may include multiple imaging devices, or an imaging device with multiple lenses and/or image sensors. The payload may be capable of taking multiple images substantially simultaneously. The multiple images may aid in the creation of a 3D scene, a 3D virtual environment, a 3D map, or a 3D model. For instance, a right image and a left image may be taken and used for stereomapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

A payload may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

Any examples herein of payloads may apply to devices that may be carried by the movable object or that may be part of the movable object. For instance, one or more sensors may be part of the movable object. The one or more sensors may or may be provided in addition to the payload. This may apply for any type of payload, such as those described herein.

The movable object may be capable of communicating with the user terminal 106. The user terminal may communicate with the movable object itself, with a payload of the movable object, and/or with a carrier of the movable object, wherein the carrier is used to support the payload. Any description herein of communications with the movable object may also apply to communications with the payload of the movable object, the carrier of the movable object, and/or one or more individual components of the movable object (e.g., communication unit, navigation unit, propulsion units, power source, processors, memory storage units, and/or actuators).

The communications between the movable object and the user terminal may be wireless communications. Direct communications may be provided between the movable object and the user terminal. The direct communications may occur without requiring any intermediary device or network. Indirect communications may be provided between the movable object and the user terminal. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

The user terminal may be any type of external device. Examples of user terminals may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HMD), headbands), pendants, armbands, leg bands, shoes, vests), gesture-recognition devices, microphones, any electronic device capable of providing or rendering image data, or any other type of device. The user terminal may be a handheld object. The user terminal may be portable. The user terminal may be carried by a human user. In some cases, the user terminal may be located remotely from a human user, and the user can control the user terminal using wireless and/or wired communications. Various examples, and/or characteristics of user terminals are provided in greater detail elsewhere herein.

The user terminals may include one or more processors that may be capable of executing non-transitory computer readable media that may provide instructions for one or more actions. The user terminals may include one or more memory storage devices comprising non-transitory computer readable media including code, logic, or instructions for performing the one or more actions. The user terminal may include software applications that allow the user terminal to communicate with and receive imaging data from a movable object. The user terminals may include a communication unit, which may permit the communications with the movable object. In some instances, the communication unit may include a single communication module, or multiple communication modules. In some instances, the user terminal may be capable of interacting with the movable object using a single communication link or multiple different types of communication links.

The user terminal may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI). The GUI may show an image that may permit a user to control actions of the movable object, or to modify a motion path of the movable object. The motion path may include a flight path or a flight trajectory of the movable object. In some cases, a curve that is indicative of the motion path may be displayed in the GUI. In other cases, a plurality of points that are indicative of spatial points along the motion path may be displayed in the GUI. The user may select a target from the image. The target may be a stationary target or a moving target. The user may also select a direction of travel from the image. The user may also select a portion of the image (e.g., point, region, and/or object) to define the target and/or direction. The user may select the target and/or direction by directly touching the screen (e.g., touchscreen). The user may touch a portion of the screen. The user may touch the portion of the screen by touching a point on the screen. The user may also generate a motion path for the movable object by drawing a contour on the screen. The motion path may be generated relative to a target object. For example, the motion path may be generated relative to a position, orientation, attitude, size, shape, and/or geometry of the target object. The user may modify any portion of the motion path by adjusting (e.g., moving) different spatial points of the motion path on the screen. Alternatively, the user may select a region on a screen from a pre-existing set of regions, or may draw a boundary for a region, a diameter of a region, or specify a portion of the screen in any other way. The user may select the target and/or direction by selecting the portion of the image with aid of a user interactive device (e.g., mouse, joystick, keyboard, trackball, touchpad, button, verbal commands, gesture-recognition, attitude sensor, thermal sensor, touch-capacitive sensors, or any other device). A touchscreen may be configured to detect location of the user's touch, length of touch, pressure of touch, and/or touch motion, whereby each of the aforementioned manner of touch may be indicative of a specific input command from the user.

The image on the display may show a view collected with aid of a payload of the movable object. For instance, an image collected by the imaging device may be shown on the display. This may be considered a first person view (FPV). In some instances, a single imaging device may be provided and a single FPV may be provided. Alternatively, multiple imaging devices having different fields of view may be provided. The views may be toggled between the multiple FPVs, or the multiple FPVs may be shown simultaneously. The multiple FPVs may correspond to (or generated by) different imaging devices, which may have different field of views. A user at a user terminal may select a portion of the image collected by the imaging device to specify a target object and/or a motion path of the movable object.

In another example, the image on the display may show a map that may be generated with aid of information from a payload of the movable object. The map may optionally be generated with aid of multiple imaging devices (e.g., right camera, left camera, or more cameras), which may utilize stereo-mapping techniques. In some instances, the map may be generated based on positional information about the movable object relative to the environment, the imaging device relative to the environment, and/or the movable object relative to the imaging device. Positional information may include posture information, spatial location information, angular velocity, linear velocity, angular acceleration, and/or linear acceleration. The map may be optionally generated with aid of one or more additional sensors, as described in greater detail elsewhere herein. The map may be a two-dimensional map or a three-dimensional map. The views may be toggled between a two-dimensional and a three-dimensional map view, or the two-dimensional and three-dimensional map views may be shown simultaneously. A user at a user terminal may select a portion of the map to specify a target object and/or motion path of the movable object. The views may be toggled between one or more FPV and one or more map view, or the one or more FPV and one or more map view may be shown simultaneously. The user may make a selection of a target and/or motion path using any of the views. The portion selected by the user may include the target and/or motion path. The user may select the portion using any of the selection techniques as described.

In some embodiments, the image may be provided in a 3D virtual environment that is displayed on the user terminal (e.g., virtual reality system or augmented reality system). The 3D virtual environment may optionally correspond to a 3D map. The virtual environment may comprise a plurality of points or objects that can be manipulated by a user. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated. A user at a user terminal can manipulate the points or objects in the virtual environment to control a motion path of the movable object and/or motion characteristic(s) of the movable object.

The user terminal may optionally be used to control the movement of the movable object, such as the flight of an UAV. The user terminal may permit a user to manually directly control motion of the movable object. Alternatively, a separate device may be provided that may allow a user to manually directly control motion of the movable object. The separate device may or may not be in communication with the user terminal. The motion of the movable object may optionally be fully autonomous or semi-autonomous. The user terminal may optionally be used to control any component of the movable object (e.g., operation of the payload, operation of the carrier, one or more sensors, communications, navigation, landing stand, actuation of one or more components, power supply control, or any other function). Alternatively, a separate device may be used to control one or more components of the movable object. The separate device may or may not be in communication with the user terminal. One or more components may be controlled automatically with aid of one or more processors.

A target object 108 may be selected by a user. The movable object 102 may travel toward, navigate around, and/or visually track the target object. The target object may be a stationary target or a moving target. A motion path may be generated depending on whether the target object is a stationary target or a moving target. In some instances, the user may specify whether the target is a stationary or moving target. Alternatively, the user may provide any other type of indicator of whether the target is a stationary or moving target. Alternatively, no indication may be provided, and a determination may be automatically made with aid of one or more processors, optionally without requiring user input whether the target is a stationary target or a moving target, and selecting an appropriate motion path. A target object may be classified as a stationary target or a moving target depending on its state of motion. In some cases, a target object may be moving or stationary at any given point in time. When the target object is moving, the target object may be classified as a moving target. Conversely, when the same target object is stationary, the target object may be classified as a stationary target.

A stationary target may remain substantially stationary within an environment. Examples of stationary targets may include, but are not limited to landscape features (e.g., trees, plants, mountains, hills, rivers, streams, creeks, valleys, boulders, rocks, etc.) or manmade features (e.g., structures, buildings, roads, bridges, poles, fences, unmoving vehicles, signs, lights, etc.). Stationary targets may include large targets or small targets. A user may select a stationary target. The stationary target may be recognized. Optionally, the stationary target may be mapped. The movable object may travel to and/or navigate around the stationary target, and/or visually track the stationary object. A motion path (e.g., flight path) may be planned for the movable object to travel to and/or navigate around the stationary target. Alternatively, the movable object may travel to and/or navigate around the stationary target without requiring a planned path. In some instances, the stationary target may correspond to a selected portion of a structure or object. For example, the stationary target may correspond to a particular section (e.g., top floor) of a skyscraper.

A moving target may be capable of moving within the environment. The moving target may always be in motion, or may be at motions for portions of a time. The moving target may move in a fairly steady direction or may change direction. The moving target may move in the air, on land, underground, on or in the water, and/or in space. The moving target may be a living moving target (e.g., human, animal) or a non-living moving target (e.g., moving vehicle, moving machinery, object blowing in wind or carried by water, object carried by living target). The moving target may include a single moving object or a group of moving objects. For instance, the moving target may include a single human or a group of moving humans. Moving targets may be large targets or small targets. A user may select a moving target. The moving target may be recognized. Optionally, the moving target may be mapped. The movable object may travel to and/or navigate around the moving target and/or visually track the moving object. A motion path (e.g., flight path) may be planned for the movable object to navigate around the moving object. The path may be changed or updated as the moving object moves along the path. Alternatively, the movable object may travel to and/or navigate around the stationary object and/or visually track the moving object without requiring a planned path.

A moving target may be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments.

A moving target may be capable of moving freely within the environment with respect to six degrees of freedom (e.g., three degrees of freedom in translation and three degrees of freedom in rotation). Alternatively, the movement of the moving target can be constrained with respect to one or more degrees of freedom, such as by a predetermined path, track, or orientation. The movement can be actuated by any suitable actuation mechanism, such as an engine or a motor. The actuation mechanism of the moving target can be powered by any suitable energy source, such as electrical energy, magnetic energy, solar energy, wind energy, gravitational energy, chemical energy, nuclear energy, or any suitable combination thereof. The moving target may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the moving target can be a vehicle, such as a remotely controlled vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

A motion path 110 may be selected by the user. The movable object 102 may travel in the motion path selected by the user. The path may be selected by a user providing input parameters associated with the path, or by selecting a portion of an image (e.g., in FPV or map view). The movable object may travel along the motion path until a countermanding instruction is received or when a countermanding condition is realized. For instance, the movable object may automatically travel along the motion path until a new path is input, when a portion of the motion path is changed, or when a new target is input. The movable object may travel along the motion path until a different motion path is selected. For instance, the user may take manual control over the motion of the movable object at any time while it is moving.

Restrictions may be provided for the travel of the movable object. In another instance, a condition may be detected in which a motion restriction (such as a flight restriction) may apply. As described in greater detail below, obstacle avoidance may occur when the movable object is traveling along the motion path. Additional limitations such as flight ceilings, flight floors, limited range, or other types of flight restrictions may apply.

Figure 2:
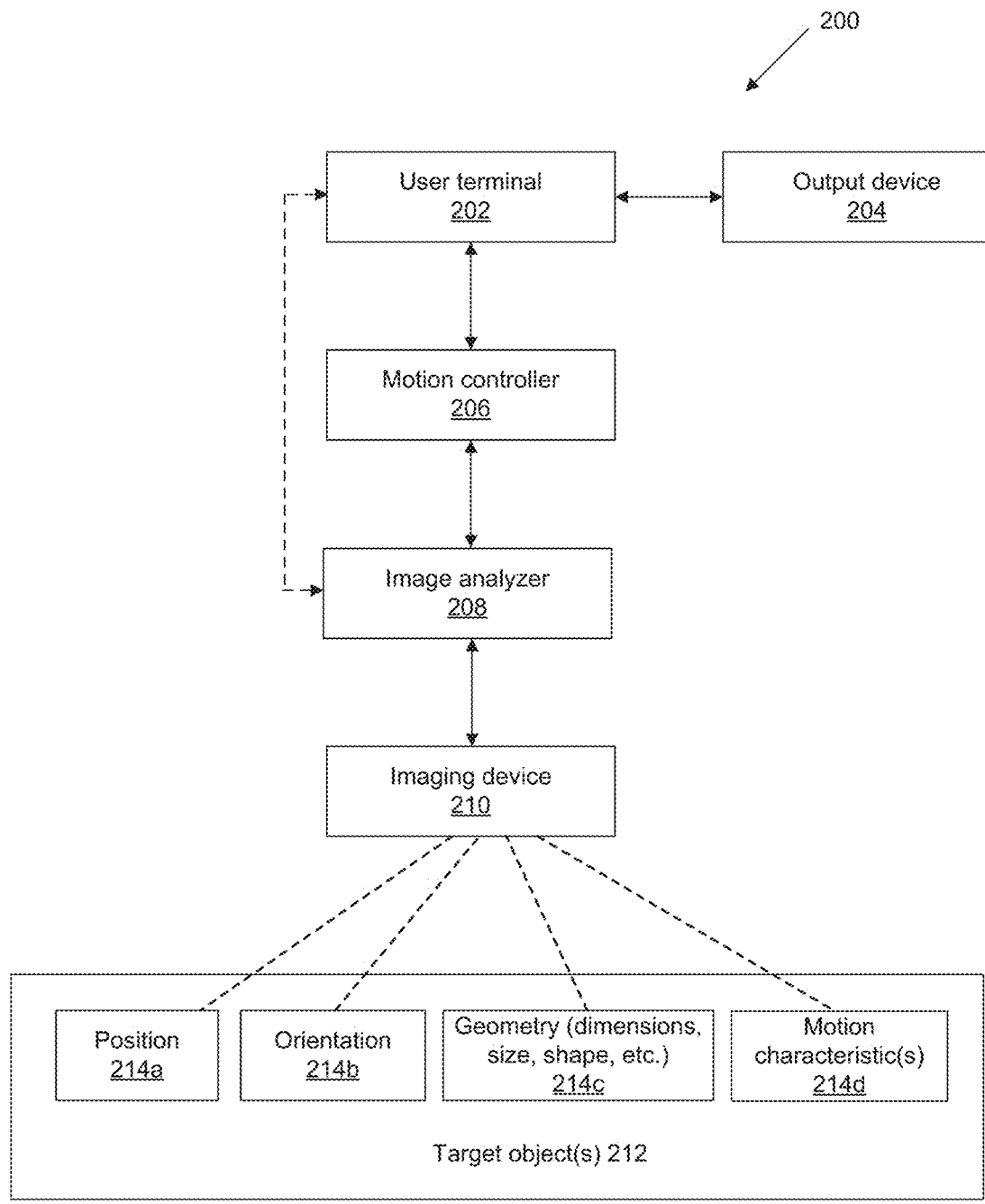
FIG. 2 shows an example of communications that may occur within a visual navigation system.

FIG. 2 shows an example of communications that may occur within a visual navigation system. Within a visual navigation system 200, a user terminal 202 may be provided that may accept an input from a user. The user terminal may include an output device 204. The user terminal may also communicate with a motion controller 206, which may communicate with an image analyzer 208. The image analyzer may communicate with an imaging device 210. The imaging device may capture images which may include portions indicative of one or more target objects 212. For example, the portions may be indicative of one or more parameters of the target objects. The parameters may correspond to one or more physical characteristics and/or motion characteristics of the target object. For example, the parameters may include a position 214a, an attitude and/or orientation 214b, geometry (e.g., dimensions, size, shape, etc.) 214c, and/or motion characteristic(s) (e.g., velocity and acceleration) 214d of the one or more target objects.

A user terminal 202 may include an output device 204 of the user terminal. The output device may be a display, such as a screen. A user may interact with the user terminal via the output screen. For example, when the output device is a touchscreen, a user may manipulate visual objects in a GUI on the touchscreen by selecting (touching) the visual objects through a variety of actions. Examples of those actions may include selecting one or more points or objects, draw a shape, drag-and-drop, translate, rotate, spin, push, pull, zoom-in, zoom-out, etc. Any type of user action in the GUI may be contemplated. A user at a user terminal can manipulate the visual objects in the GUI to control motion path (e.g., shape, size, and position of motion path), motion direction, tracking function, and/or motion characteristic(s) of the movable object.

The display may have any characteristics as described elsewhere herein. The display may be incorporated into the user device or may be provided separately from the rest of the user terminal. If provided separately from the rest of the user terminal, the display device may communicate with the user terminal. Two-way communications may optionally be provided between the output device and the rest of the user terminal.

The user terminal may be configured to display, on the output device, one or more images through which a user may select a target and/or a motion path, or adjust a motion path. As previously described, the images may include FPVs and/or map views. The image may include a live-image or visual representation of a target and/or direction. A target object and/or motion path may be identified by a user that may make a selection in the image. For example, a portion of the image selected by the user may become a target object. A portion of the image selected by the user may become a motion path. A user may also modify an existing motion path by selecting one or more portions of the image.

One or more imaging devices 210 may be provided. The one or more imaging devices may have substantially the same field of view or different fields of view. One or more imaging devices may be movable relative to the movable object while one or more imaging devices may be stationary relative to the movable object. In one example, one or more of the imaging devices may be supported by a carrier that may permit movement of the imaging device relative to the movable object. One or more of the imaging devices may be directly on the movable object, move in the same direction and speed as the movable object, and/or may not move relative to the movable object.

One or more imaging devices may capture images of an environment. The environment may include one or more target objects 212. The target objects may be defined or determined by the user who may make a selection within the image. The image data captured by the one or more imaging devices may correspond to, for example, still images or video frames of one or more objects. The objects may include any physical object or structure that can be optically identified and/or tracked in real-time by the movable object. Optical tracking has several advantages. For example, optical tracking allows for wireless 'sensors', is less susceptible to noise, and allows for many objects (e.g., different types of objects) to be tracked simultaneously. The objects can be depicted in still images and/or video frames in a 2D or 3D format, can be real-life and/or animated, can be in color, black/white, or grayscale, can be in any color space, or can be in a wireframe model.

Images from the one or more imaging devices may optionally be received by an image analyzer 208. The image analyzer may be on-board the imaging device, on-board a carrier, on-board a movable object, or an external device (e.g., user terminal, server, etc.). In some embodiments, the image analyzer may be located remotely from the imaging device. For example, the image analyzer may be disposed in a remote server that is in communication with the imaging device. The image analyzer may be provided at any other type of external device (e.g., a remote controller for a tracking device, an object carried by the target object, a reference location such as a base station, or another tracking device), or may be distributed on a cloud computing infrastructure. In some embodiments, the image analyzer and the motion controller may be located on a same device. In other embodiments, the image analyzer and the motion controller may be located on different devices. The image analyzer and the motion controller may communicate either via wired or wireless connections. In some embodiments, the image analyzer may be located on a movable object. For example, the image analyzer may be disposed in a housing of the movable object. In some further embodiments, the image analyzer may be disposed at a base station that is in communication with the movable object. The image analyzer may be located anywhere, as long as the image analyzer is capable of: (i) receiving a plurality of image frames captured at different times using an imaging device, and (ii) analyzing the plurality of image frames to determine one or more parameters of selected target objects.

In some embodiments, the image data captured by the imaging device may be stored in a media storage (not shown) before the image data is provided to the image analyzer. The image analyzer may be configured to receive the image data directly from the media storage. In some embodiments, the image analyzer may be configured to receive image data concurrently from both the imaging device and the media storage. The media storage can be any type of storage medium capable of storing image data of a plurality of objects. As previously described, the image data may include video or still images. The video or still images may be processed and analyzed by the image analyzer, as described later in the specification. The media storage can be provided as a CD, DVD, Blu-ray disc, hard disk, magnetic tape, flash memory card/drive, solid state drive, volatile or non-volatile memory, holographic data storage, and any other type of storage medium. In some embodiments, the media storage can also be a computer capable of providing image data to the image analyzer.

As another example, the media storage can be a web server, an enterprise server, or any other type of computer server. The media storage can be computer programmed to accept requests (e.g., HTTP, or other protocols that can initiate data transmission) from the image analyzer and to serve the image analyzer with requested image data. In addition, the media storage can be a broadcasting facility, such as free-to-air, cable, satellite, and other broadcasting facility, for distributing image data. The media storage may also be a server in a data network (e.g., a cloud computing network).

In some embodiments, the media storage may be located on-board the imaging device. In some other embodiments, the media storage may be located on-board the movable object but off-board the imaging device. In some further embodiments, the media storage may be located on one or more external devices off-board the movable object and/or the imaging device. In those further embodiments, the media storage may be located on a remote controller, a ground station, a server, etc. Any arrange or combination of the above components may be contemplated. In some embodiments, the media storage may communicate with the imaging device and the tracking device via a peer-to-peer network architecture. In some embodiments, the media storage may be implemented using a cloud computing architecture.

The image data may be provided (e.g., in the form of image signals) to the image analyzer for image processing/analysis. In some examples, the image analyzer can be implemented as a software program executing in a processor and/or as hardware that analyzes the plurality of image frames to identify a target object and one or more parameters associated with the target object. For example, the image analyzer may be configured to analyze the image frames to identify a target object, such a stationary target or a moving target. This may include detecting the object based on an input from the user, such as a portion of the image that is selected. For instance, even if a single point is selected, an object corresponding to the point may be determined. The image analyzer may be further configured to analyze the image frames to identify one or more parameters associated with the target object. The parameters may include a size $214a$, an attitude and/or orientation $214b$, geometry (e.g., dimensions, size, shape, etc.) $214c$, and/or motion characteristic(s) (e.g., velocity and acceleration) $214d$ of the one or more target objects.

The image analyzer may be configured to determine the relative positions between the movable object and the target object. In some instances, the image analyzer may determine a position of the imaging device and/or movable object with respect to the environment (e.g., an inertial reference frame) and/or one another. The image analyzer may determine a position of the target object with respect to the environment (e.g., an inertial reference frame) and/or with respect to the movable object (which may include an imaging device supported by the movable object). Optionally, data from one or more additional sensors and/or external devices may be used to aid in determination of positional information by the image analyzer (for example, IMU data or data from any other sensors as described elsewhere herein). As previously described, positional information may include spatial location (e.g., in reference to one, two or three axes), attitude (e.g., relative to one, two or three axes), linear velocity, angular velocity, linear acceleration, and/or angular acceleration.

The resulting analysis of the image frames may be provided (in the form of analyzed signals) to be displayed on an output device of a user terminal. For example, a map may be generated indicative of the environment and/or positions of various objects and/or the movable object within the environment. The map may be a 2D or a 3D map. The map may be displayed on the output device. Optionally, data from the image analyzer may be provided directly to a user terminal which may display it on its output device without requiring any intermediary analysis or processing. For instance, the data from the image analyzer may optionally be transmitted to be displayed on an output device of the user terminal without going through a motion controller.

Optionally, data from the image analyzer may be provided to a motion controller 206. The motion controller may be provided on-board the movable object, on-board the carrier, on-board the imaging device, and/or on an external device or network. The motion controller may be provided using any exemplary devices or configurations provided elsewhere herein for other components, such as the image analyzer or memory storage.

The motion controller may control motion of the movable object. For example, the motion controller may control the movable object to travel along a motion path to surround a target object, and/or track the target object. Optionally, the motion controller may generate one or more motion instructions to be provided to one or more propulsion units of the movable object. The motion controller may optionally generate a motion path for the movable object. The motion path may be substantially fixed, or may be variable or dynamic. The motion path may be configured to surround a target object. The motion path may be a 2-dimensional (2-D) or 3-dimensional (3-D) curve. In some embodiments, a motion path may surround a stationary object. The motion path may optionally be surrounding a moving object, and the heading and/or path may be altered as the object is moving. Alternatively, a constantly changing motion path may be generated for a target object that is constantly changing its position, size, shape, geometry, and/or orientation. The motion path may remain the same until a countermanding condition is detected (e.g., a further input is detected or a motion restriction applies). A countermanding condition may also include a user adjusting one or more spatial points of the motion path on the display. The motion controller may be in communication with one or more propulsion units of the movable object (not pictured).

Optionally, information from one or more sensors may be provided to the motion controller. For example, information from one or more sets of IMUs may be provided to the motion controller. The one or more sets of IMUs may be on-board the movable object, on-board a carrier and/or on-board a payload. The data from the IMUs may be indicative of positional information of the movable object, the carrier, and/or the payload. The motion controller may optionally use the information from the one or more sensors in controlling motion of the movable object. Optionally the information from the one or more sensors may be used to control position of the imaging device relative to the movable object and/or its environment.

The motion controller may receive information from the user terminal. The motion controller may receive information indicative of the user selection of a target and/or motion path, or a user modification of the motion path or portion thereof. The motion controller may generate or adjust a motion path, and/or control motion of the movable object, in response to the selection of the target and/or any changes to the motion path.

Information from the motion controller may optionally be provided to the user terminal. For instance, a user terminal may receive information about a motion path. The motion path and/or heading may optionally be displayed on the output device.

While shown in FIG. 2 as separate components that are operatively connected, it is understood that the as-shown configuration is for illustrative purposes only. Certain components or devices may be removed or combined, and other components or devices may be added.

Figure 3:
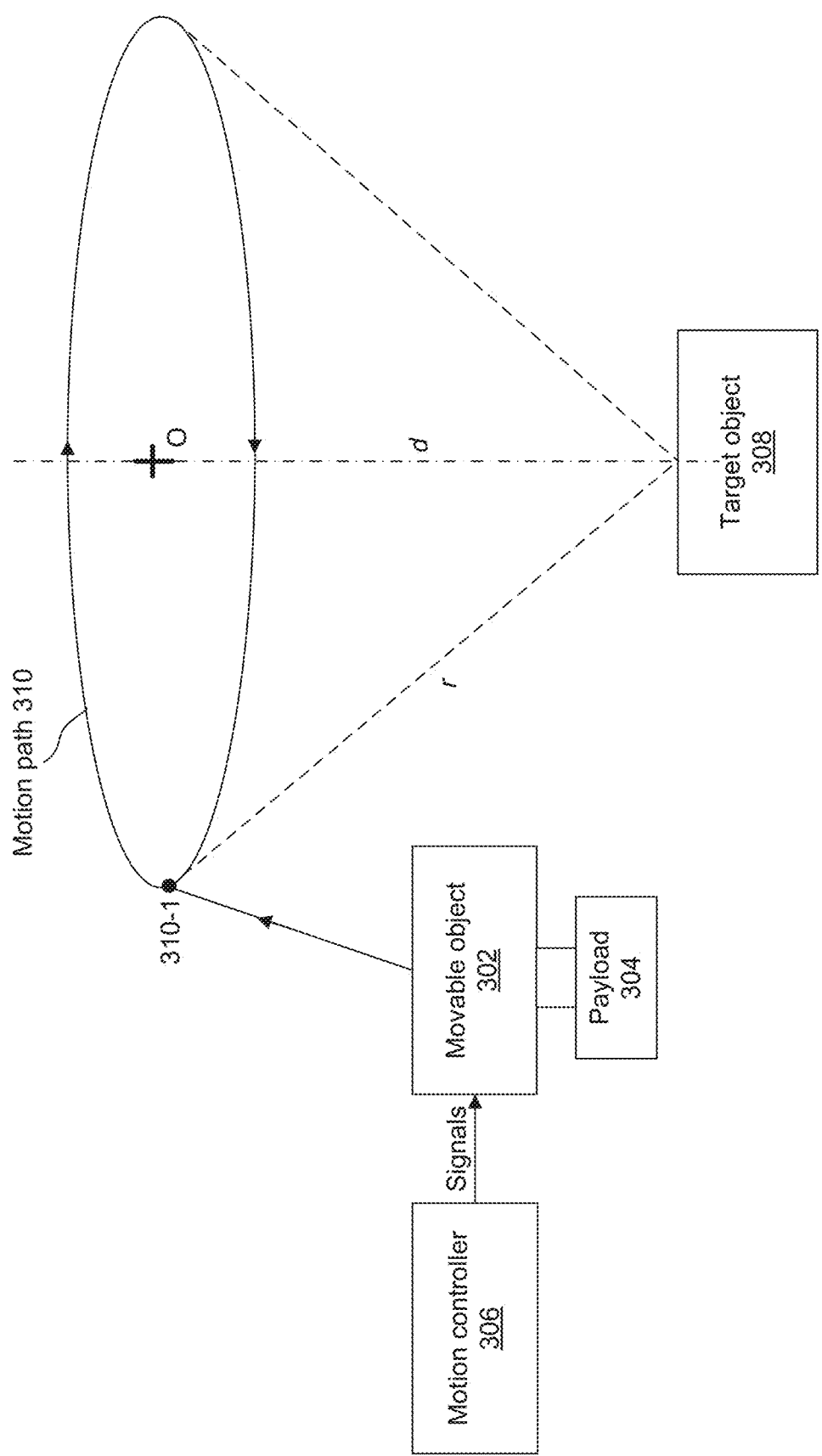
FIG. 3 shows an example in which a motion controller may be used to control a movable object to move along a motion path, in accordance with some embodiments.

FIG. 3 shows an example in which a motion controller may be used to control a movable object to travel along a motion path, in accordance with some embodiments. The motion path may be defined relative to a target object, as described below.

Referring to FIG. 3, a motion controller 306 may be configured to transmit signals to a movable object 302, and control the movable object to move along a motion path 310 based on the transmitted signals. The movable object 302 carries a payload 304 The motion controller may be a part of, or separate from, the movable object. For example, in some embodiments, the motion controller may be integrated into the movable object. In other embodiments, the motion controller may be remote from the movable object (e.g., the motion controller may be located at a remote controller and/or at a user terminal). The motion path may be defined relative to a target object 308. In the example of FIG. 3, the motion path may be an ellipse. An axis extending from the target object may pass through a center O of the ellipse. The center O may be spaced apart from the target object by a distance d. It should be noted that the shape of the motion path need not be limited to an ellipse, but may include any other regular shapes or irregular (amorphous) shapes. The motion path may be 2-D or 3-D, and may lie on one or more planes. The motion path may be aerial, in space, on the ground, subterranean, on water, underwater, or any combination of the above.

The motion controller may control the movable object to travel to an entry point 310-1 that is located along the motion path. The movable object may be configured to circumnavigate the target object by moving along the motion path. As shown in FIG. 3, the movable object may be configured to navigate around the target object at a distance r. The distance r may be constant or variable, depending on the eccentricity of the ellipse. When the eccentricity of the ellipse is 0, the ellipse is a circle and the distance r is a constant. Conversely, when the eccentricity of the ellipse is greater than 0 and less than 1, the distance r is a variable, and may vary according to the major axis and minor axis of the ellipse.

A method for controlling a movable object (such as a UAV) may be implemented using the system of FIG. 3. The method may include obtaining one or more parameters of a target object and generating a motion path for the movable object based on the parameter(s) of the target object. The motion path may comprise a plurality of spatial points that are defined relative to the parameter(s) of the target object. The plurality of spatial points may be configured to lie on one or more planes. For example, in some embodiments, the plurality of spatial points may be configured to lie on a same plane. In other embodiments, the plurality of spatial points may be configured to lie on a plurality of different planes. In some embodiments, the motion path for the movable object may be a flight path or trajectory, and may be generated by a motion controller (e.g., a flight controller) and/or a user terminal.

The parameter(s) of the target object may be obtained from images captured using one or more imaging devices. Such parameter(s) may be indicative of visual characteristics of the target object. For example, in some embodiments, the parameter(s) may comprise a shape and/or an orientation of the target object. The motion controller may be configured to generate the motion path for the movable object based on the shape and/or the orientation of the target object. One or more spatial points in the motion path may be defined relative to the shape and/or the orientation of the target object. In some instances, one or more spatial points in the motion path may be adjusted, either automatically or via user input, when the shape and/or the orientation of the target object changes. The parameter(s) may also comprise one or more dimensions of the target object. Examples of dimensions may include a length, width, height, circumference, perimeter length, surface area, and/or volume of the target object.

The target object may have a regular shape or an irregular (amorphous) shape. In some cases, the shape of the target object may be fixed. In other cases, the shape of the target object may be capable of changing over time. In some embodiments, a size of the target object may remain the same as the shape of the target object changes. For example, a target object may change from a cubic shape to a spherical shape or any other shape, but remain at the same size (e.g., same volume). In other embodiments, a size of the target object may change as the shape of the target object changes. For example, the size of the target object may increase or decrease as the shape of the target object changes. One or more spatial points in the motion path may be adjusted when the shape and/or size of the target object changes. In some cases, the adjustment in the spatial points may occur when the shape of the target object changes, and may be independent of any change in the size of the target object. In some other cases, the adjustment in the spatial points may occur when both the shape and the size of the target object change. The adjustment in the spatial points may alter the shape and/or size of a contour enclosed by the motion path, so as to compensate for the change in shape and/or size of the target object.

In some embodiments, the target object may have a fixed orientation. In other embodiments, the orientation of the target object may be capable of changing over time. One or more spatial points in the motion path may be adjusted when the orientation of the target object changes. The orientation of the target object may include an attitude of the target object (when the target object is capable of rotating about one or more of pitch, roll, and yaw axes). The orientation of the target object may also include a tilt angle of the target object. The tilt angle may be measured between a portion of the target object and a reference plane. The portion of the target object may be located anywhere on the target object (e.g., on an edge surface, bottom surface, side surface, or top surface of the target object). The reference plane may be horizontally disposed with respect to a ground plane, inclined with respect to the ground plane, or vertically disposed with respect to the ground plane. Alternatively, the reference plane may itself be a ground plane. Optionally, the reference plane may be an imaginary plane floating in three-dimensional (3-D) space. Any orientation of the reference plane in 3-D space may be contemplated.

The tilt angle may be defined relative to the reference plane. In some cases, the tilt angle may be a right angle such that the target object is disposed perpendicular to the reference plane. In other cases, the tilt angle may be an acute angle or an obtuse angle such that the target object is tilted with respect to the reference plane. Any range of values of the tilt angle (ranging from about 0 degrees to about 360 degrees) in any direction may be contemplated.

In some embodiments, an axis may be defined extending through the target object. The axis may be a circling axis from which the motion path may be defined. The movable object may be configured to move or navigate about the circling axis. In some cases, the motion path may traverse in an elliptical shape around the circling axis. The circling axis may extend through a center of the elliptical motion path. In some cases, the circling axis may be offset from the center of the elliptical motion path. The circling axis may intersect with: (1) a plane within the elliptical shape, (2) on the circumference of the elliptical shape, or (3) a plane outside of the elliptical shape.

The circling axis may be defined based on the orientation of the target object. The circling axis may extend from the reference plane at the tilt angle in different directions. For example, the circling axis may be normal to the reference plane when the tilt angle is a right angle. Alternatively, the circling axis may be oblique to the reference plane when the tilt angle is an acute angle or an obtuse angle. The circling axis may be configured to extend in any direction in three-dimensional space depending on the tilt angle. In some embodiments, the circling axis may be normal to one or more planes. In other embodiments, the circling axis may be oblique to one or more planes. In some cases, the circling axis may intersect one or more planes. Alternatively, the circling axis may be parallel with one or more planes. One or more segments of the motion path may lie on the one or more planes, as described later in the specification.

In some embodiments, the shape and/or the orientation of the target object may change with one or more movement characteristics of the target object. The movement characteristics of the target object may comprise at least one of a velocity, an acceleration, and an attitude of the target object.

In some embodiments, the parameter(s) of the target object may include a position of the target object. The motion path may be generated based on the position of the target object. For example, the plurality of spatial points in the motion path may be defined relative to the position of the target object. The plurality of spatial points may be located away from the position of the target object. Optionally, at least one spatial point may be located at the position of the target object. For example, at least one spatial point may be located on a portion of the target object.

In some embodiments, the motion path may be three-dimensional such that the plurality of spatial points lie on more than one plane. For example, the plurality of spatial points may be defined such that the motion path forms a 3-D contour comprising two or more sections/segments lying on different planes. The contour may be a closed contour or an open contour. When the contour is an open contour, one or more sections of the contour may be unconnected to adjacent sections. The contour may have a regular shape or an irregular (amorphous) shape.

In a 3-D motion path, the plurality of spatial points may be configured to lie on a plurality of different planes. The planes may be disposed at different angles relative to one another. In some cases, two or more planes may be parallel with one another. In other cases, two or more planes may intersect with one another. In some embodiments, a first group of planes may be parallel with one another, and a second group of planes may intersect with one another.

In some embodiments, a first group of spatial points may be configured to lie on the first plane, and a second group of spatial points may be configured to lie on the second plane. The first plane and the second plane may be parallel with each other. Alternatively, the first plane and the second plane may intersect with each other at an angle. The angle may be an acute angle or an obtuse angle such that the first plane and the second plane are oblique to each other. In some cases, the angle may be a right angle such that the first plane and the second plane are perpendicular to each other.

In some embodiments, a plurality of vectors may be defined from the position of the target object to the plurality of spatial points. The position of the target object may serve as a reference point from which the plurality of vectors may be defined. Each vector may comprise a magnitude and a direction. The direction may be determined by an angle between the vector and a plane passing through the position of the target object. The plane may be a horizontal plane or a vertical plane. Alternatively, the plane may be oriented in any direction in six degrees of freedom with respect to the target object. The plurality of vectors may have different directions and lie on different planes.

The movable object may be configured to move along the motion path. For example, the movable object may be controlled by the motion controller and/or the user terminal to move along the motion path. The motion path may correspond to a flight trajectory or a portion of the flight trajectory.

Figure 4:
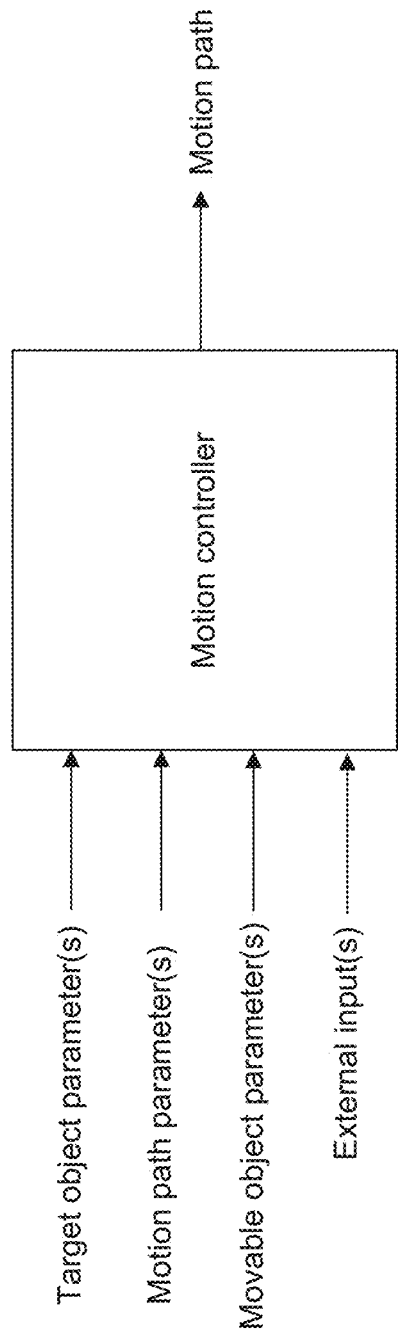
FIG. 4 shows a block diagram of a motion controller's inputs and output, in accordance with some embodiments.

FIG. 4 shows a block diagram of a motion controller's inputs and output, in accordance with some embodiments. As shown in FIG. 4, the motion controller may be configured to receive a plurality of signals. The plurality of signals may include: (1) target object parameter(s); (2) motion path parameter(s); (3) movable object parameter(s); and/or (4) external input(s). The motion controller may be configured to generate a motion path for a movable object based on one or more of the input signals.

The target object parameter(s) may include a longitude, a latitude, and/or an altitude of the target object. The longitude, latitude, and/or altitude can be used to determine a position of the target object in 3-D space. The target object parameter(s) may further include a vector corresponding to an imaginary axis extending from the target object. The vector/imaginary axis may be indicative of an orientation of the target object. In some cases, the vector/imaginary axis may pass through a center portion of the target object. The position of the target object may comprise a set of Cartesian coordinates of the target object in 3-D space. In some embodiments, the position of the target object may correspond to an accurately surveyed location having a set of known global spatial coordinates. In some embodiments, the position of the target object may be obtained from one or more global navigation satellite system (GNSS) positional measurements of the target object.

In some embodiments, the position of the target object may be determined using a single imaging device, or a plurality of imaging devices. For example, the position of the target may be determined using a single imaging device that is a time-of-flight (TOF) camera. A time-of-flight camera (TOF camera) may be a range imaging camera system that can resolve distances based on the known speed of light, by measuring the time-of-flight of a light signal between the camera and the subject for each point of the image. In some cases, tracking accuracy may be improved using a TOF camera. In some embodiments, a plurality of imaging devices may be used to obtain a stereo mapping of the target object's position in 3-D space.

The motion path parameter(s) may include a circling distance defined from the imaginary axis and/or the position of the target object. The circling distance may determine a size and/or shape of the motion path. For example, a small circling distance may result in a compact (shorter) motion path around the target object, whereas a large circling distance may result in an extended (longer) motion path around the target object. When the motion path is an ellipse, the major axis and the minor axis of the ellipse may be determined based on the circling distance. The circling distance may be constant or variable. When the circling distance is constant, the plurality of points in the motion path may lie on a same plane. Conversely, when the circling distance is variable, the plurality of points in the motion path may lie on one or more planes, and the motion path may be 2-D or 3-D. A user may set a maximum value and/or a minimum value that the circling distance may not exceed or fall below. The maximum value may ensure that the movable object is not moving too far from the target object. Conversely, the minimum value may ensure that the movable object is not moving too close to the target object. In some embodiments, a distance between each spatial point on the motion path to the position of the target object may be greater than a first predetermined distance and less than a second predetermined distance. The first predetermined distance and the second predetermined distance may define a zone within which the motion path may be located.

In some embodiments, the motion path parameter(s) may further include an entry point along the motion path. The movable object may be controlled to enter the motion path at the entry point, and start to navigate around and/or follow the target object by moving along the motion path. In some cases, the movable object need not travel along the entire length of the motion path, and may travel along only a portion of the motion path. In those cases, the motion path parameter(s) may include an angle of travel. The angle of travel may define the portion of the motion path that the movable object flies along. The angle of travel may be a value that is greater than 0 degrees. When the angle of travel is 180 degrees, the movable object may travel half of the motion path. When the angle of travel is 360 degrees, the movable object may travel along the entire motion path. When the angle of travel is 540 degrees, the movable object may travel 1.5× of the motion path. When the angle of travel is 720 degrees, the movable object may travel 2× of the motion path. When the angle of travel is less than 360 degrees, the movable object may move along a portion of the motion path that is less than the complete length of the motion path. For example, the angle of travel may define an arc along the motion path. A first end of the arc may be defined by the entry point, and a second end of the arc may be defined by an exit point. The movable object may be configured to enter the motion path at the first end of the arc, move along the arc, and exit the motion path at the second end of the arc.

In some embodiments, the motion path parameter(s) may further define a manner in which the movable object flies from its present location to the entry point of the motion path. For example, the movable object may first move vertically from its present location, and then horizontally towards the entry point. Optionally, the movable object may first move horizontally from its present location, and then vertically towards the entry point. Alternatively, the movable object may move in a diagonal manner (both horizontally and vertically) from its present location towards the entry point. The motion path from the present location to the entry point need not be straight. In some embodiments, the movable object may move in a curvilinear manner from its present location to the entry point, for example to avoid obstacles along the way or to counter weather effects (e.g., wind direction/speed, altitude pressure changes, etc.).

The movable object parameter(s) may include one or more motion characteristics with which the movable object moves along the motion path. The motion characteristics may include a velocity, acceleration, altitude, attitude, and/or orientation of the movable object along the motion path. The velocity may include linear velocity and/or angular velocity. Likewise, the acceleration may include linear acceleration and/or angular acceleration. The movable object may be configured to move along the motion path in accordance with the one or more motion characteristics.

The external input(s) may include input(s) provided by one or more users. The input(s) may be provided prior to movement of the movable object, or in real-time as the movable object moves along the motion path. The external input(s) may include a change to the positions of one or more spatial points along the motion path. In some embodiments, a user may change the positions of one or more spatial points using a computer-implemented graphical display. The motion path (and/or the plurality of spatial points thereon) may be visually depicted on the graphical display. A user may move one or more of the visually depicted spatial points between different locations on the graphical display, for example by using an input device (e.g., a mouse or a touchscreen). The movement of the spatial point(s) may cause the motion path to change. For example, a portion of the motion path that is proximate to the moved spatial point(s) may change based on the movement of the spatial point(s). Localized and dynamic movement of spatial point(s) can provide certain advantages for motion control. For example, a user may move one or more spatial points either prior to motion of the movable object or in real-time as the movable object is moving along the motion path, so that the movable object may avoid obstacles along the motion path. The entire motion path need not be regenerated when the spatial points are moved. Instead, localized regions of the motion path may be adjusted depending on the occurrence of obstacles in those regions.

In some embodiments, a power level of the movable object may be monitored when the movable object is moving along the motion path. The movable object may be controlled to depart from the motion path when the power level is less than a threshold power. For example, the movable object may be controlled to return to an initial start location. In some cases, the movable object may be controlled to travel to the position of the target object. In other cases, the movable object may be controlled to travel to a predetermined location. The predetermined location may or may not correspond to the initial start location or the position of the target object.

Figure 5:
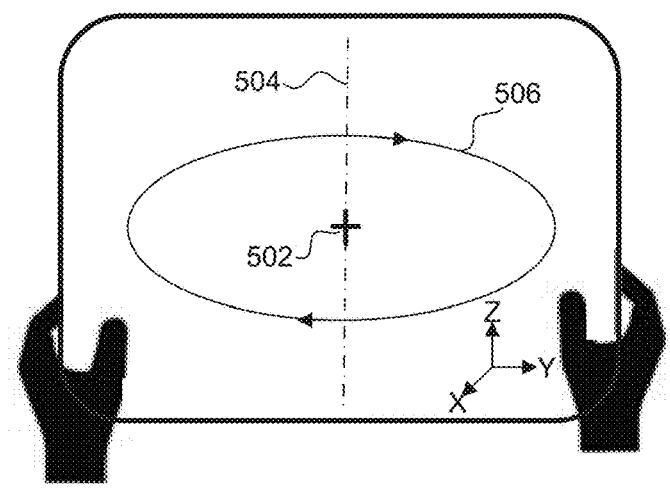
FIG. 5 shows an example of a user interface (UI) through which a user may cause an orientation of a motion path to change by tilting an axis of the motion path, in accordance with some embodiments.
Figure 5:
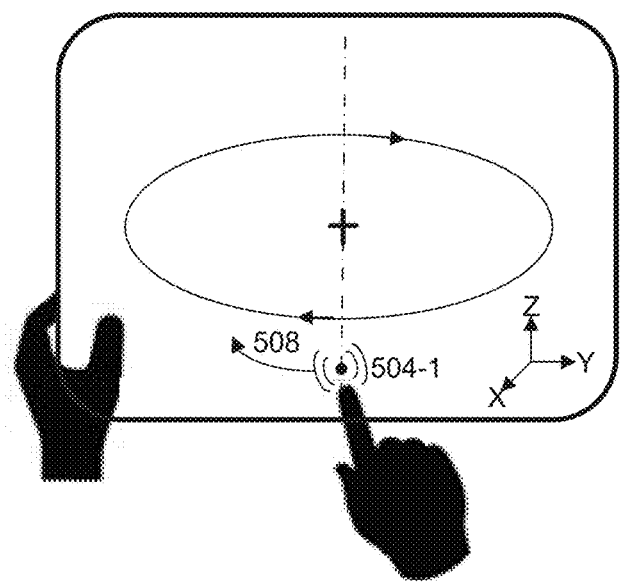
Figure 5:
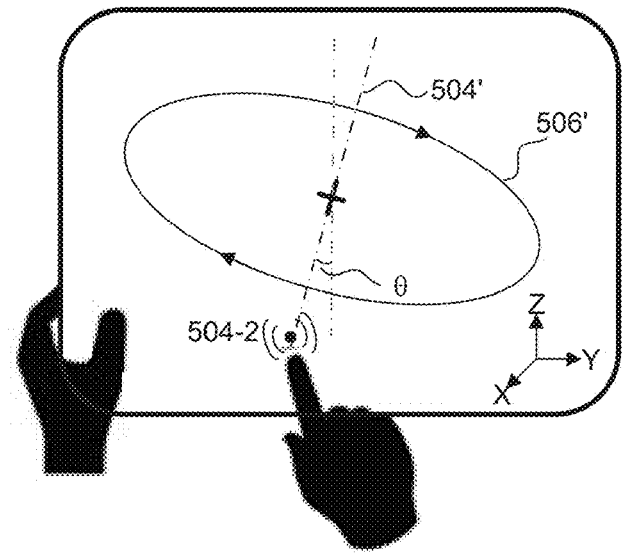

FIG. 5 shows an example of a user interface (UI) through which a user may cause an orientation of a motion path to change by tilting an axis of the motion path, in accordance with some embodiments. Part A shows an initial display of an environment comprising a target object and a motion path. Part B shows a user selecting a point along an axis and tilting the axis by moving the point to a different location on the display. Part C shows a motion path having a different orientation after the axis has been tilted.

Part A shows an initial display of an environment comprising a target object 502. An axis 504 may be defined extending through the target object. A motion path 506 may be defined relative to the position of the target object and the axis. The axis 504 may extend normally through a plane defined by the motion path. In some cases, the axis 504 may extend through a center of the plane defined by the motion path. The center of the plane may or may not coincide with the position of the target object. A movable object (not shown) may be configured to move along the motion path, so as to surround the target object. In Part A, the motion path may be in the shape of an ellipse, but need not be limited thereto. For example, the motion path may have any regular shape or irregular (amorphous) shape, and may be 2-D or 3-D.

In some embodiments, the display may be provided as an FPV (first person view). The FPV may include a live streaming image from an imaging device. The imaging device may be a payload of the movable object. The imaging device may be mounted on a body of the movable object. In some instances, the imaging device may be located remotely from the movable object at a different location. In some instances, the imaging device may be located on another movable object. The FPV may alternatively be a graphical depiction or representation of the image from the imaging device. The target object lies within the field of view of the imaging device. In some cases, the target object may be a stand-alone object. In other cases, the target object may be surrounded by or proximate to one or more other objects. The target object may be stationary and/or capable of movement. The movable object may be stationary or moving while the initial display of the environment is occurring.

Other types of views may be presented in alternative or in conjunction with the FPV. For instance, in some embodiments, a map view may be provided. The map view may include a 2-D map, such as an overhead map. The map view may include a 3-D map. The 3-D map may be alterable to view the 3-D environment from various angles. Solid renderings, wireframes, or other types of imaging may be shown, as described previously herein.

The display may be shown on a user terminal. A user may optionally hold the user terminal. The user may interact with the display by selecting different points or objects in the FPV. The user may also generate and/or modify a motion path for a movable object, by selecting different points or objects in the FPV.

Part B shows a user selecting a point 504-1 along the axis 504 and tilting the axis by moving the point 504-1 in a direction 508 on the display. The direction 508 may be a clockwise direction as seen from the user's point of view. The point 504-1 may lie anywhere along the axis 504. When the user selects the point 504-1, the axis 504 may be selected. The user may move the axis 504 in one or more degrees of freedom on the display. In some embodiments, when the image includes a 3-D map, the user may move the axis in six degrees of freedom by manipulating the axis in various configurations on the display. For example, the user can translate and/or rotate the axis along an X-axis, Y-axis, and/or Z-axis on the 3-D map.

Part C shows a motion path 506' having a different orientation after the axis 504 has been tilted. As shown in Parts B and C, a user may rotate the axis 504 by an angle θ in the direction 508, by moving the selected point 504-1 to another location 504-2. The rotation may result in a tilted axis 504'. As previously mentioned, the motion path may be defined relative to the position of the target object and the axis. When the orientation of the axis changes, the orientation of the motion path may change accordingly. As shown in Part C, the motion path 506' may be defined relative to the axis 504'. When the orientation of the motion path is changed from 506 to 506', the movable object may be configured to switch course and move along the motion path 506'.

In some embodiments, the change in orientation of the axis/motion path may be the same. For example, when the axis 504 is tilted by an angle θ, a plane defined by the motion path may also tilt by an angle θ in the same direction.

In some alternative embodiments, the change in orientation of the axis/motion path may be directly and/or inversely proportional. For example, when the axis 504 is tilted by an angle θ, a plane defined by the motion path may tilt by an angle φ (not shown). The angle φ may be less than or greater than angle θ, and may be in the same direction or in a different direction as the angle θ. For example, a relationship between the angle θ and the angle φ may be given by $\phi = n \cdot \theta$, where n may be a fraction or an integer, and may be positive or negative. In some cases, when n is less than 1, a large tilt in the axis may translate into a small change in orientation of the motion path. Conversely, when n is an integer greater than 1, a small tilt in the axis may translate into a large change in orientation of the motion path. A user may adjust the value of n based on motion control sensitivity/preferences. For example, a less experienced user may select n to be less than 1 (lower tilt sensitivity), whereas a more experienced user may select n to be greater than 1 (higher tilt sensitivity).

Figure 6:
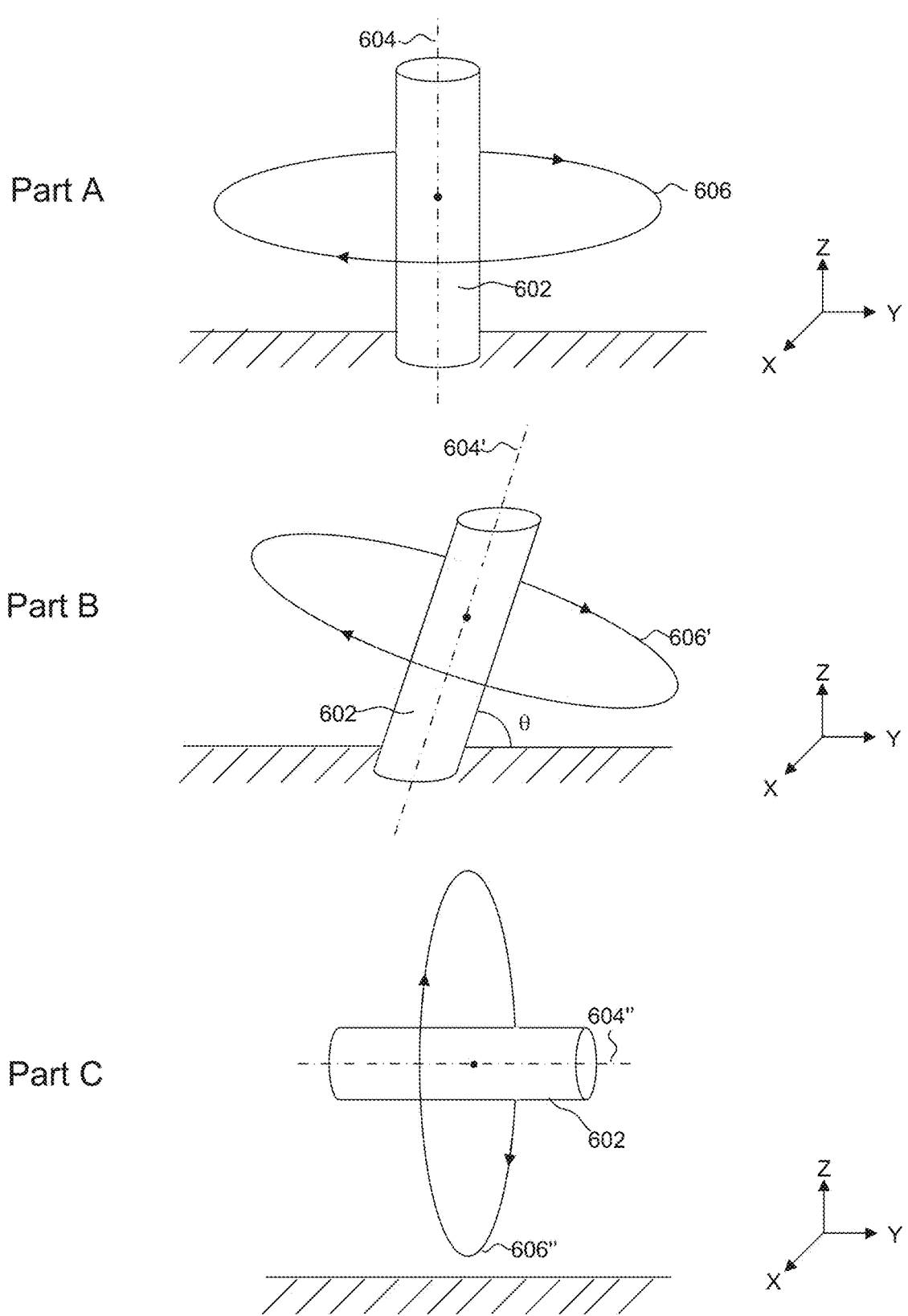
FIG. 6 shows examples of different motion paths that are defined based on different orientations of a target object, in accordance with some embodiments.

FIG. 6 shows examples of different motion paths that are defined based on different orientations of a target object, in accordance with some embodiments. Part A shows an environment comprising a target object 602. The target object may be a point of interest such as a building. An axis 604 may be defined extending through a length of the target object. The target object may be disposed perpendicular to a horizontal ground plane. As such, the axis may extend normal to the horizontal ground plane. A motion path 606 may be defined relative to a position of the target object and the axis. The axis may extend normally through a plane defined by the motion path. In some cases, the axis may extend through a center of the plane defined by the motion path. The center of the plane may or may not coincide with the position of the target object. A movable object may be configured to move along the motion path, so as to surround the target object. In Part A, the motion path may be in the shape of an ellipse, but need not be limited thereto. For example, the motion path may have any regular shape or irregular (amorphous) shape, and may be 2-D or 3-D random curve.

In Part B, the target object may have a different orientation from that shown in Part A. In Part B, the target object 602 may be tilted by an angle θ relative to the horizontal ground plane. Accordingly, an axis 604' extending through the length of the target object may be tilted by the angle θ relative to the horizontal ground plane. As previously mentioned, the motion path may be defined relative to the position of the target object and the axis. When the orientation of the axis/target object changes, the orientation of the motion path may change accordingly. As shown in Part B, a motion path 606' may be defined relative to the axis 604'. A plane defined by the motion path 606' may be tilted by the angle θ in the same direction. Accordingly, the motion path can be configured/adjusted to account for changes in orientation of the target object.

In some embodiments, the target object need not be located on a horizontal ground plane. For example, as shown in Part C, the target object 602 may be freely disposed within a spatial environment. The target object may be stationary, hovering, or moving in the spatial environment (e.g., an aerial vehicle). An axis 604" may be defined extending through a length of the target object. A motion path 606" may be defined relative to a position of the target object and the axis 604". The axis may extend normally through a plane defined by the motion path. A movable object may be configured to move along the motion path 606", so as to surround the target object. Part C shows that the orientation of the motion path can be modified in any manner in 3-D space depending on the orientation of the target object, and need not be limited to target objects located on a ground plane.

In some embodiments, a method for controlling a movable object may be implemented using a motion controller and/or a user terminal. The method may comprise: determining, for the movable object at a first spatial point, a second spatial point relative to at least one target object; and generating a motion path for the movable object from the first spatial point to the second spatial point.

The method may further comprise dynamically adjusting the second spatial point based on a user input. The user input may be indicative of a change to the second spatial point, and/or a change between the first spatial point and the second spatial point. The user input may be provided by one or more users using a computer-implemented graphical display. The first spatial point and the second spatial point may be visually depicted on the computer-implemented graphical display. The user input may comprise moving the visually depicted first spatial point and/or the second spatial point between different locations on the computer-implemented graphical display. The motion path may be automatically updated based on the change to the second spatial point, and/or the change between the first spatial point and the second spatial point. The movable object may be configured to move along the updated motion path.

In some cases, the movable object may be predicted to pass through the first spatial point at time t1 and the second spatial point at time t2, wherein t2 is a point in time occurring after t1. The second spatial point may be determined based on one or more motion characteristics with which the movable object passes through the first spatial point. The one or more motion characteristics may comprise at least a velocity or an acceleration of the movable object. The motion path may be generated relative to the target object.

A first vector may be defined from the position of the target object to the first spatial point, and a second vector may be defined from the position of the target object to the second spatial point. The first vector and the second vector may be configured to lie on one or more planes. For example, in some embodiments, the first vector and the second vector may lie on a same plane. In other embodiments, the first vector and the second vector may lie on different planes. The first vector may lie on a first plane and the second vector may lie on a second plane. The first plane and the second plane may have different orientations. The first plane may be parallel with the second plane. Alternatively, the first plane may intersect with the second plane. The second spatial point may be dynamically adjusted to a third spatial point based on a user input. The user input may be indicative of a change to the second spatial point, and/or a change between the first spatial point and the second spatial point. A third vector may be defined from the target object to the third spatial point. The third vector may lie on a third plane. The third plane and the second plane may have different orientations. In some cases, the third plane may be parallel with the second plane. Alternatively, the third plane may intersect with the second plane.

Figure 7:
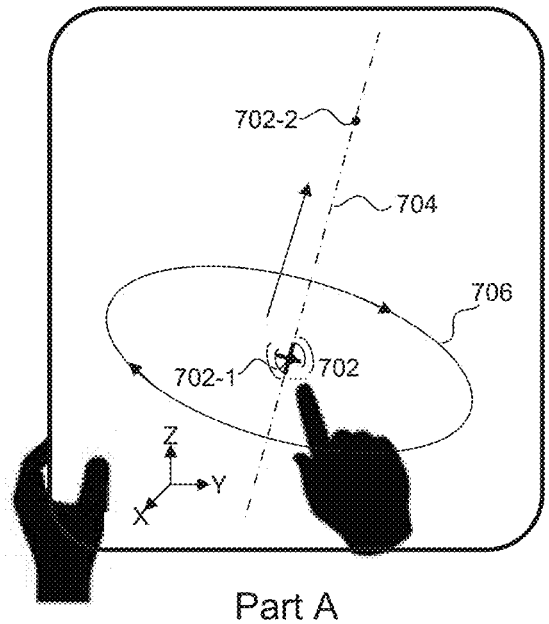
FIG. 7 shows an example of a user interface (UI) through which a user may select/move a point and cause a position of a motion path to change, in accordance with some embodiments.
Figure 7:
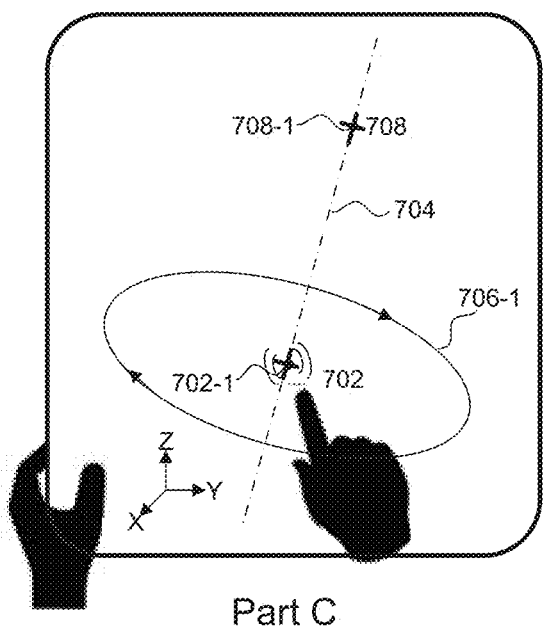
Figure 7:
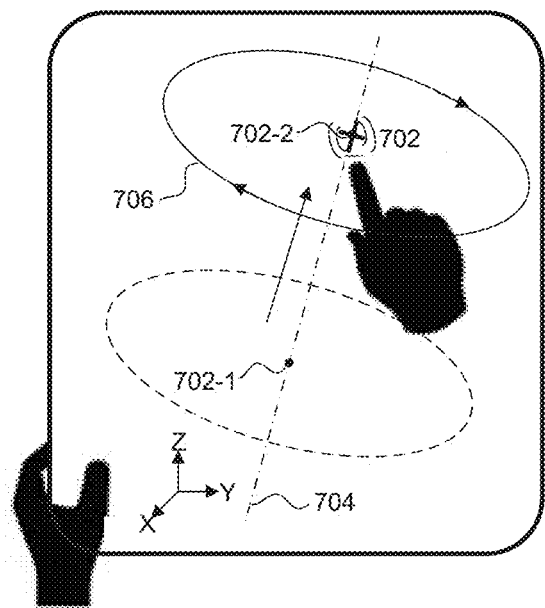
Figure 7:
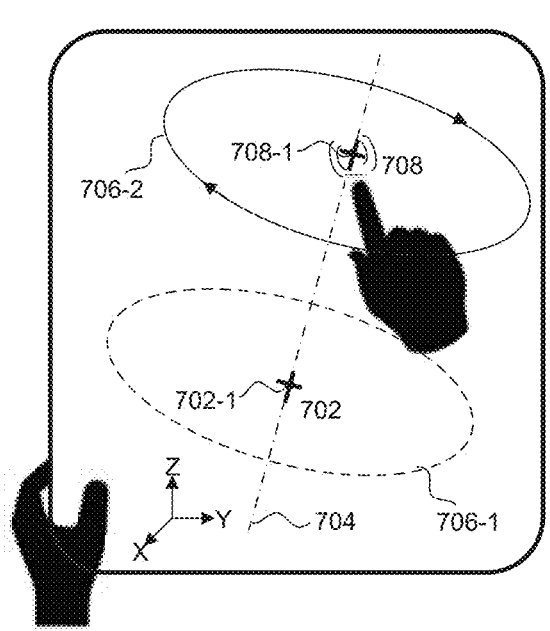

FIG. 7 shows an example of a user interface (UI) through which a user may select/move a point and cause a position of a motion path to change, in accordance with some embodiments. For example, a user may dynamically adjust the position of the motion path based on a position of a moving target object. Part A shows an initial display of an environment comprising a target object and a motion path. Part B shows a user selecting and moving a point corresponding to the target object, so as to move the motion path to a different location to track the target object.

Part A shows an initial display of an environment comprising a target object 702. A first spatial point 702-1 may be visually depicted on the display and may be indicative of an initial position of the target object. An axis 704 may be defined extending through the target object. A motion path 706 may be defined relative to the initial position of the target object and the axis. The axis may extend normally through a plane defined by the motion path. In some cases, the axis may extend through a center of the plane defined by the motion path. The center of the plane may or may not coincide with the position of the target object. A movable object may be configured to move along the motion path, so as to surround the target object. In Part A, the motion path may be in the shape of an ellipse, but need not be limited thereto. For example, the motion path may have any regular shape or irregular (amorphous) shape, and may be 2-D or 3-D.

The target object 702 may be capable of movement along and/or about one or more axes. For example, the target object may be capable of translation and/or rotation, along and/or about one or more axes. The axes may be orthogonal to one another, oblique to one another, parallel to one another, or any combination of the above.

In some embodiments, the target object may move from the first spatial point 702-1 to a second spatial point 702-2. A user may adjust a position of the motion path 706 such that the movable object continues to surround and/or track the moving target object. As shown in Parts A and B, a user may select the first spatial point 702-1 which may cause the motion path to be selected. Next, the user may move the motion path to track the moving target object, for example by either selecting the second spatial point 702-2, or by 'sliding' from the first spatial point 702-1 to the second spatial point 702-2 on the display. As shown in Part B, a motion path 706' may be defined relative to the second spatial point 702-2. In some embodiments, the position of the motion path may be adjusted automatically when the target object moves, without requiring any further input from the user. For example, an imaging device on the movable object may track the movement of the target object, and automatically adjust the position of the motion path based on the tracked movement.

In some embodiments, the second spatial point may be adjusted relative to one or more axes of movement of the target object. For example, the second spatial point may be dynamically adjusted when the target object moves. The second spatial point may be adjusted in proportion to a change in the position of the target object. In some instances, the motion path may be regenerated based on the dynamically adjusted second spatial point. The movable object may be configured to follow the target object along the regenerated motion path as the target object moves along the motion path.

In some embodiments, the first spatial point and the second spatial point may both lie along the axis 704. In other embodiments, the first spatial point may lie along the axis 704, and the second spatial point may lie along another axis that is different from the axis 704. For example, the first spatial point and the second spatial point may not lie on a same axis (axis 704) if the target object changes its orientation when moving from the first spatial point to the second spatial point. The target object may be capable of translation and/or rotation along and/or about one or more axes. In some cases, the target object may simultaneously (or sequentially) translate and rotate while moving from the first spatial point to the second spatial point. The rotation may cause an orientation of the target object to change. As previously described in FIGS. 5 and 6, a change in orientation of the target object may result in a change in orientation of the motion path relative to the target object.

Figure 8:
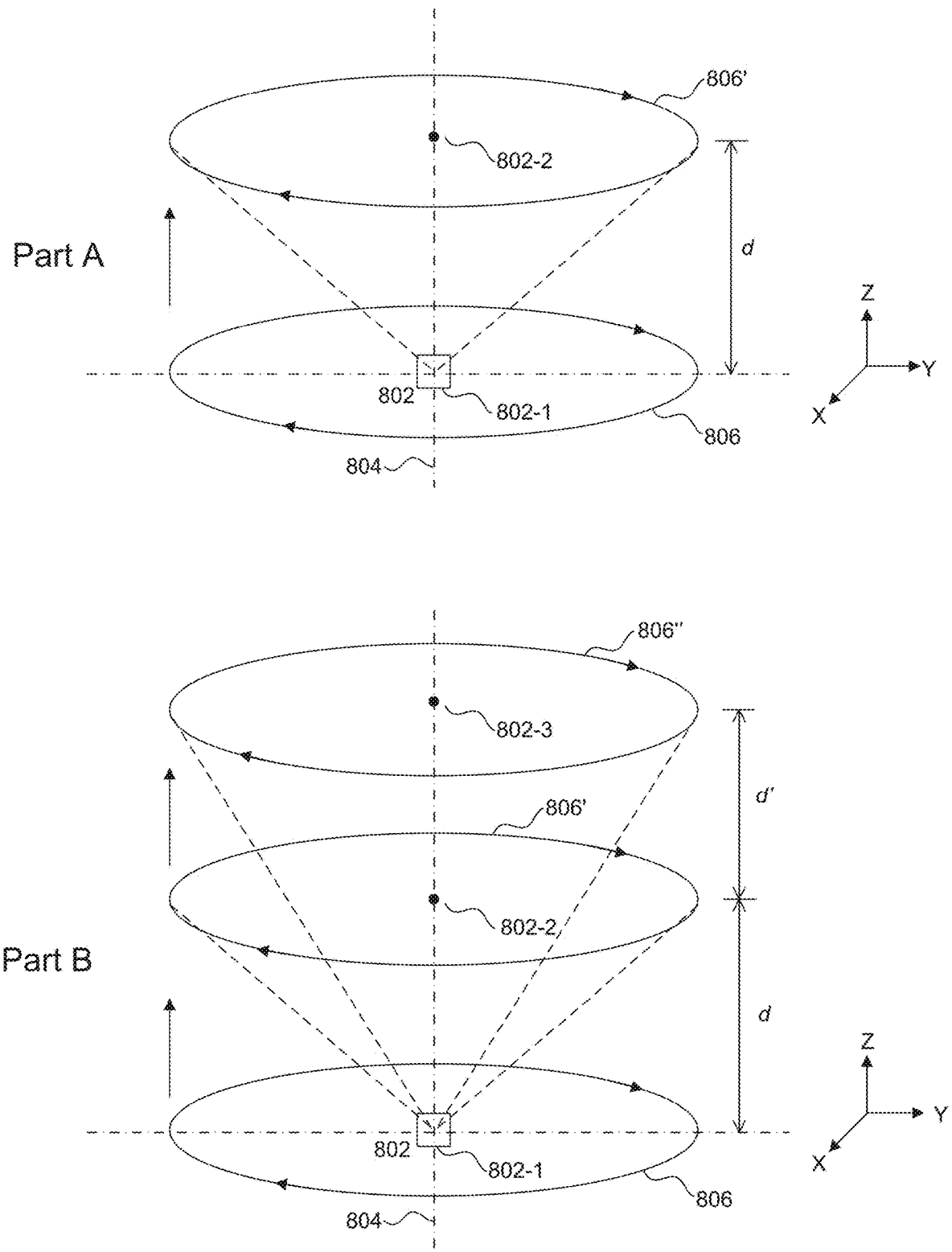
FIG. 8 shows examples of motion paths that are defined relative to a target object as the target object moves along an axis, in accordance with some embodiments.

FIG. 8 shows examples of motion paths that are defined relative to a target object as the target object moves along an axis, in accordance with some embodiments. In Part A, a target object 802 may be initially at a first position 802-1. An axis 804 may be defined extending through the target object. A motion path 806 may be defined relative to the first position of the target object and the axis. The axis may extend normally through a plane defined by the motion path.

The target object may move from the first position 802-1 to a second position 802-2. The second position 802-2 may also lie along the axis 804. In some alternative embodiments, the second position 802-2 need not lie along the axis 804, and may lie on another axis that extends in a different direction. The first position 802-1 and the second position 802-2 may be separated by a distance d. When the target object moves from the first position to the second position, a position of the motion path 806 may change such that the motion path may be defined relative to the second position. As shown in Part A, a motion path 806' may be defined relative to the second position and the axis 804, and may be offset from the first position by the distance d. The movable object may switch its course from the motion path 806 to the motion path 806', and continue to surround the target object by moving along the motion path 806'.

In some instances, the target object may continue to move along the axis 804. As shown in Part B, the target object may move from the second position 802-2 to a third position 802-3. The third position 802-3 may also lie along the axis 804. In some alternative embodiments, the third position 802-3 need not lie along the axis 804, and may lie on another axis that extends in a different direction. The third position 802-3 may be separated from the second position 802-2 by a distance d'. The distance d' may be the same or different from the distance d. When the target object moves from the second position to the third position, a position of the motion path 806' may change such that the motion path is defined relative to the third position. As shown in Part B, a motion path 806" may be defined relative to the third position, and may be offset from the second position by the distance d'. The movable object may switch its course from the motion path 806' to the motion path 806", and continue to surround the target object by moving along the motion path 806".

In some embodiments, a motion path may be dynamically adjusted based on different selected target objects. For example, referring to part C of FIG. 7, a first target object 702 may be located at a first position 702-1, and a second target object 708 may be located at a second position 708-1. In Part C, when a user selects a point corresponding to the first position 702-1 on the display, a first motion path 706-1 may be defined relative to the first position (first target object 702) and the axis 704. A movable object may be configured to surround the first target object by moving along the first motion path 706-1.

The user may next select a new target object. For example, as shown in Part D, when a user selects a point corresponding to the second position 708-1 on the display, a second motion path 706-2 may be defined relative to the second position (second target object 708) and the axis 704. The movable object may be configured to switch course from the first motion path to the second motion path. The movable object may surround the second target object by moving along the second motion path 706-2. Accordingly, by selecting different target objects, a user may generate a plurality of motion paths. Each motion path may be defined relative to the respective selected target object.

In some embodiments, the first target object and the second target object may be different physical objects. For example, each of the first target object and the second target object may be a discrete object. The first target object and the second target object may or may not be coupled to each other. In some cases, the first target object and the second target object may lie on a same physical structure. In other cases, the first target object and the second target object may lie on different physical structures.

In some embodiments, the first target object may correspond to a first point of interest and the second target object may correspond to a second point of interest. Alternatively, the first target object may correspond to a first feature point and the second target object may correspond to a second feature point.

The motion path 706-1 may be generated based on the position of the first target object when the first target object is selected on the display. A first plurality of spatial points in the motion path may be defined relative to the position of the first target object. The first plurality of spatial points may permit the movable object to move in a predetermined configuration relative to the first target object. For example, the first plurality of spatial points may permit the movable object to orbit the first target object.

In some cases, the motion path may be updated based on the position of the second target object when a selection of the target object is changed from the first target object to the second target object. The updated motion path may comprise a second plurality of spatial points that are defined relative to the position of the second target object. The second plurality of spatial points may permit the movable object to move in a predetermined configuration relative to the second target object. The second plurality of spatial points may permit the movable object to travel around the second target object. A vector may be defined between the position of the first target object and the position of the second target object. The vector may comprise a magnitude and a direction. The motion path may be updated based on the magnitude and the direction of the vector.

Figure 9:
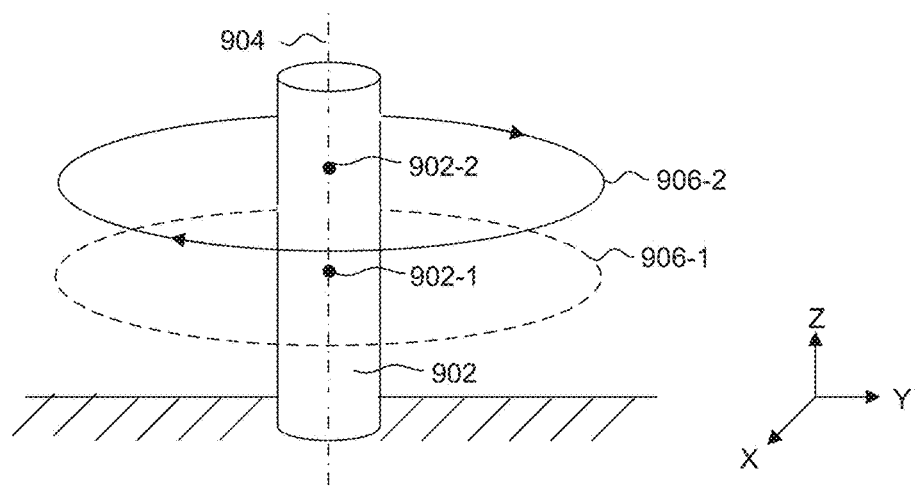
FIG. 9 shows examples of motion paths that are defined relative to different selected points along a same axis on a target object, in accordance with some embodiments.
Figure 9:
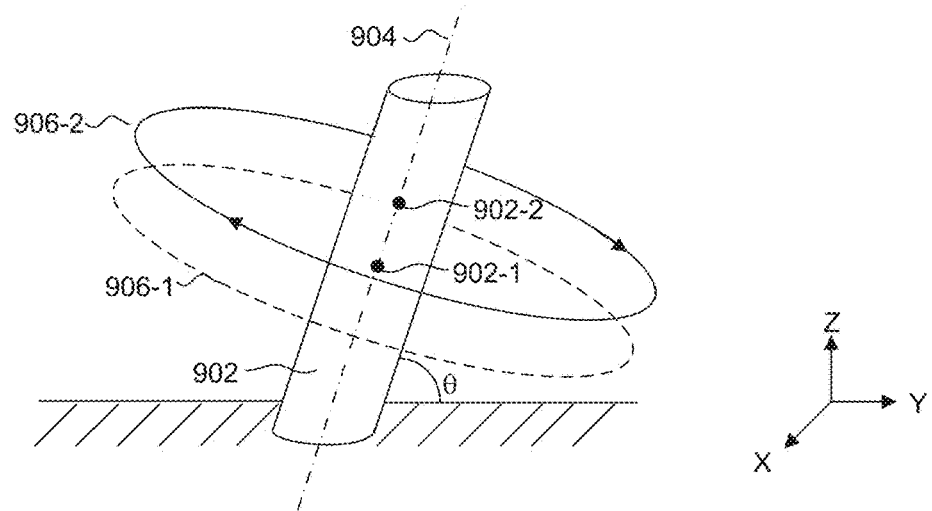
Figure 9:
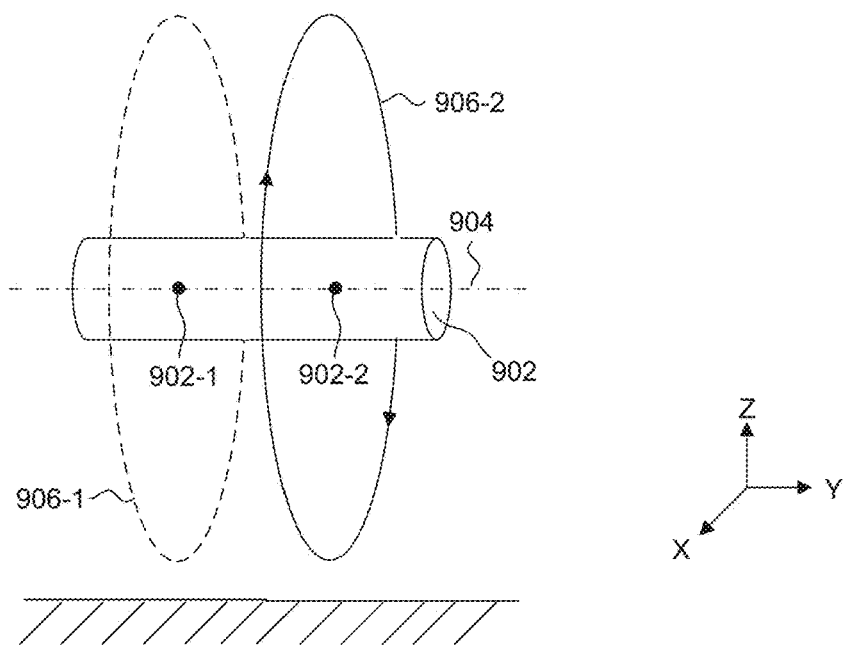

FIG. 9 shows examples of motion paths that are defined relative to different selected points along a same axis on a target object, in accordance with some embodiments. FIG. 9 may be similar to FIG. 6 except for the following differences.

In FIG. 9, a first motion path 906-1 may be defined relative to a first point 902-1, and a second motion path 906-2 may be defined relative to a second point 902-2. The first point 902-1 and the second point 902-2 may lie along a same axis (e.g., axis 904). The first point 902-1 and the second point 902-2 may also lie on a same physical object. For example, the first point 902-1 and the second point 902-2 may be different feature points on a same object (e.g., target object 902).

The orientation of the first motion path and the second motion path may depend on an orientation of the axis 904. In Part A, the axis may extend normally from a horizontal ground plane, and the planes defined by the first motion path and the second motion path may be parallel to the horizontal ground plane. The planes may be 2-D or 3-D. In Part B, the axis may be tilted at an angle θ relative to the horizontal ground plane, which causes the planes defined by the first motion path and the second motion path to also tilt at the angle θ. In Part C, the axis may extend parallel to a horizontal ground plane, and the planes defined by the first motion path and the second motion path may be perpendicular to the horizontal ground plane. As shown in FIG. 9, a plurality of motion paths may be generated for different points (e.g., feature points) on a same object. Each motion path may be defined based on a point and an axis extending through the point. The orientation of each motion path may vary according to the orientation of the axis extending through the corresponding point (e.g., points 902-1 and 902-2).

Figure 10:
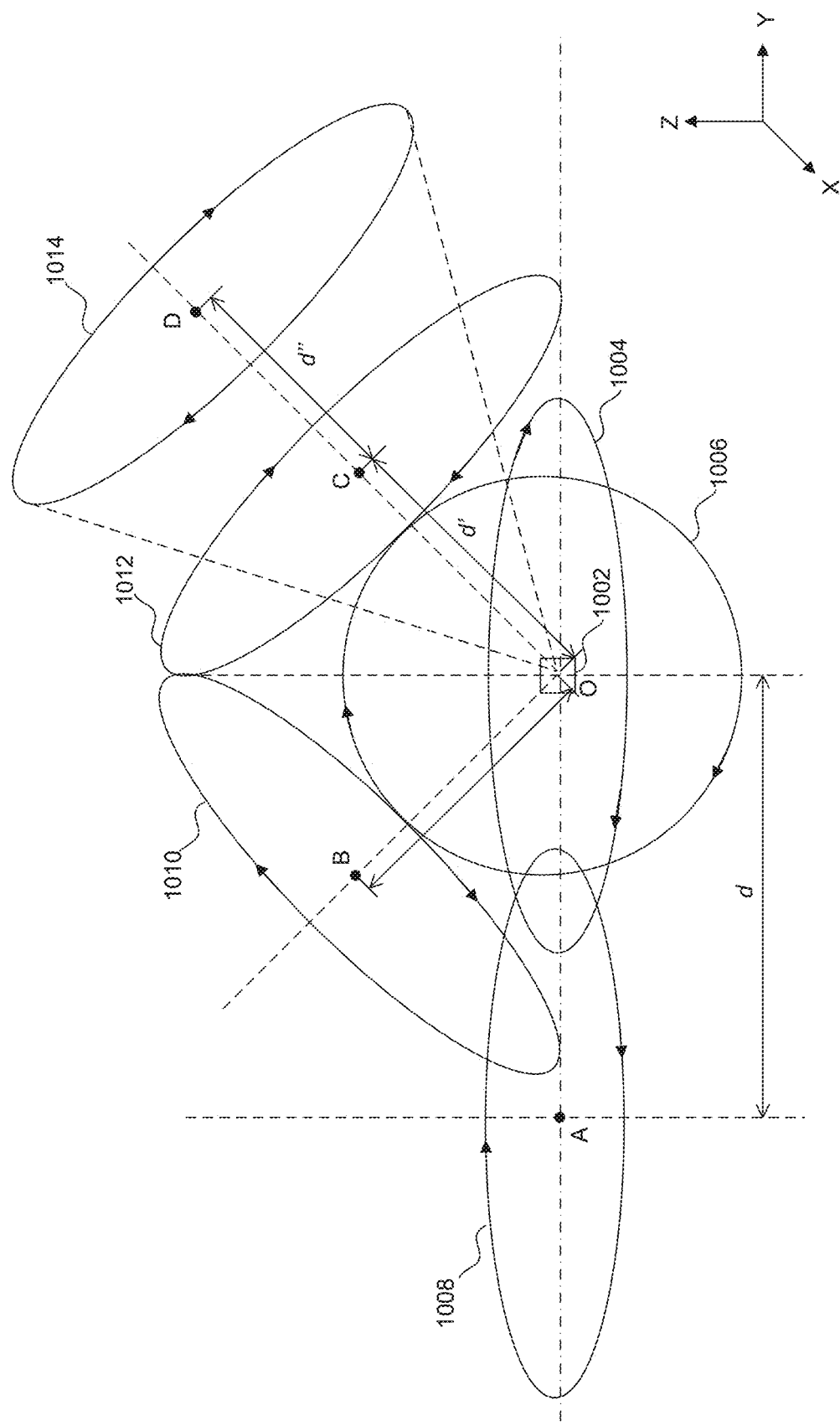
FIG. 10 shows examples of motion paths that are defined relative to different selected points along different axes extending through a target object, in accordance with some embodiments.

FIG. 10 shows examples of motion paths that are defined relative to different selected points along different axes extending through a target object, in accordance with some embodiments. Referring to FIG. 10, a plurality of motion paths may be defined for a target object 1002. The plurality of motion paths may comprise motion paths 1004, 1006, 1008, 1010, 1012, and 1014. The motion path 1004 may be defined relative to a Z-axis extending through a point O of the target object. The Z-axis may extend normal to a plane defined by the motion path 1004. The motion path 1006 may be defined relative to an X-axis extending through the point O. The X-axis may extend normal to a plane defined by the motion path 1006. The motion path 1008 may be defined relative to an axis parallel to the Z-axis that extends through a point A. The motion path 1008 may be similar to the motion path 1004, except the motion path 1008 is offset from the point O along the Y-axis by a distance d. The motion path 1010 may be defined relative to a first oblique axis and a point B. The point B may be offset from the point O along the first oblique axis by a distance d'. The first oblique axis may extend at a negative angle θ to the Z-axis and pass through the point B. The first oblique axis may extend normal to a plane defined by the motion path 1010. The motion path 1012 may be defined relative to a second oblique axis and a point C. The point C may be offset from the point O along the second oblique axis by a distance d'. The second oblique axis may extend at a positive angle θ to the Z-axis and pass through the point C. The second oblique axis may extend normal to a plane defined by the motion path 1012. It may be noted that the motion path 1012 mirrors the motion path 1010 along the Z-axis, since the first and second oblique axes mirror each other along the Z-axis. The motion path 1014 may be defined relative to the second oblique axis and a point D. The point D may be offset from the point C along the second oblique axis by a distance d". Accordingly, the motion path 1014 may be offset from the point C along the second oblique axis by the distance d". Any number and/or orientation of motion paths in six degrees of freedom may be contemplated.

Figure 11:
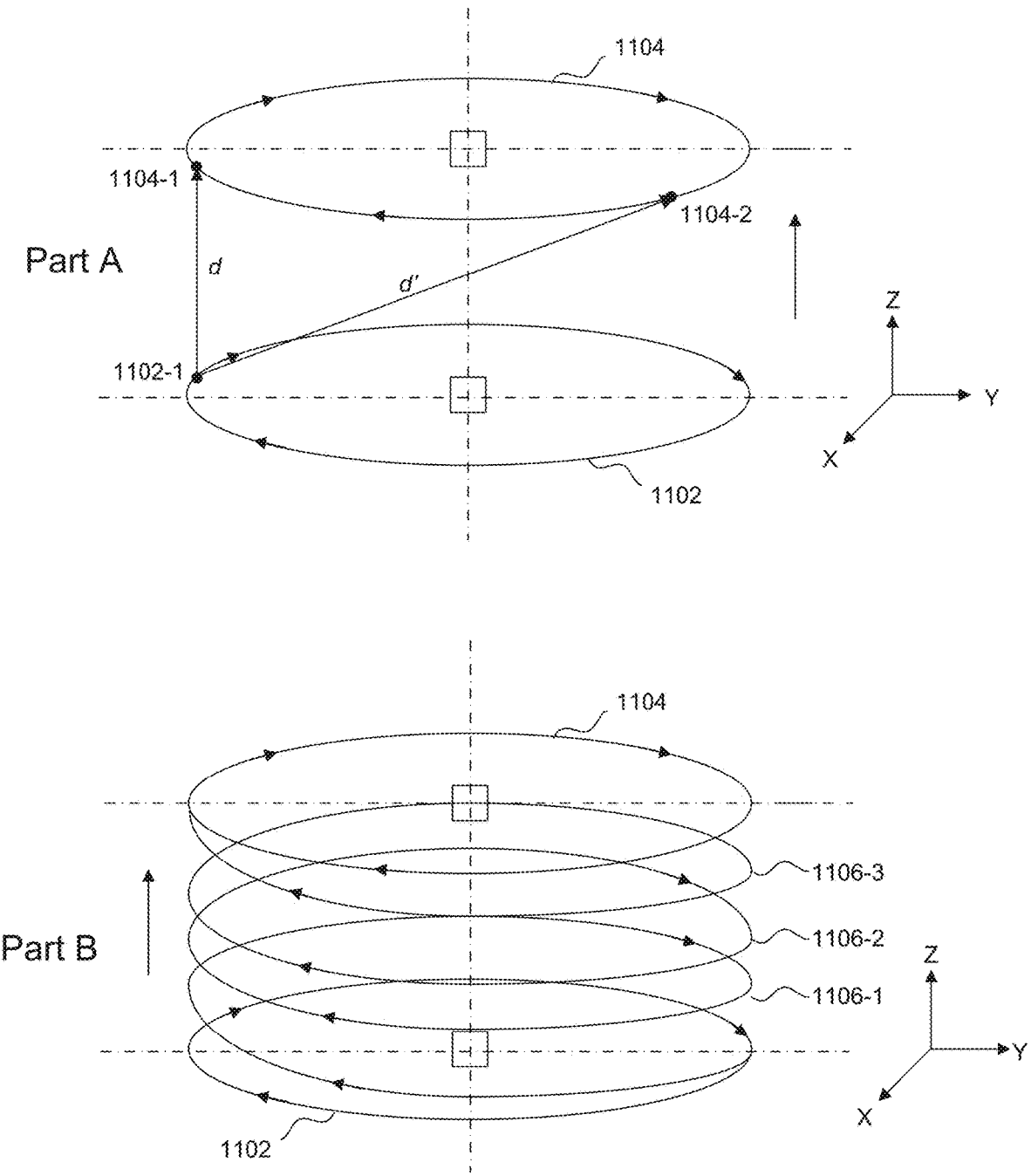
FIG. 11 shows examples of how a movable object may move from one motion path to another motion path, in accordance with some embodiments.

FIG. 11 shows examples of how a movable object may move from one motion path to another motion path, in accordance with some embodiments. In Part A, a movable object may move from a first motion path 1102 to a second motion path 1104, by moving directly from a point 1102-1 on the first motion path to a point 1104-1 on the second motion path. In some embodiments, a distance d between the points 1102-1 and 1104-1 may correspond to a shortest distance between the first motion path and the second motion path. In some embodiments, the movable object may travel directly from the point 1102-1 on the first motion path to a point 1104-2 on the second motion path. A distance d' between the points 1102-1 and 1104-2 may be greater than the distance d between the points 1102-1 and 1104-1.

In some embodiments, a movable object may move in a spiral path from the first motion path to the second path. As shown in Part B, a spiral path may comprise a plurality of path segments 1106-$n$, where n may be an integer greater than 1. In Part C, n may be 3 such that there are three path segments 1106-1, 1106-2, and 1106-3. Each path segment may be successively joined to the next path segment. In some embodiments, the number of path segments may vary according to a speed at which the target object moves from the first motion path to the second motion path, and/or a speed at which the movable object moves along the spiral path.

Figure 12:
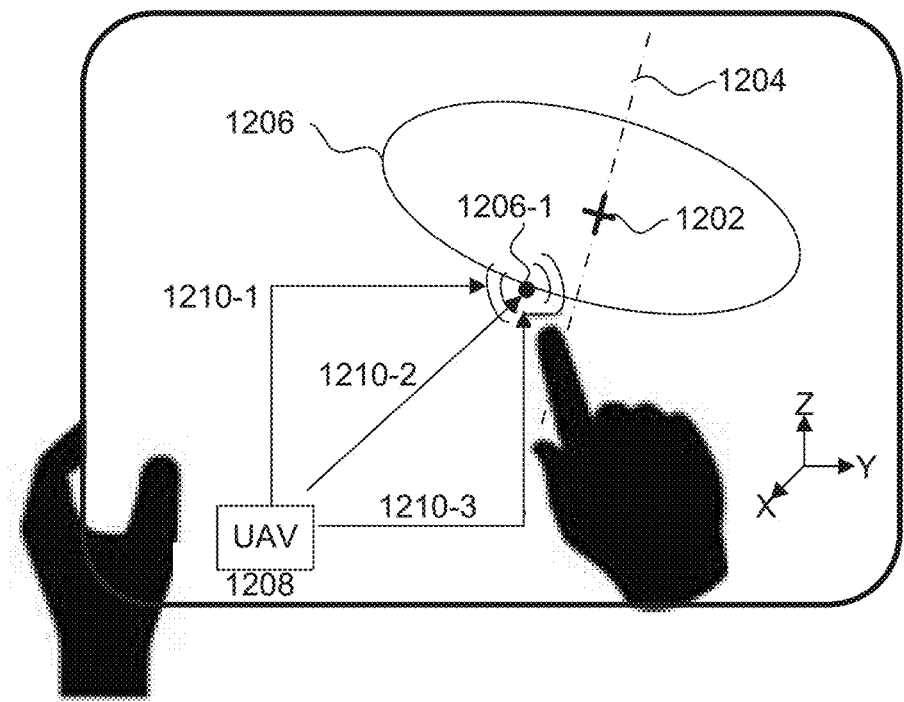
FIG. 12 shows an example of a user interface (UI) through which a user may control a movable object to fly from an initial location to an entry point on a motion path, in accordance with some embodiments.
Figure 12:
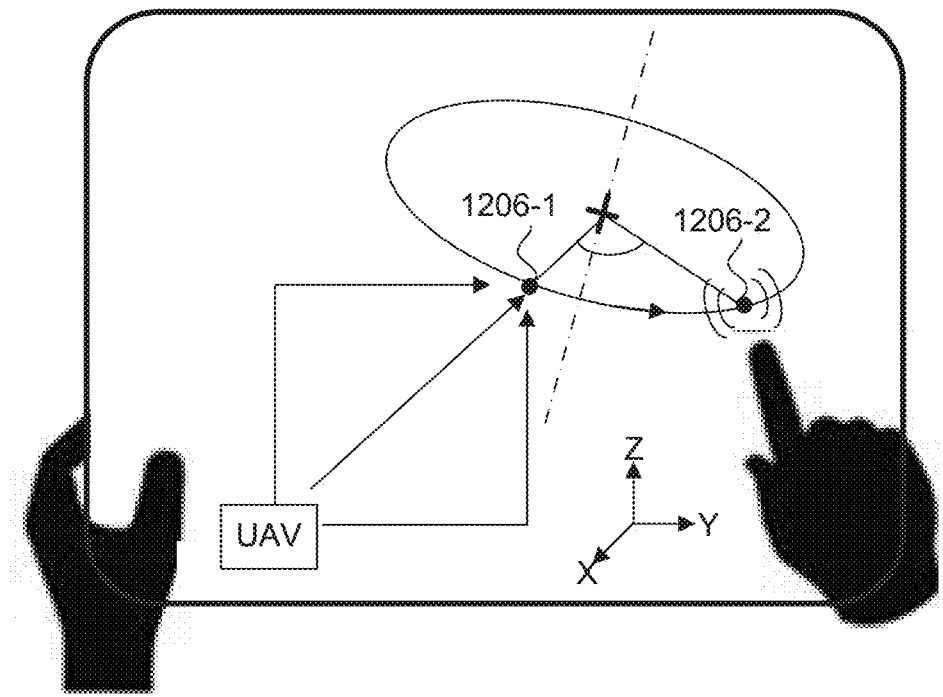

FIG. 12 shows an example of a user interface (UI) through which a user may control a movable object to travel from an initial location to an entry point on a motion path, in accordance with some embodiments.

As shown in Part A, a motion path 1206 may be defined relative to a target object 1202 and axis 1204 extending through the target object. A user may control the movable object to move from an initial position 1208 to an entry point 1206-1, by selecting the entry point on the display. The initial position 1208 may or may not lie on the motion path. The entry point may be a spatial point that lies along the motion path.

The movable object may be controlled to travel from the initial position 1208 to the entry point 1206-1 via different motion paths. For example, in some embodiments, the movable object may be configured to travel vertically from the initial location and then horizontally to the entry point (1210-1). In other embodiments, the movable object may be configured to travel horizontally from the initial location and then vertically to the entry point (1210-2). In some further embodiments, the movable object may be configured to simultaneously travel horizontally and vertically from the initial location to the entry point (1210-3). Optionally, the movable object may be configured to travel in a curvilinear manner from the initial location to the entry point.

In some embodiments, when the movable object is moving vertically, an ascent velocity or a descent velocity may be automatically controlled, or controlled by a user. Similarly, when the movable object is moving horizontally, a horizontal velocity may be automatically controlled, or controlled by a user. The movable object may be configured to move along the motion path starting from the entry point.

In some embodiments, a user may further control the movable object to travel along a portion of the motion path. For example, as shown in Part B, the user may select an exit point 1206-2. The movable object may be controlled to enter the motion path at the entry point and exit the motion path at the exit point. In some cases, the movable object may travel along an arc or a chord between the entry point and the exit point. A center of the arc may be located at the position of the target object. The arc may have an angle greater than 0 degrees. In some cases, the arc angle may be input by the user. Optionally, the arc angle may be automatically generated, for example by a motion controller.

As previously described, the position and/or orientation of a motion path may be adjusted by manipulating one or more points (and/or axes) on a display. In some embodiments, a size, shape, and/or geometry of the motion path may be adjusted by manipulating one or more points on the display, as described below with reference to FIGS. 13-18.

Figure 13:
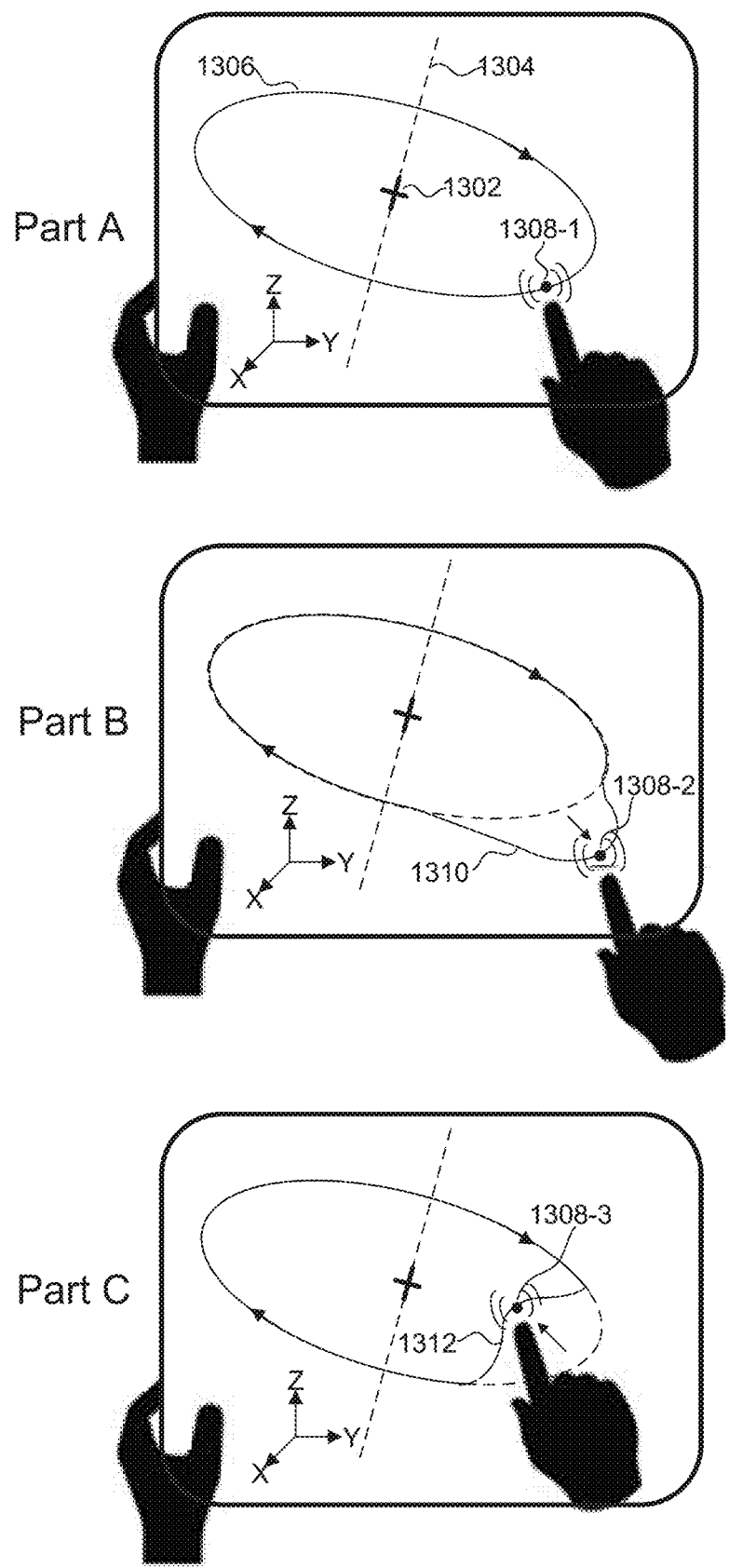
FIG. 13 shows an example of a user interface (UI) through which a user may select/move a point to adjust a shape of a local region of a motion path, in accordance with some embodiments.

FIG. 13 shows an example of a user interface (UI) through which a user may select/move a point to adjust a shape of a local region of a motion path, in accordance with some embodiments.

As shown in Part A, a motion path 1306 may be defined relative to a target object 1302 and an axis 1304 extending through the target object. A user may adjust a size/shape of a local region of the motion path. For example, the user may select a spatial point at a first location 1308-1 (Part A) and move the spatial point outward to a second location 1308-2 (Part B). The outward movement of the spatial point may result in a protrusion 1310 being formed in a local region of the motion path. The local region may be proximate to the spatial point that is moved.

In some embodiments, the user may select the spatial point at the first location 1308-1 (Part A) and move the spatial point inward to a third location 1308-3 (Part C). The inward movement of the spatial point may result in a depression 1312 being formed in a local region of the motion path.

The movement of any spatial point along the motion path in any direction may be contemplated. A user may manipulate one or more spatial points along the motion path to generate any desired size, shape, and/or geometry of the motion path. The adjustment of spatial points in a local region may serve practical purposes, for example, to control the motion path of the movable object to avoid obstacles that may be present in the local region.

In the example of FIG. 13, the movement of the spatial point may be in-plane such that the motion path remains in 2-D form, even though the shape/geometry/size of the motion path may be changed by the movement of the spatial point. The out-of-plane movement of spatial points along the motion path will be described in detail later in the specification, for example with reference to FIGS. 18 and 22.

Figure 14:
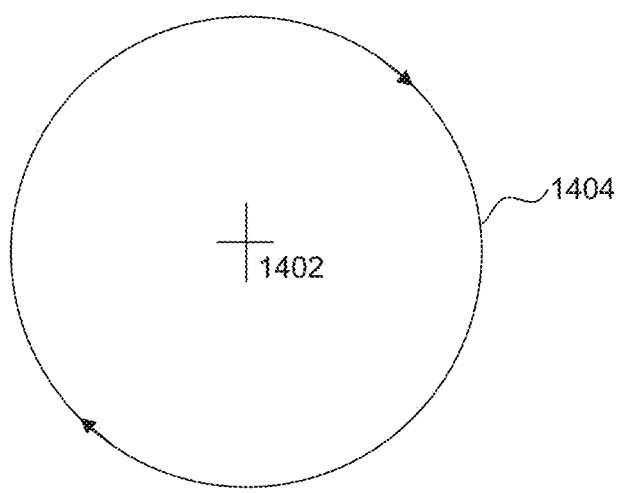
FIG. 14 shows an example of a change in a motion path by selecting and moving different points along the motion path, in accordance with some embodiments.
Figure 14:
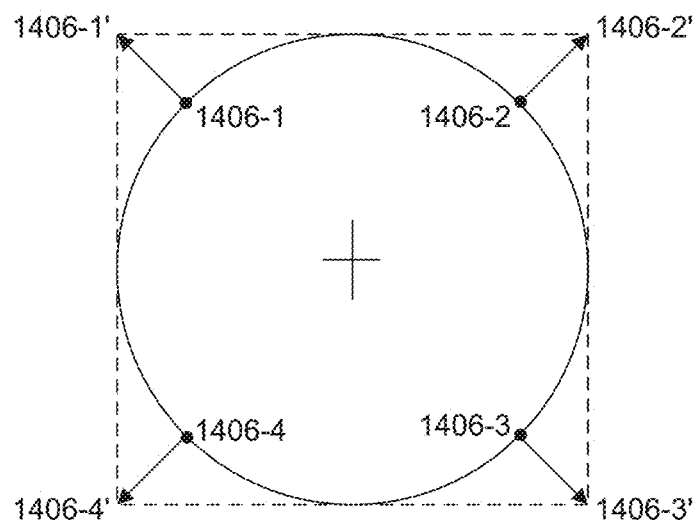
Figure 14:
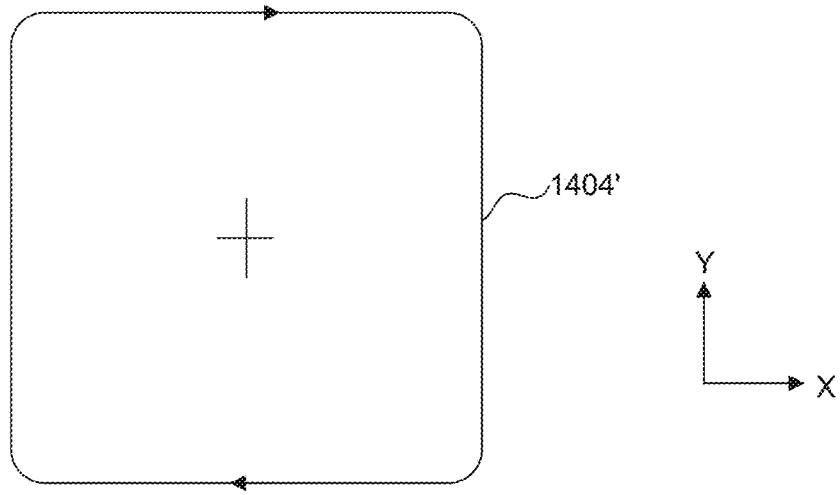

FIG. 14 shows an example of a change in a motion path by selecting and moving different points along the motion path, in accordance with some embodiments. In Part A, a motion path 1404 may be defined relative to a target object 1402. The motion path 1404 may have a circular shape, but need not be limited thereto. For example, the motion path 1404 may have any regular shape or irregular (amorphous) shape. A user may adjust a size/shape/geometry of the motion path by selecting and moving different spatial points that are located along the motion path 1404. For example, as shown in Part B, the user may select and move: (1) a first spatial point from a location 1406-1 to a location 1406-1'; (2) a second spatial point from a location 1406-2 to a location 1406-2'; (3) a third spatial point from a location 1406-3 to a location 1406-3'; and (4) a fourth spatial point from a location 1406-4 to a location 1406-4'. The outward movement of the first spatial point, second spatial point, third spatial point, and fourth spatial point may cause the motion path to change from a circular shape (1404 in Part A) to a square-like shape (1404' in Part C).

Figure 15:
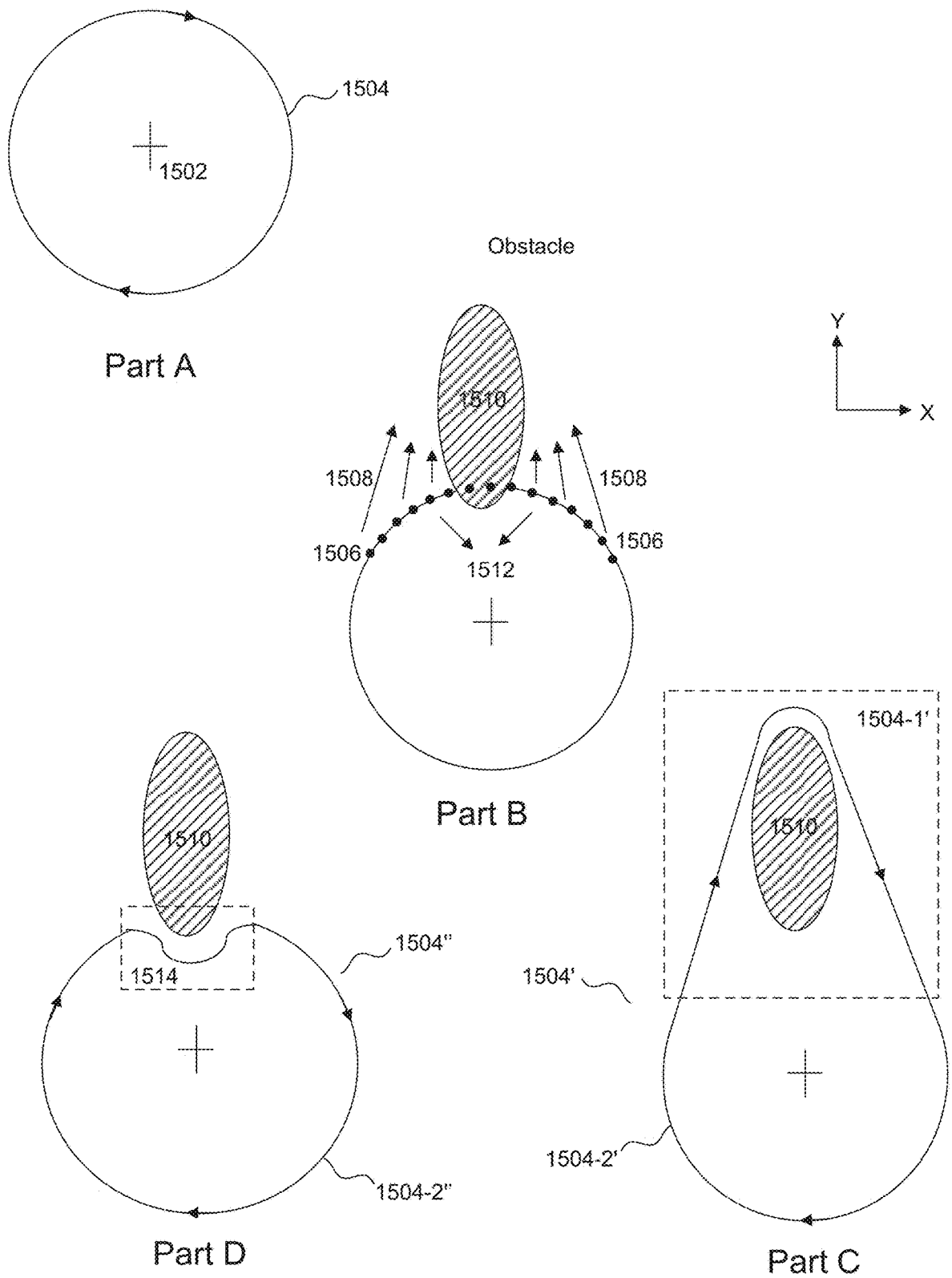
FIG. 15 shows an example of a change in a local region of a motion path to avoid an obstacle, in accordance with some embodiments.

FIG. 15 shows an example of a change in a local region of a motion path to avoid an obstacle, in accordance with some embodiments. In Part A, a motion path 1504 may be defined relative to a target object 1502. The motion path 1504 may have a circular shape, but need not be limited thereto. For example, the motion path 1504 may have any regular shape or irregular (amorphous) shape.

When an obstacle appears near to (or intersects) the motion path, a user may adjust a shape of a local region of the motion path that is proximate to the obstacle. For example, as shown in Part B, an obstacle 1510 may appear near to a region of the motion path. The obstacle may be capable of movement (e.g., a vehicle) and may have moved towards the region of the motion path. Alternatively, the target object may be capable of movement, and may have moved towards either a stationary obstacle or a moving obstacle. A user may adjust the shape of the local region in order for the movable object to avoid the obstacle. For example, the user may select a plurality of points 1506 located along the motion path, and move them in an outward direction 1508 such that a local region of the motion path goes around the obstacle. As shown in Part C, the adjusted motion path 1504' may comprise an elongated section 1504-1' and an unmodified section 1504-2'. The elongated section may result from movement of the spatial points 1506 in the outward direction 1508. The unmodified section may be unaffected by the outward movement of the spatial points 1506, and may maintain its original shape.

In some embodiments, as shown in Parts B and D, the user may select some of the points 1506, and move them in an inward direction 1512 such that a local region of the motion path is shifted away from the obstacle (instead of going around the obstacle). The adjusted motion path 1504" may comprise a depressed section 1514 being formed in the local region of the motion path. The depressed section may result from movement of the spatial points 1506 in the inward direction 1512. The adjusted motion path 1504" may further comprise an unmodified section 1504-2". The unmodified section may be unaffected by the inward movement of the spatial points 1506, and may maintain its original shape.

Figure 16:
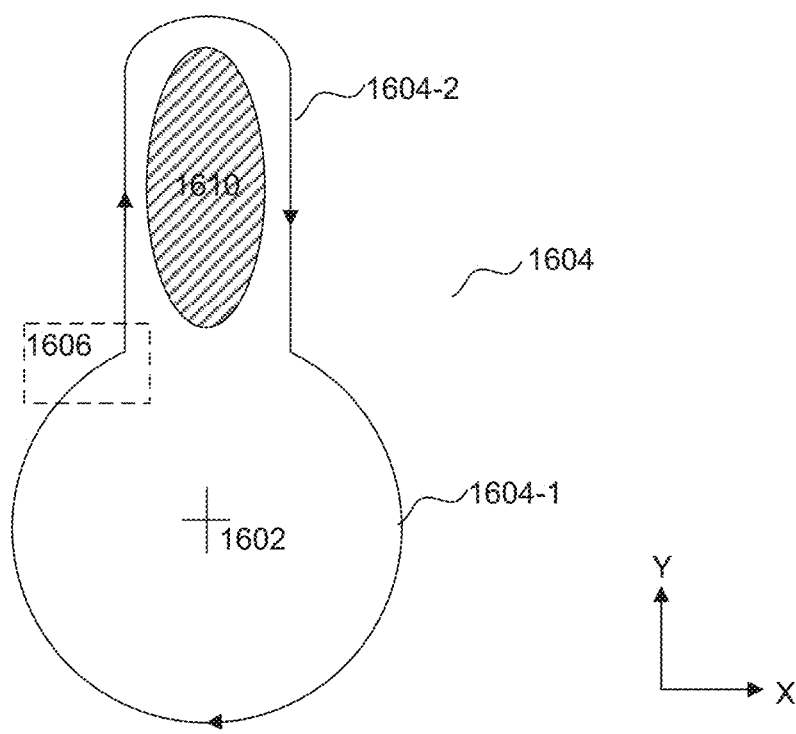
FIG. 16 illustrates the smoothening of a local region of a motion path, in accordance with some embodiments.
Figure 16:
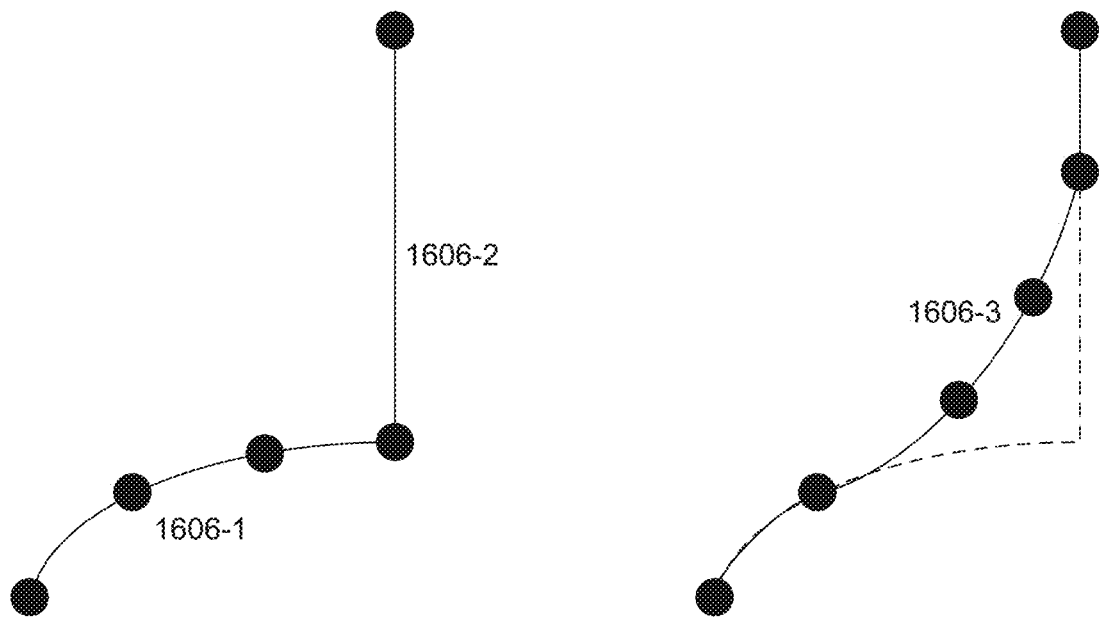

FIG. 16 illustrates the smoothening of a local region of a motion path, in accordance with some embodiments. In Part A, a motion path 1604 may be defined relative to a target object 1602. The motion path may comprise an unmodified section 1604-1 and an elongated section 1604-2. The elongated section may result from movement of certain spatial points in an outward direction, in order for the movable object to avoid an obstacle 1610. The unmodified section may be unaffected by the outward movement of the spatial points, and may maintain its original shape.

As shown in Part A, the elongated section and the unmodified section may be joined at a region 1606. A magnified view of the region 1606 may be shown in Part B. The region 1606 may comprise a curved portion 1606-1 and a substantially straight portion 1606-2. The curved portion may comprise a plurality of spatial points that are spaced together more closely compared to the straight portion, so as to define a curvature of the curved portion. However, the curved portion may join the straight portion abruptly at a sharp angle (e.g., at about 90 degrees). Navigation of this sharp juncture may result in higher power consumption of the movable object, since the movable object may have to decelerate to a near stop at the end of the curved portion before accelerating again along the straight portion.

In some embodiments, the sharp juncture may be smoothened. For example, as shown in Part C, a user may select and move one or more spatial points in the region 1606 outwardly, so as to smoothen the juncture. The movement of the spatial points may result in a smooth curvilinear portion 1606-3 in the region 1606.

In Part B, the plurality of spatial points may be spaced apart at different spatial intervals. For example, the spatial points in the curved portion may be spaced apart at smaller spatial intervals, whereas the spatial points in the straight portion may be spaced apart at larger spatial intervals. In Part C, after the sharp juncture has been smoothened, the plurality of spatial points may be spaced apart at a relatively constant spatial interval. The movable object may be configured to sequentially pass the plurality of spatial points with a same time interval between adjacently-spaced points (e.g., same speed). In some cases, the movable object may be configured to sequentially pass the plurality of spatial points at different time intervals between adjacently-spaced points (e.g., different speeds). The movable object may also be controlled to hover at any point along the motion path.

In the examples of FIGS. 13, 14, 15, and 16, a motion path may be generated based on a position of a target object. The motion path may correspond to a flight path or trajectory. The motion path may comprise a plurality of spatial points. For example, the motion path may comprise a first spatial point and a second spatial point that are defined relative to the position of the target object. The second spatial point may be dynamically adjusted relative to the position of the target object as the movable object is moving along the motion path. In some embodiments, dynamically adjusting the second spatial point may alter a size and/or a shape of the motion path in a second local region proximate to the second spatial point without altering a size and/or a shape of the motion path in a first local region proximate to the first spatial point. The second local region may further include one or more spatial points that are adjacent to the second spatial point, and that are adjusted with the second spatial point.

In some embodiments, the second spatial point may be adjusted in order for the movable object to avoid an obstacle located along the motion path. In other embodiments, the second spatial point may be adjusted to allow an imaging device on the movable object to capture a desired image of the target object. In some further embodiments, the second spatial point may be adjusted to obtain a desired distance between the movable object and the target object. Alternatively, the second spatial point may be adjusted to obtain a desired orientation of the movable object relative to the target object. The second spatial point may also be adjusted based on a change in the position of the target object. The position of the target object may comprise at least a longitude, a latitude, and/or an altitude of the target object. In addition to the second spatial point, one or more other spatial points may also be adjusted to achieve the above effects.

In some embodiments, the second spatial point may be adjusted based on a change in a size of the target object. For example, the size and/or the shape of the motion path may be altered according to the change in size of the target object. In some other embodiments, the second spatial point may be adjusted based on a change in a shape of the target object. For example, the size and/or the shape of the motion path may be altered according to the change in shape of the target object. In some embodiments, the second spatial point may be adjusted based on a change in an orientation of the target object. In some cases, the second spatial point may be adjusted such that the target object remains in a target region within the motion path In some embodiments, dynamically adjusting the second spatial point may temporarily alter the size and/or the shape of the motion path. For example, the second spatial point may be adjusted at time t1 to alter the size and/or the shape of the motion path, and further adjusted at time t2 to revert the motion path back to its original size and/or shape. t1 and t2 may occur at different points in time. Optionally, the second spatial point may be adjusted at time t1 to alter the size and/or the shape of the motion path, and further adjusted at time t2 to cause the motion path to change to a different size and/or shape. In some alternative embodiments, adjusting the second spatial point may permanently alter the size and/or the shape of the motion path.

In some embodiments, the second spatial point may be dynamically adjusted before the movable object passes through the first spatial point. Alternatively, the second spatial point may be dynamically adjusted after the movable object passes through the first spatial point. In some cases, the second spatial point may be dynamically adjusted when the movable object is predicted to pass the second spatial point within a predetermined time period. In some other instances, the second spatial point may be adjusted prior to any movement of the movable object, before the movable object enters the motion path, or while the movable object is moving along the motion path.

The position of the target object may serve as a reference point from which a first vector and a second vector may be defined. The first vector may be defined from the position of the target object to the first spatial point, and the second vector may be defined from the position of the target object to the second spatial point. Each of the first vector and the second vector may comprise a magnitude and a direction. The direction may be determined by an angle between the respective vector and a horizontal plane passing through the position of the target object.

In some embodiments, the first vector and the second vector may have different directions and may lie on different planes. Two or more planes may be parallel with one another, or may intersect with one another. For example, a first group of planes may be parallel with one another, and a second group of planes may intersect with one another. The magnitude and/or the direction of the second vector may be dynamically adjusted in real-time as the movable object is moving along the motion path. Alternatively, the magnitude and/or the direction of the second vector may be adjusted from a first value to a second value prior to the movable object passing the second spatial point. The first value and the second value may be different.

In some cases, the magnitude and/or the direction of the second vector may be adjusted from the second value back to the first value after the movable object has passed the adjusted second spatial point. Alternatively, the magnitude and/or the direction of the second vector may remain at the second value after the movable object has passed the adjusted second spatial point. Optionally, the magnitude and/or the direction of the second vector may be adjusted from the second value to a third value after the movable object has passed the adjusted second spatial point. The second value and the third value may be different.

In some embodiments, the magnitude of the second vector may be increased when a size of the target object is increased. The increase in size of the target object may occur in the direction of the second vector. A distance between the second spatial point and the position of the target object may be increased when the magnitude of the second vector associated with the second spatial point is increased.

In some embodiments, the magnitude of the second vector may be reduced when a size of the target object is decreased. The decrease in size of the target object may occur in the direction of the second vector. A distance between the second spatial point and the position of the target object may be reduced when the magnitude of the second vector associated with the second spatial point is reduced.

Figure 17:
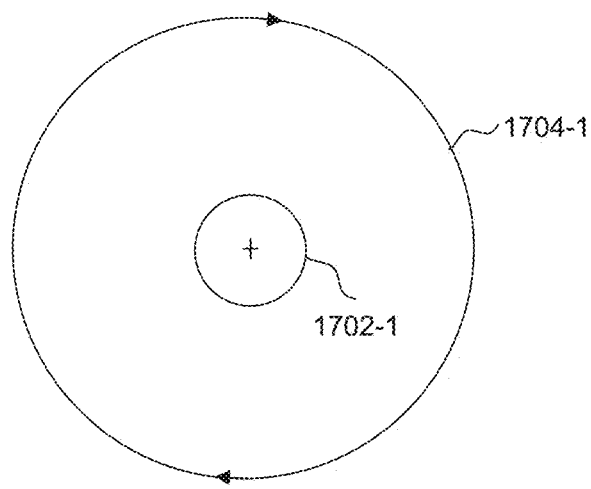
FIG. 17 shows examples of motion paths that are defined based on the shape/geometry of the target object, in accordance with some embodiments.
Figure 17:
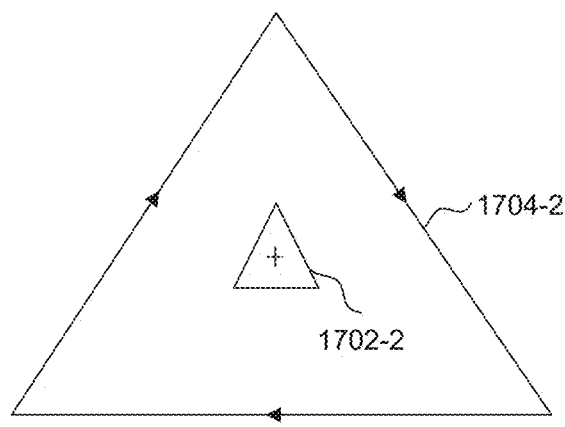
Figure 17:
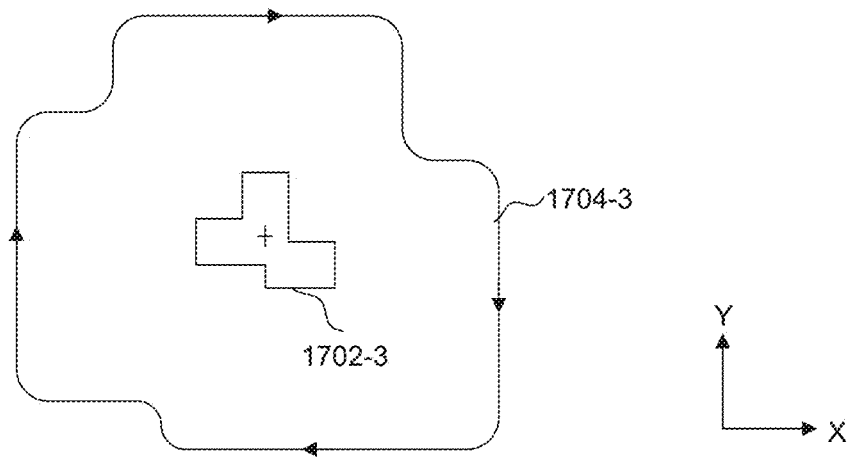

FIG. 17 shows examples of motion paths that are defined based on the shape/geometry of the target object, in accordance with some embodiments. Each motion path may include a contour connecting a plurality of spatial points. The contour may be visually depicted on a display, and may be representative of the motion path. A size, shape, and/or geometry of the contour may vary according to the size, shape, and/or geometry of the motion path. For example, a size, shape, and/or geometry of the contour may change as one or more spatial points are moved between different locations on the display. The change in the size, shape, and/or geometry of the contour may result in a corresponding change in the size, shape, and/or geometry of the motion path.

In Part A, a target object 1702-1 may be circular. A motion path 1704-1 may be defined relative to the target object 1702-1 and based on the shape of the target object 1702-1. The motion path 1704-1 may have a circular contour that is concentric to circular outline of the target object.

In some instances, a user may select and move one or more spatial points in the motion path to change the size, shape, and/or geometry of the motion path. In other instances, the target object may automatically change its size, shape, and/or geometry. For example, the circular target object 1702-1 (shown in Part A) may be changed into a triangular target object 1702-2 (shown in Part B). Subsequently, a new motion path 1704-2 having a triangular contour may be generated based on the triangular shape of the target object 1702-2.

In some instances, the triangular target object 1702-2 (shown in Part B) may be further changed into an irregular-shaped target object 1702-3 (shown in Part C). Subsequently, a new motion path 1704-3 having a contour similar to that of the target object 1702-3 may be generated.

Figure 18:
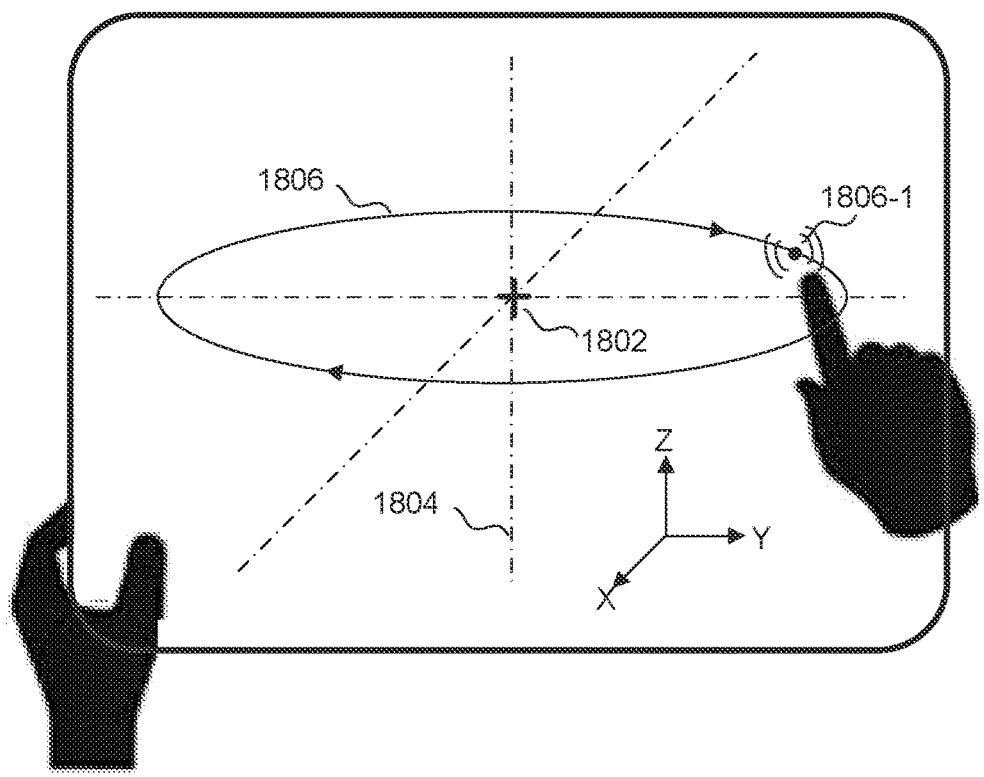
FIG. 18 shows an example of an out-of-plane change in a local region of a motion path, in accordance with some embodiments.
Figure 18:
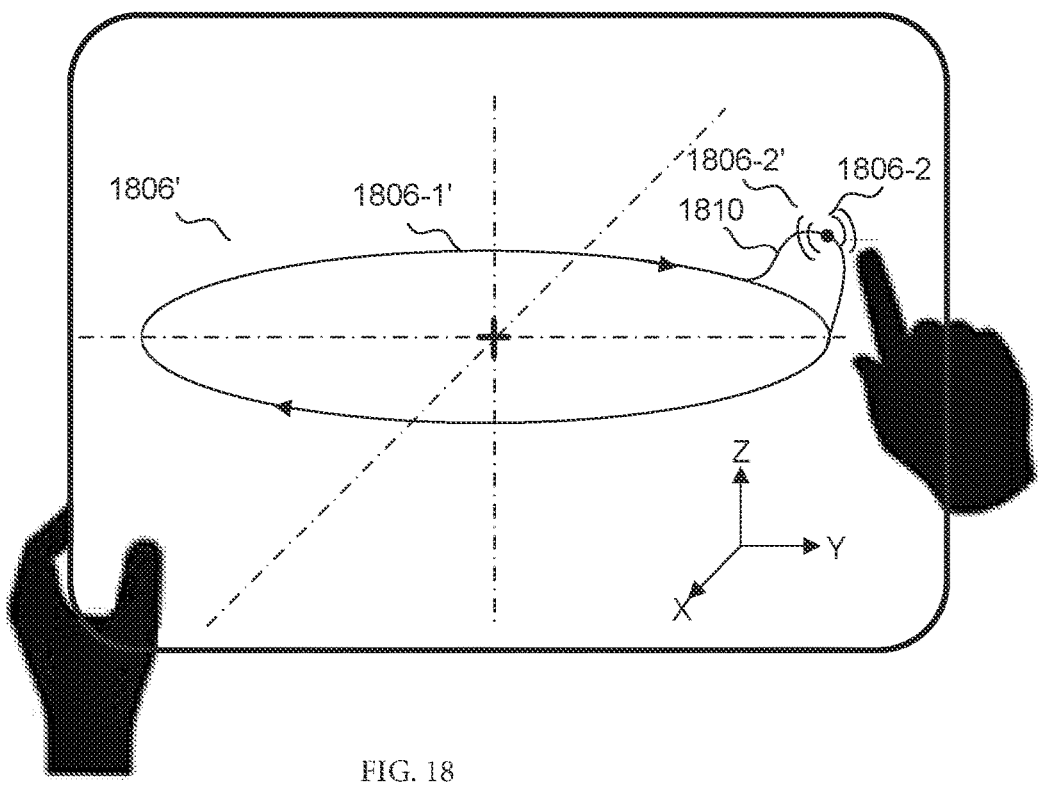

FIG. 18 shows an example of an out-of-plane change in a local region of a motion path, in accordance with some embodiments. As shown in Part A, a motion path 1806 may be defined relative to a target object 1802 and an axis 1804 extending through the target object. A user may adjust a size/shape of a local region of the motion path. For example, the user may select a spatial point at a first location 1806-1 (Part A) and move the spatial point upward to a second location 1806-2 (Part B). The upward movement of the spatial point may result in a protrusion 1810 being formed in a local region of the motion path. The local region may be proximate to the spatial point that is moved.

In the example of FIG. 18, the motion path 1806 may lie on the X-Y plane. Any change in the spatial points of the motion path 1806 within the X-Y plane may be in-plane. Conversely, any change in the spatial points of the motion path 1806 outside of the X-Y plane may be out-of-plane. Since the spatial point is moved upwardly (in a direction parallel to the Z-axis) from the first location to the second location, the protrusion 1810 may be out-of-plane, thereby resulting in the motion path having a 3-D shape. As shown in Part B, a motion path 1806' may comprise an in-plane segment 1806-1' and an out-of-plane segment 1806-2'. The out-of-plane segment may be indicated by the protrusion 1810. The in-plane segment and the out-of-plane segments may lie on different planes. In some embodiments, the planes may be orthogonal to one another. In other embodiments, the planes may be oblique to one another. Any arrangement of the planes in 3-D space may be contemplated.

Figure 19:
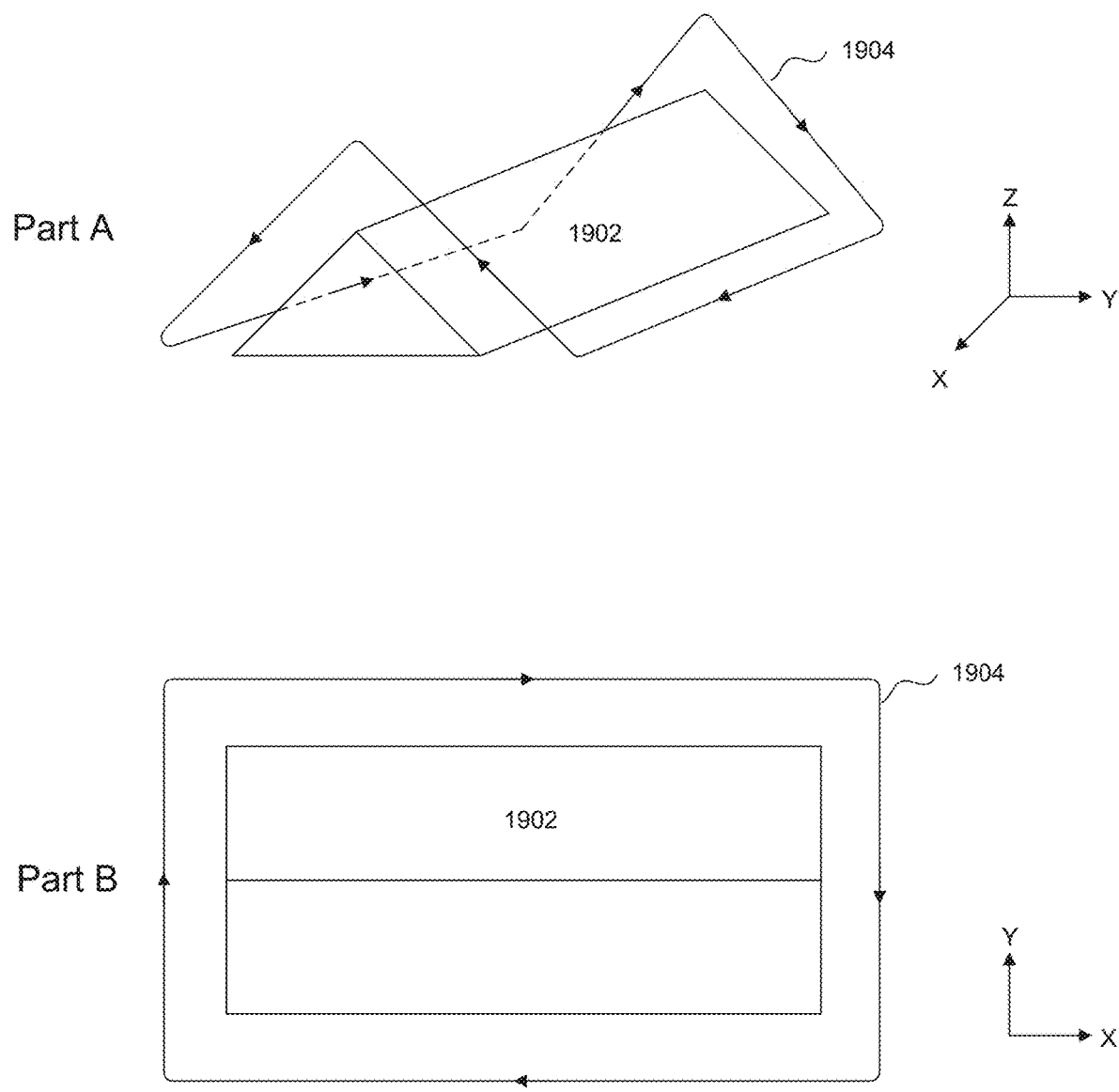
FIG. 19 shows an example of a 3-D motion path that is defined based on a contour of a target object, in accordance with some embodiments.

FIG. 19 shows an example of a 3-D motion path that is defined based on a contour of a target object, in accordance with some embodiments. Part A shows an isometric view of a target object 1902 and a motion path 1904. Part B shows a top view of the target object 1902 and the motion path 1904. The motion path 1904 may be defined based on the contour of the target object. In FIG. 19, the target object 1902 may be formed in the shape of an elongated prism. The motion path 1904 may substantially follow the contour of the target object.

Figure 20:
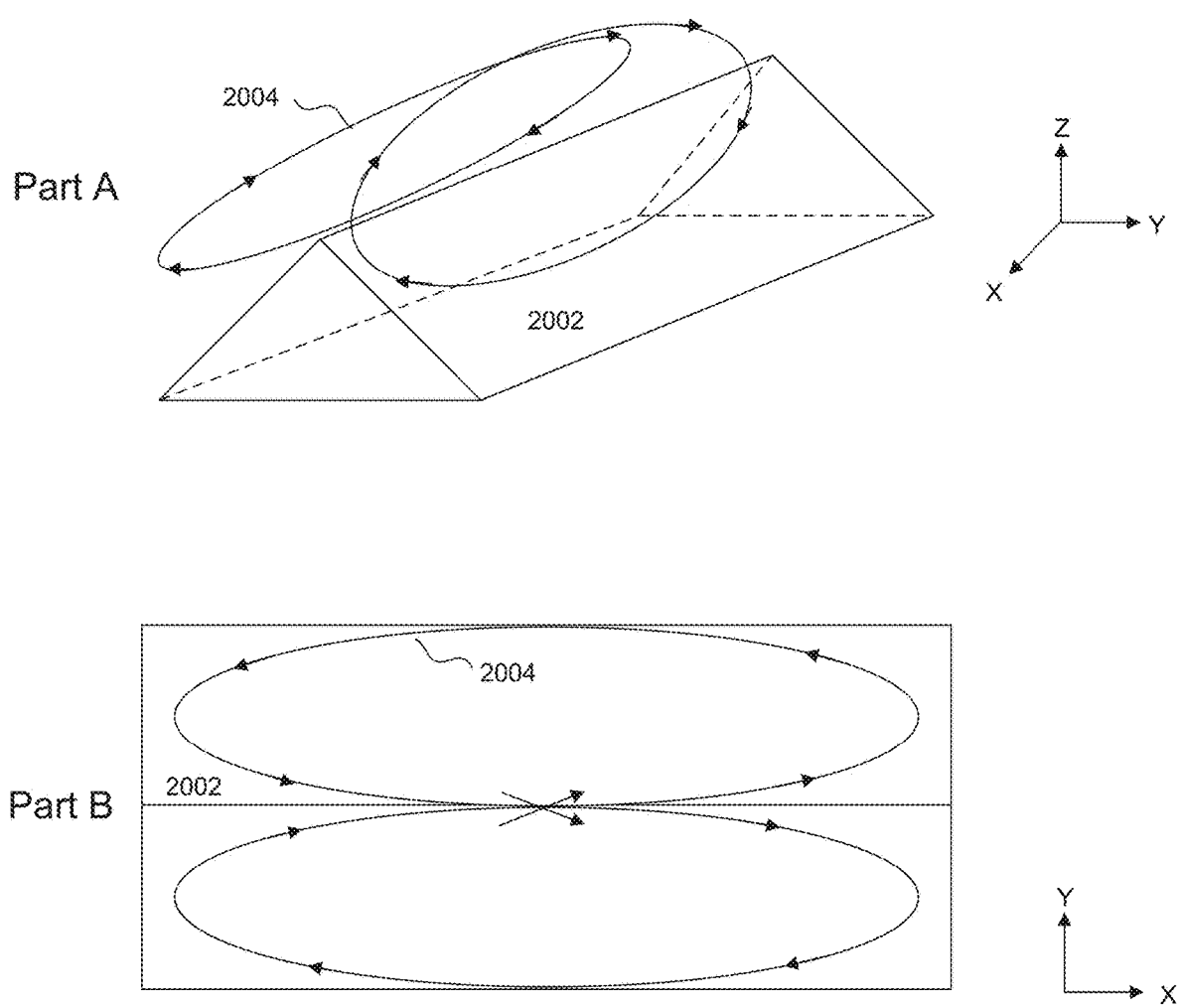
FIG. 20 shows an example of a 3-D figure-8 motion path that is defined based on a contour of a target object, in accordance with some embodiments.

FIG. 20 shows an example of a 3-D figure-8 motion path that is defined based on a contour of a target object, in accordance with some embodiments. Part A shows an isometric view of a target object 2002 and a motion path 2004. Part B shows a top view of the target object 2002 and the motion path 2004. The motion path 2004 may be shaped in a 3-D figure-8 configuration, and may substantially follow the contour of the target object.

Figure 21:
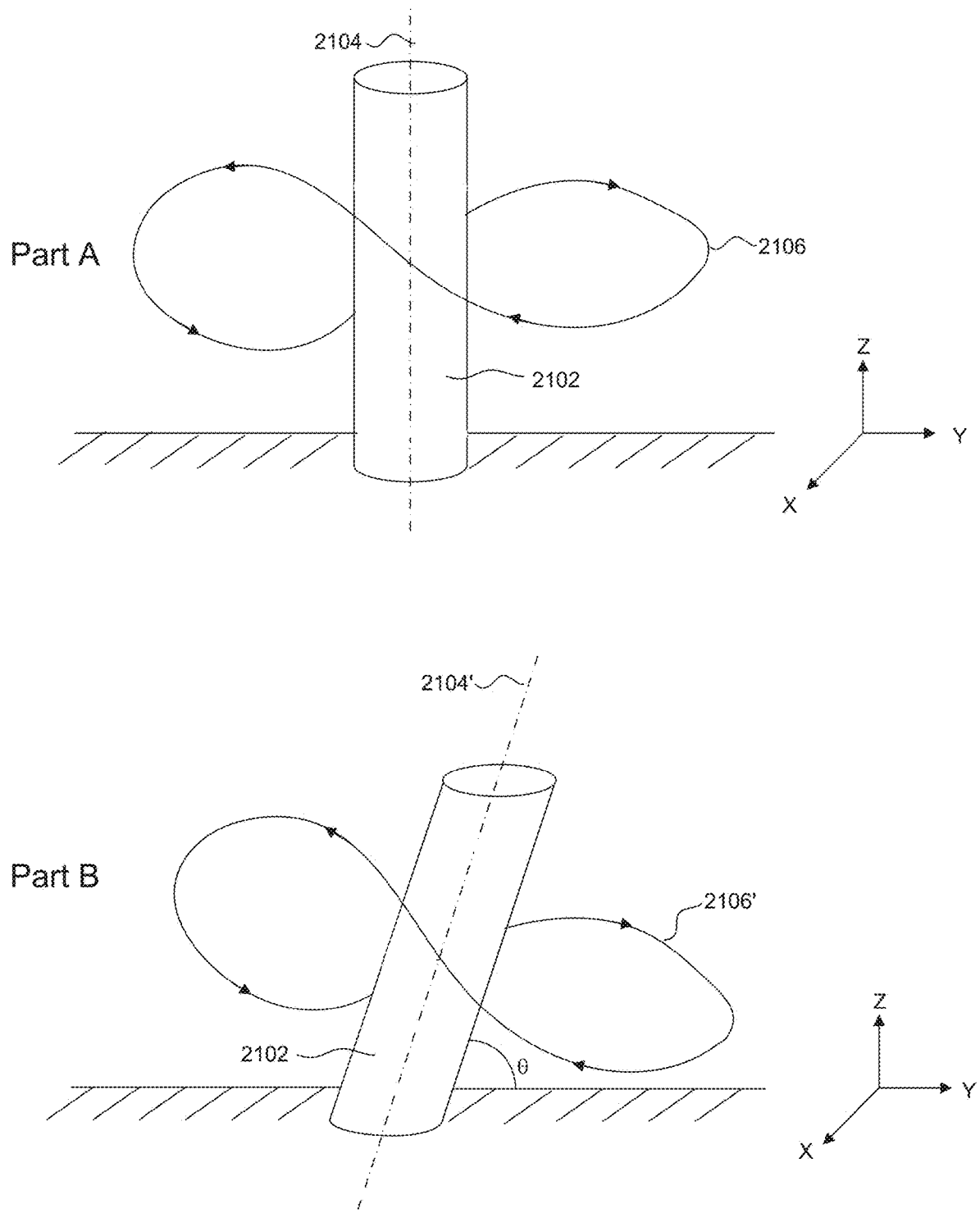
FIG. 21 shows examples 3-D figure-8 motion paths that are defined based on different orientations of a target object, in accordance with some embodiments.

FIG. 21 shows examples of 3-D figure-8 motion paths that are defined based on different orientations of a target object, in accordance with some embodiments. Part A shows a target object 2102 and a motion path 2106. The motion path 2106 may be defined based on an orientation of the target object (for example, relative to a position of the target object and an axis 2104). The motion path 2106 may be shaped in a 3-D figure-8 configuration that sweeps around the target object. In Part A, the target object may be disposed perpendicular to a horizontal ground plane. In Part B, the target object may be tilted at an angle θ to the horizontal ground plane. For example, the angle θ may be an included angel between the horizontal ground plane and an axis 2104'. Accordingly, the 3-D figure-8 motion path 2106' in Part B may also be tilted at the angle θ.

Figure 22:
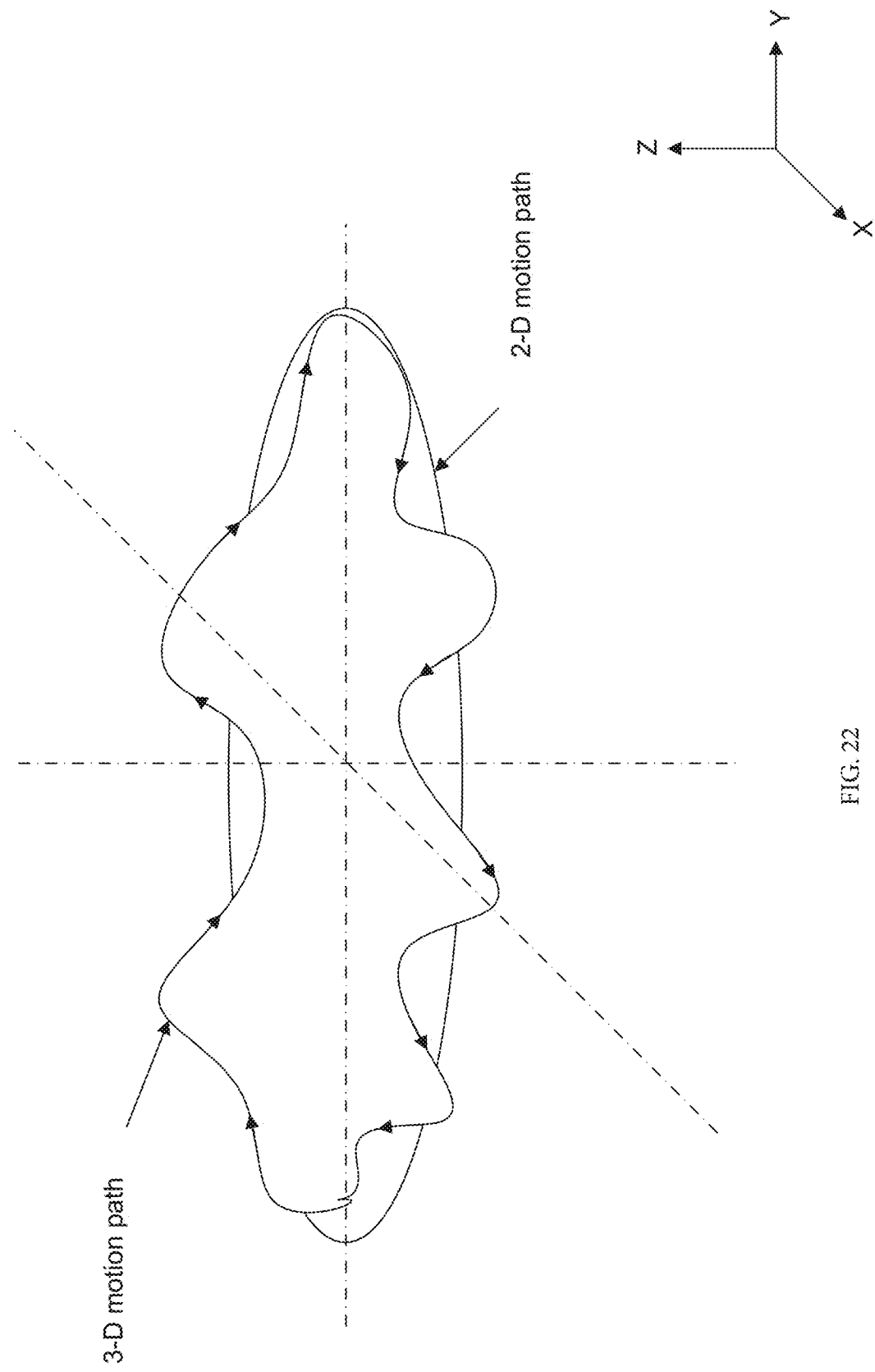
FIG. 22 shows an example of a 3-D motion path having an amorphous shape and that is defined relative to a target object, in accordance with some embodiments.

FIG. 22 shows an example of a 3-D motion path having an amorphous shape and that is defined relative to a target object, in accordance with some embodiments. As shown in FIG. 22, a 2-D motion path may lie on the X-Y plane. In contrast, a 3-D motion path may comprise a plurality of path segments that lie on different planes. The planes may be orthogonal or oblique to one another. The planes may be parallel to one another or may intersect with one another. A user may generate a 3-D motion path by selecting and moving spatial points located on the 2-D motion path in different directions on a display, similar to that shown in FIG. 18. Accordingly, a user may generate complex 3-D motion paths for a movable object in an easy and intuitive manner on a display. The movable object may be configured to automatically follow the 3-D motion path, without a user having to manually control the motion/flight of the movable object.

In some embodiments, the orientation of a movable object may be adjusted at different spatial points along a motion path. For example, a method for controlling a movable object may comprise: generating a motion path comprising at least one spatial point defined relative to one or more parameters of a target object; and determining one or more motion characteristics of the movable object for the at least one spatial point.

The one or more parameters of the target object may comprise a position and/or an attitude of the target object. The motion path may comprise a plurality of spatial points that are defined relative to the position of the target object. The plurality of spatial points may be configured to lie on one or more planes. In some embodiments, the plurality of spatial points may be configured to lie on a same plane. In other embodiments, the plurality of spatial points may be configured to lie on a plurality of different planes. The one or more motion characteristics may comprise at least an orientation of the movable object relative to the target object. The orientation of the movable object may comprise an attitude and/or orientation of the movable object as the movable object moves along the motion path.

In some embodiments, adjusting one or more spatial points of the motion path may result in a change in a velocity, acceleration, an altitude, or an attitude of the movable object. For example, the velocity, acceleration, and/or altitude of the movable object may be modified to enable the movable object to follow the motion path.

Figure 23:
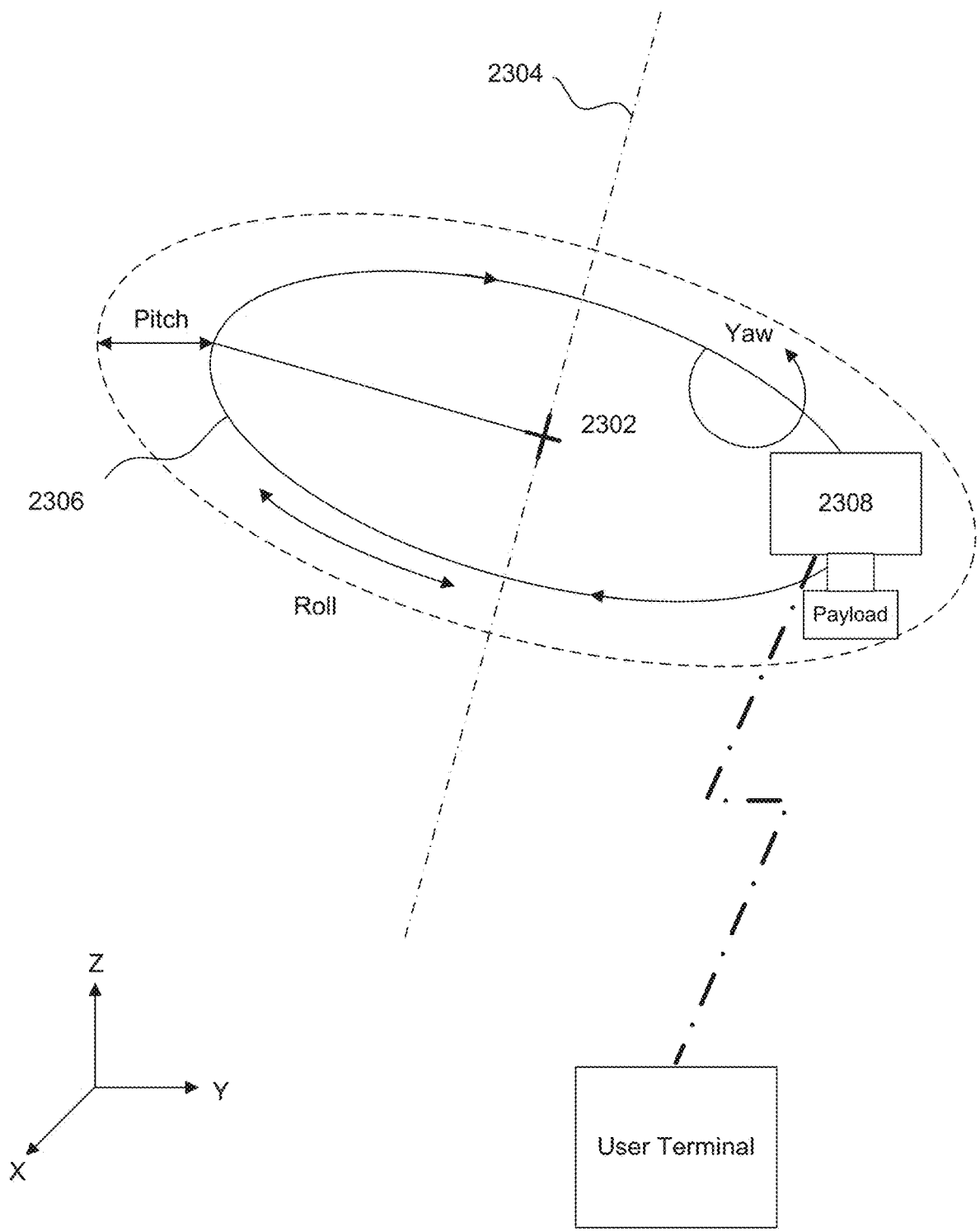
FIG. 23 shows that the attitude of a movable object may be adjusted along pitch, roll, and/or yaw axes as the movable object is moving along a motion path, in accordance with some embodiments.

FIG. 23 shows that the attitude of a movable object may be adjusted along pitch, roll, and/or yaw axes as the movable object is moving along a motion path, in accordance with some embodiments. As shown in FIG. 23, a movable object 2308 may rotate about one or more of the pitch, roll, and yaw axes as the movable object is moving along a motion path 2306. The motion path may be defined relative to a position 2302 of a target object and an axis 2304 extending through the target object. The attitude and/or orientation of the movable object may be adjusted based on the attitude and/or orientation of the target object. For example, in FIG. 23, the target object and the motion path may be tilted at an angle. Accordingly, the movable object may be rotated about its pitch-axis, such that the movable object may be aligned with the tilted target object. The movable object may change its attitude and/or orientation based on the attitude and/or orientation of the target object. For example, when the target object rotates about its pitch axis by an angle, the movable object may also rotate about its pitch axis by the same angle. Likewise, when the target object rotates about its roll axis by an angle, the movable object may also rotate about its roll axis by the same angle. Similarly, when the target object rotates about its yaw axis by an angle, the movable object may also rotate about its yaw axis by the same angle. Accordingly, the attitude and/or orientation of the movable object may follow the attitude and/or orientation of the target object, and move in accordance with any changes in orientation and/or position of the motion path.

Figure 24:
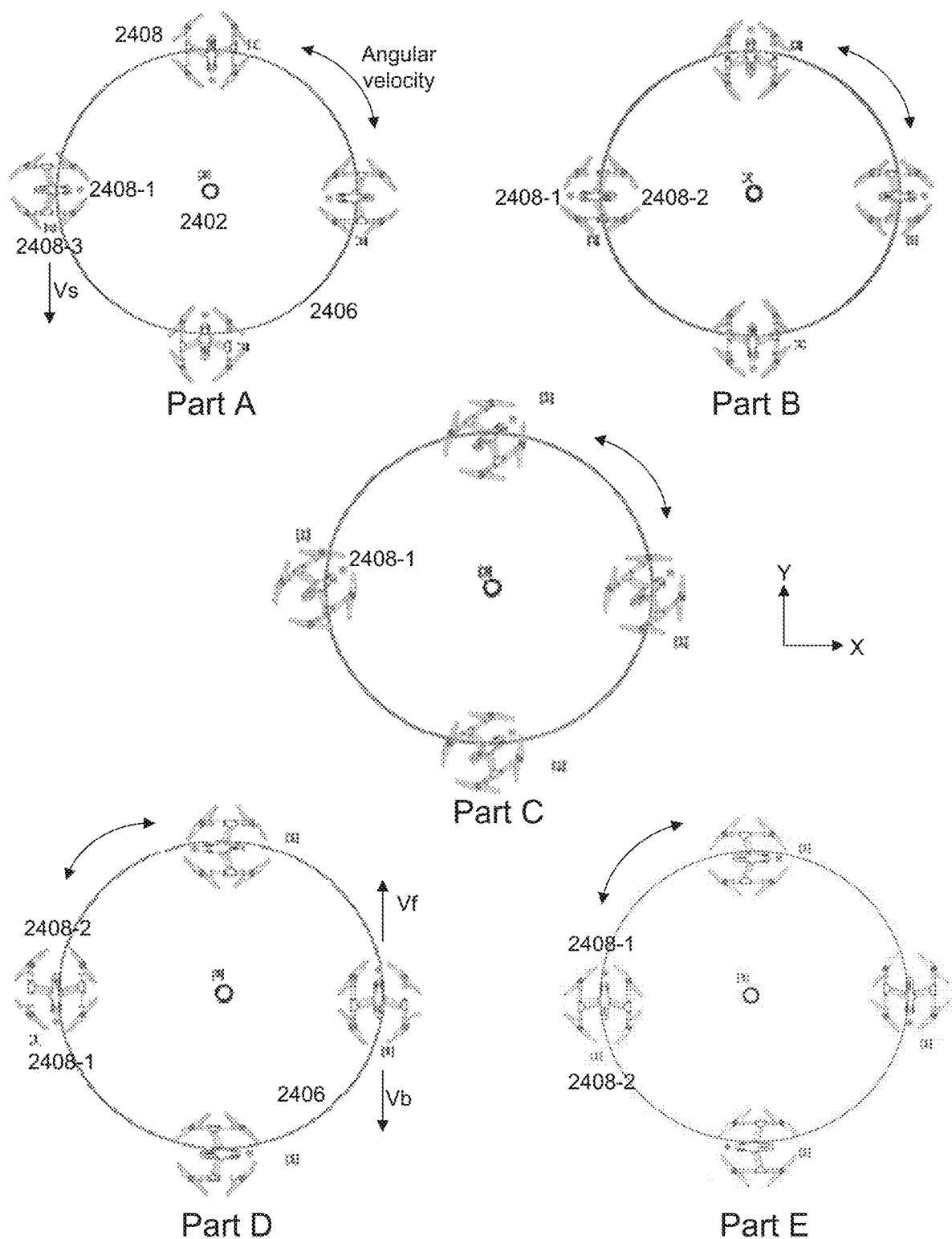
FIG. 24 shows examples of different orientations of an aerial vehicle as the aerial vehicle navigates around a target object, in accordance with some embodiments.

FIG. 24 shows examples of different orientations of an aerial vehicle as the aerial vehicle navigates around a target object, in accordance with some embodiments. In FIG. 24, one or more motion characteristics of the movable object may be dynamically adjusted as the movable object is moving along the motion path. For example, an attitude and/or orientation of the movable object may be modified such that a portion of the movable object substantially faces towards the target object as the movable object is moving along the motion path. The portion of the movable object may correspond to a nose portion, a tail portion, a side portion, or any portion of the movable object. In some embodiments, the movable object may be a UAV and the motion path may be a flight path. For example, in Part A, a nose portion 2408-1 of a UAV 2408 may substantially face towards a target object 2402 as the UAV is moving along a flight path 2406. The flight path may be defined relative to the position and/or orientation of the target object, as described elsewhere in the specification. In Part B, the nose portion 2408-1 of the UAV may be facing away from the target object as the UAV is moving along the flight path. In Part B, a tail portion 2408-2 of the UAV may substantially face towards the target object as the UAV is moving along the flight path. In Part C, the nose portion of the UAV may be oriented at an angle (e.g., about 45 degrees to the X-axis) as the UAV is moving along the flight path. In Part D, the nose portion of the UAV may be in the direction of the flight path as the UAV is moving along the flight path in a counter-clockwise direction. Conversely in Part D, the tail portion of the UAV may be in the direction of the flight path as the UAV is moving along the flight path in a clockwise direction. In Part E, the nose portion of the UAV may be in the direction of the flight path as the UAV is moving along the flight path in a clockwise direction. Conversely in Part E, the tail portion of the UAV may be in the direction of the flight path as the UAV is moving along the flight path in a counter-clockwise direction. Any orientation of the UAV relative to the target object along the pitch-roll-yaw axes may be contemplated as the UAV is flying along the flight path.

In some embodiments, dynamically adjusting the one or more motion characteristics may further comprise changing a forward velocity or a backward velocity of the movable object along the motion path. The forward velocity and the backward velocity may be tangential to the motion path. For example, as shown in Part D, the forward velocity Vf and the backward velocity Vb may be tangential to the flight path 2406. The nose portion of the UAV may be leading the flight path when the UAV is moving at the forward velocity. Conversely, the tail portion of the UAV may be leading the flight path when the UAV is moving at the backward velocity.

In some embodiments, dynamically adjusting the one or more motion characteristics may further comprise changing a side velocity of the movable object along the motion path. The side velocity may be normal to the motion path. For example, as shown in Part A, a side portion 2402-3 of the UAV may be leading the flight path when the UAV is moving at a side velocity Vs. The side velocity Vs may be tangential to the flight path 2406.

In some embodiments, dynamically adjusting the one or more motion characteristics may further comprise changing an upward velocity or a downward velocity of the movable object along the motion path. The downward velocity may be in a same direction as gravitational force, whereas the upward velocity may be opposite in direction to gravitational force. In FIG. 24, the gravitational force may be assumed to act in the negative Z-axis. By adjusting the upward velocity and/or downward velocity of the UAV along the flight path, a 3-D flight path may be generated, for example as shown in FIGS. 18-22.

In some embodiments, a payload (e.g., a camera) may be carried by the UAV. An orientation of the payload may be the same or different from an orientation of any portion of the UAV. In some cases, the payload may be aligned with a portion of the UAV (e.g., a nose portion, a tail portion, or a side portion) as the UAV is flying along the flight path. In other cases, the payload may be oriented such that it is facing the target object as the UAV is flying along the flight path. The orientation of the payload may vary with the heading direction of the UAV. Alternatively, the orientation of the payload may be independent of the heading direction of the UAV. Any spatial orientation of the payload relative to the UAV in one or more degrees of freedom may be contemplated.

In some embodiments, the one or more motion characteristics of the movable object may be dynamically adjusted based on an instantaneous location(s) of the movable object at one or more spatial points. For example, the movable object may be adjusted to have a first attitude/orientation at a first spatial point and a second attitude/orientation at a second spatial point. The first spatial point and the second spatial point may be spaced apart along the motion path, and may be defined relative to the position of the target object.

In some embodiments, the movable object may be configured to move along the motion path at a constant velocity and a same orientation relative to the target object. Alternatively, the movable object may be configured to move along the motion path at different velocities and a same orientation relative to the target object. Optionally, the movable object may be configured to move along the motion path at different velocities and different orientations relative to the target object.

In some embodiments, determining the one or more motion characteristics of the movable object for at least one spatial point may further comprise: receiving a selection of a movable object orientation mode from among a plurality of different movable object orientation modes. The plurality of different movable object orientation modes may define at least an orientation of the movable object with respect to the target object at each spatial point along the motion path. The plurality of different movable object orientation modes may comprise at least one of the following modes: (1) an orientation of a nose portion of the movable object with respect to the target object; (2) an orientation of a tail portion of the movable object with respect to the target object; (3) an orientation of a side portion of the movable object with respect to the target object; (4) a forward velocity of a nose portion of the movable object along the motion path; (5) a backward velocity of a tail portion of the movable object along the motion path; and (6) a side velocity of a side portion of the movable object along the motion path.

As previously described, a motion path of a movable object may be adjusted via a user interface (UI). In some embodiments, a method for controlling a motion path of a movable object may be performed using a computer-implemented graphical display. The method may comprise: receiving an input indicative of movement of one or more spatial points in any direction within a three-dimensional (3-D) space, wherein the one or more spatial points are visually depicted on the graphical display; and processing the input to generate the motion path of the movable object based on the movement of the one or more spatial points.

The input may be indicative of a user moving the visually depicted one or more spatial points between different locations on the graphical display. The input may be provided by a user using an input device (e.g., a mouse). The computer-implemented graphical display may be electrically connected to the input device. A user may select and move one or more of the spatial points between different locations on the graphical display using the input device.

In some embodiments, the graphical display may be on a touchscreen. The touchscreen may be configured to allow a user to select and move the one or more of the spatial points between the different locations by touching the touchscreen. The motion path may further include a contour connecting the plurality of spatial points. The contour may be visually depicted on the graphical display, and may be representative of the motion path.

A size and/or a shape of the contour may vary according to the size and/or the shape of the motion path. Also, a size and/or a shape of the contour may change as a user moves one or more spatial points between different locations on the graphical display. The change in the size and/or the shape of the contour may result in a corresponding change in the size and/or shape of the motion path. A user may provide the input to change the spatial positions of the one or more spatial points in the motion path. For example, a user may provide the input: (1) for the movable object to avoid an obstacle located along the motion path; (2) to allow an imaging device on the movable object to capture a desired image of the target object; (3) to obtain a desired distance between the movable object and the target object; and/or (4) to obtain a desired orientation of the movable object relative to the target object.

In some embodiments, the input need not be provided by a user, and may be automatically generated based on a change in the position of the target object. The position of the target object may comprise at least a longitude, a latitude, and/or an altitude of the target object. For example, the input may be automatically generated based on a change in a size of the target object. The size and/or the shape of the motion path may be altered according to the change in size of the target object. In some cases, the input may be automatically generated based on a change in a shape of the target object. The size and/or the shape of the motion path may be altered according to the change in shape of the target object. In some other cases, the input may be automatically generated based on a change in an orientation of the target object. Optionally, the input may be automatically generated such that the target object remains in a target region within the motion path.

In some embodiments, the input may be processed to determine a corresponding change in a size and/or a shape of the motion path. The change in the motion path may be visually depicted on the graphical display. In some cases, a new motion path may be generated based on the change in the size and/or the shape of the motion path. The size of the motion path may comprise a dimension and/or length scale of the motion path. The shape of the motion path may comprise a geometry, a contour, and/or an outline of the motion path.

The plurality of spatial points may be configured to lie on one or more planes. In some embodiments, the plurality of spatial points may lie on a same plane. In other embodiments, the plurality of spatial points may be lie on a plurality of different planes.

In some embodiments, another input may be received on the graphical display, whereby the input may be indicative of one or more parameters of a target object. The motion path may be generated based on the one or more parameters of the target object. For example, the motion path may comprise one or more spatial points that are defined relative to the one or more parameters of the target object. The one or more parameters may comprise a position, a shape, and/or an orientation of the target object. The motion path for the movable object may be generated based on the position of the target object.

In some embodiments, the motion path for the movable object may be generated based on the shape and/or the orientation of the target object. The plurality of spatial points in the motion path may be defined relative to the shape and/or the orientation of the target object. In some cases, the target object may have a fixed shape. Alternatively, the shape of the target object may be capable of changing over time. The target object may have a regular shape or an irregular (amorphous) shape. One or more of the spatial points in the motion path may be adjusted and moved in the 3-D space on the graphical display when the shape of the target object changes. In some cases, a size of the target object may remain the same as the shape of the target object changes. Alternatively, a size of the target object may change as the shape of the target object changes. In some embodiments, the size of the target object may increase or decrease as the shape of the target object changes.

In some embodiments, the target object may have a fixed orientation. In other embodiments, the orientation of the target object may be capable of changing over time. One or more of the spatial points in the motion path may be adjusted and moved in the 3-D space on the graphical display when the orientation of the target object changes. The one or more spatial points may be either automatically adjusted, or adjusted via a user input.

In some embodiments, the shape and/or the orientation of the target object may be configured to change with one or more movement characteristics of the target object. The movement characteristics of the target object may comprise at least one of a velocity, an acceleration, and an attitude of the target object.

The input may be indicative of dynamic adjustment and movement of the one or more spatial points relative to the position of the target object. In some cases, dynamically adjusting and moving the one or more spatial points may alter a size and/or a shape of the motion path in a local region proximate to the one or more spatial points without altering a size and/or a shape of the motion path in other regions.

In some embodiments, the input may temporarily alter the size and/or shape of the motion path. For example, one or more spatial points may be adjusted and moved at time t1 to alter the size and/or the shape of the motion path, and further adjusted at time t2 to revert the motion path back to its original size and/or shape. t1 and t2 may occur at different points in time. Optionally, one or more spatial points may be adjusted at time t1 to alter the size and/or the shape of the motion path, and further adjusted at time t2 to cause the motion path to change to a different size and/or shape. In some alternative embodiments, the input may permanently alter the size and/or shape of the motion path for the remainder of the motion path.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, a UAV can include a propulsion system having a plurality of rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 25:
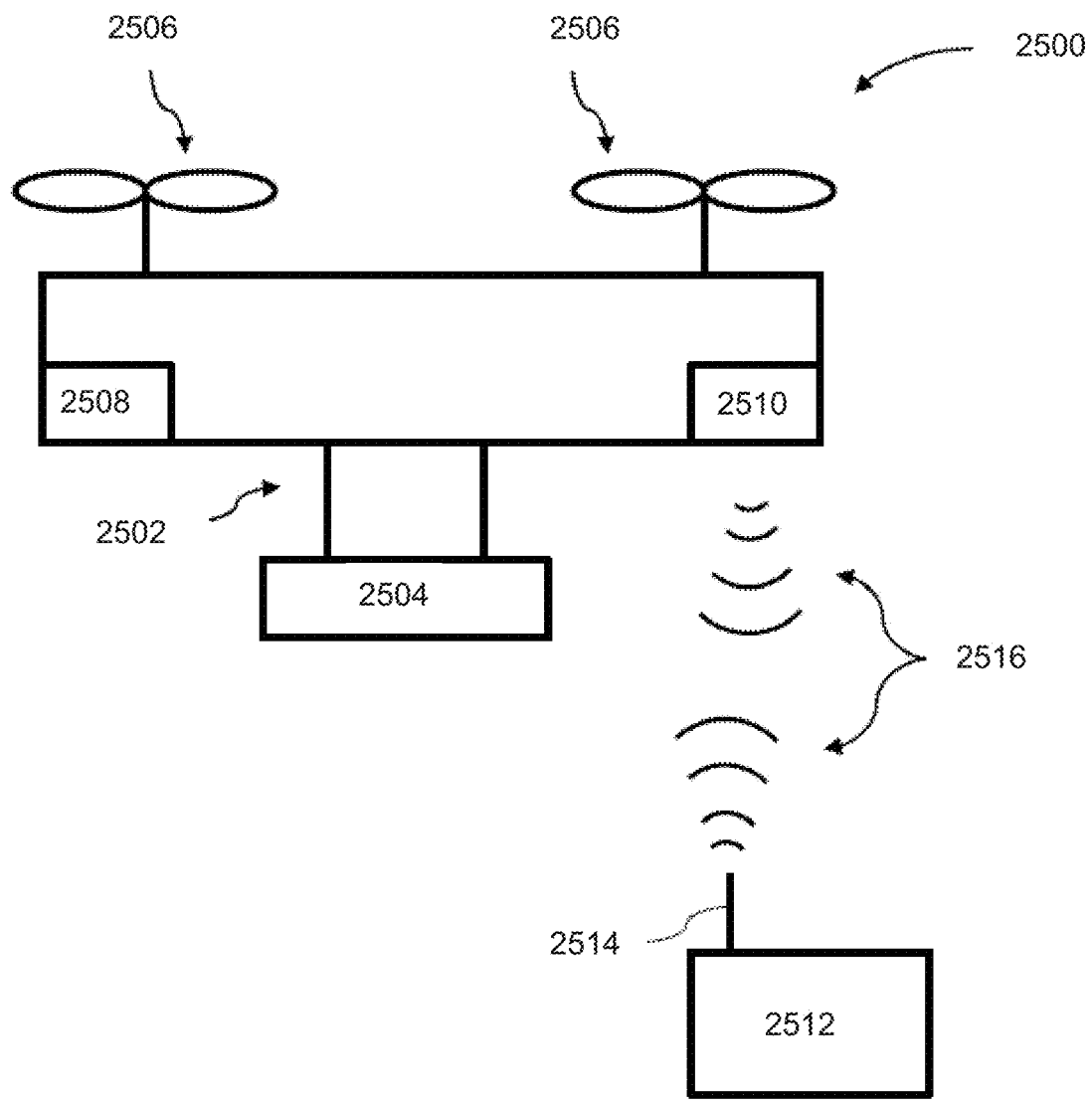
FIG. 25 is a schematic block diagram of a system for controlling a movable object, in accordance with some embodiments.

FIG. 25 illustrates a movable object 2500 including a carrier 2502 and a payload 2504, in accordance with embodiments. Although the movable object 2500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2504 may be provided on the movable object 2500 without requiring the carrier 2502. The movable object 2500 may include propulsion mechanisms 2506, a sensing system 2508, and a communication system 2510.

The propulsion mechanisms 2506 can include one or more of rotors, propellers, blades, engines, motors, wheels, axles, magnets, or nozzles, as previously described. For example, the propulsion mechanisms 2506 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2506 can be mounted on the movable object 2500 using any suitable means, such as a support element (e.g., a drive shaft) as described elsewhere herein. The propulsion mechanisms 2506 can be mounted on any suitable portion of the movable object 2500, such on the top, bottom, front, back, sides, or suitable combinations thereof.

In some embodiments, the propulsion mechanisms 2506 can enable the movable object 2500 to take off vertically from a surface or land vertically on a surface without requiring any horizontal movement of the movable object 2500 (e.g., without traveling down a runway). Optionally, the propulsion mechanisms 2506 can be operable to permit the movable object 2500 to hover in the air at a specified position and/or orientation. One or more of the propulsion mechanisms 2500 may be controlled independently of the other propulsion mechanisms. Alternatively, the propulsion mechanisms 2500 can be configured to be controlled simultaneously. For example, the movable object 2500 can have multiple horizontally oriented rotors that can provide lift and/or thrust to the movable object. The multiple horizontally oriented rotors can be actuated to provide vertical takeoff, vertical landing, and hovering capabilities to the movable object 2500. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 2500 (e.g., with respect to up to three degrees of translation and up to three degrees of rotation).

The sensing system 2508 can include one or more sensors that may sense the spatial disposition, velocity, and/or acceleration of the movable object 2500 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2508 can be used to control the spatial disposition, velocity, and/or orientation of the movable object 2500 (e.g., using a suitable processing unit and/or control module, as described below). Alternatively, the sensing system 2508 can be used to provide data regarding the environment surrounding the movable object, such as weather conditions, proximity to potential obstacles, location of geographical features, location of manmade structures, and the like.

The communication system 2510 enables communication with terminal 2512 having a communication system 2514 via wireless signals 2516. The communication systems 2510, 2514 may include any number of transmitters, receivers, and/or transceivers suitable for wireless communication. The communication may be one-way communication, such that data can be transmitted in only one direction. For example, one-way communication may involve only the movable object 2500 transmitting data to the terminal 2512, or vice-versa. The data may be transmitted from one or more transmitters of the communication system 2510 to one or more receivers of the communication system 2512, or vice-versa. Alternatively, the communication may be two-way communication, such that data can be transmitted in both directions between the movable object 2500 and the terminal 2512. The two-way communication can involve transmitting data from one or more transmitters of the communication system 2510 to one or more receivers of the communication system 2514, and vice-versa.

In some embodiments, the terminal 2512 can provide control data to one or more of the movable object 2500, carrier 2502, and payload 2504 and receive information from one or more of the movable object 2500, carrier 2502, and payload 2504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2506), or a movement of the payload with respect to the movable object (e.g., via control of the carrier 2502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2508 or of the payload 2504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2512 can be configured to control a state of one or more of the movable object 2500, carrier 2502, or payload 2504. Alternatively or in combination, the carrier 2502 and payload 2504 can also each include a communication module configured to communicate with terminal 2512, such that the terminal can communicate with and control each of the movable object 2500, carrier 2502, and payload 2504 independently.

In some embodiments, the movable object 2500 can be configured to communicate with another remote device in addition to the terminal 2512, or instead of the terminal 2512. The terminal 2512 may also be configured to communicate with another remote device as well as the movable object 2500. For example, the movable object 2500 and/or terminal 2512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2500, receive data from the movable object 2500, transmit data to the terminal 2512, and/or receive data from the terminal 2512. Optionally, the remote device can be connected to the Internet or other telecommunications network, such that data received from the movable object 2500 and/or terminal 2512 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system.

For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system for controlling a movable object, comprising:
   a controller configured to:
      obtain one or more parameters of a target object;

obtain signals indicating one or more motion characteristics of the movable object and one or more motion path parameters;

determine a motion path for the movable object to travel based on the one or more parameters of the target object, and the one or more motion path parameters, the motion path including a plurality of spatial points; and while the movable object is traveling along the motion path based on the one or more motion characteristics of the movable object and tracking the target object:

in response to the target object being changed from a first target object to a second target object different from the first target object, adjust the motion path of the movable object from a first motion path to a second motion path, and control the movable object to move from the first motion path to the second motion path via a shortest pathway, the first motion path being determined based on the first target object, and the second motion path being determined based on the second target object.

2. The system of claim 1, wherein the plurality of spatial points is configured to be on one or more planes.

3. The system of claim 1, wherein the signals are first signals and the controller is further configured to:

receive a second signal while the movable object is traveling along the motion path, the second signal indicating a change of positions of the plurality of spatial points along the motion path; and determine a modified motion path for the movable object to travel based on the change of positions of the plurality of spatial points.

4. The system of claim 1, wherein the one or more parameters of the target object comprise at least one of a position, a latitude, a longitude, an altitude, a size, the shape, an orientation of the target object, or a vector corresponding to an axis indicative of the orientation of the target object and extending from the target object.

5. The system of claim 1, wherein the one or more motion path parameters comprise at least one of:

a circling distance defined from an axis or a position of the target object, wherein the circling distance determines a size or a shape of the motion path;

a position of an entry point on the motion path, wherein the movable object is controlled to enter the motion path at the entry point;

a position of an exit point on the motion path, wherein the movable object is controlled to exit the motion path at the exit point;

an angle of travel defining a portion of the motion path for the movable object to travel; or an entry path with which the movable object moves from a present location of the movable object to the entry point.

6. The system of claim 1, the signals further indicate one or more movable object orientation modes defining the orientation of the movable object with respect to the target object while the movable object is traveling along the motion path.

7. The system of claim 1, wherein the controller is further configured to:

adjust, based on a first user command, the movable object to have a first orientation relative to the target object at a first spatial point; and adjust, based on a second user command, the movable object to have a second orientation relative to the target object at a second spatial point, the plurality of spatial points including the first spatial point and the second spatial point, and the first orientation being different from the second orientation.

8. The system of claim 7, wherein:

at least one of the first orientation or the second orientation is an orientation of a nose of the movable object relative to the target object; or the first orientation is the nose of the movable object facing towards the target object and the second orientation is the nose of the movable object being oriented at an angle relative to the target object.

9. The system of claim 8, wherein the controller is further configured to:

select, based on the signals or the user command, at least one movable object orientation mode, the at least one movable object orientation mode including at least one of:

a nose of the movable object facing toward the target object;

a tail of the movable object facing toward the target object;

a side of the movable object facing toward the target object;

a forward velocity of the nose of the movable object along the motion path, while the nose of the movable object is facing toward the target object;

a backward velocity of the tail of the movable object along the motion path, while the tail of the movable object is facing toward the target object; or a side velocity of the side of the movable object along the motion path, while the side of the movable object is facing toward the target object; and determine the motion path for the movable object further based on the selected at least one movable object orientation mode.

10. The system of claim 1, wherein the controller is further configured to:

in response to the movable object circling the target object and an obstacle being located at the motion path of the movable object, move one or more points of the motion path in an outward direction or an inward direction to avoid the obstacle.

11. The system of claim 1, wherein the controller is further configured to:

control the movable object to move along a first path, the first path being a circling path around the target object at a first altitude;

control the movable object to move in a spiral path from the first path to a second path, the second path being a circling path around the target object at a second altitude, and the second altitude being different from the first altitude; and control the movable object to move along the second path.

12. The system of claim 1, further comprising:

a plurality of imaging devices on the movable object, each of the plurality of imaging devices corresponding to a first person view (FPV), and the plurality of FPVs of the plurality of imaging devices being different from each other;

wherein the controller is further configured to control to display one or more of the plurality of FPVs of the plurality of imaging devices.

13. The system of claim 1, wherein the controller is further configured to, while the movable object is traveling along the motion path based on the one or more motion characteristics of the movable object:

adjust, based on a first user command transmitted from a user terminal configured to control the movable object, the movable object to move around the target object with a first distance from the target object, the first user command being generated by an operation of a user at the user terminal; and adjust, based on a second user command transmitted from the user terminal, the movable object to move around the target object with a second distance from the target object.

14. The system of claim 1, wherein the controller is further configured to, while the movable object is traveling along the motion path based on the one or more motion characteristics of the movable object:

in response to a change of an orientation of the target object relative to a reference plane, adjust the motion path based on the change of the orientation of the target object relative to the reference plane, to obtain an adjusted motion path, and control the movable object to move along the adjusted motion path, a position relationship between the movable object and a surface of the target object in the adjusted motion path being same as a position relationship between the movable object and the surface of the target object in the motion path.

15. The system of claim 14, wherein the reference plane includes at least one of a ground plane, a plane horizontally disposed with respect to the ground plane, a plane inclined with respect to the ground plane, a plane vertically disposed with respect to the ground plane, or an imaginary plane floating in a three-dimensional (3D) space.

16. The system of claim 1, wherein the controller is further configured to:

in response to the target object being provided with a positioning device, determine a spatial relation between the movable object and the target object based on location information of the target object and location information of the movable object, and determine the motion path of the movable object to track the target object based on the spatial relation; and in response to the target object being not provided with the positioning device, identify the target object based on one or more visual characteristics of the target object, and determine the motion path based on the one or more visual characteristics of the target object.

* * * * *